United States Patent [19]

Kitchener et al.

[11] 4,203,029
[45] May 13, 1980

[54] AUTOMATIC OBJECT COUNTER

[75] Inventors: William R. Kitchener, Huntington; Stephen L. Sama, Seaford, both of N.Y.

[73] Assignee: Artek Systems Corporation, Farmingdale, N.Y.

[21] Appl. No.: 883,996

[22] Filed: Mar. 6, 1978

[51] Int. Cl.$^2$ .......................................... G06M 11/04
[52] U.S. Cl. .......................... 235/92 PC; 235/92 PL
[58] Field of Search ......... 235/92 PC, 92 PL, 92 PK; 364/416; 358/107

[56] References Cited
U.S. PATENT DOCUMENTS

| | | | |
|---|---|---|---|
| 3,626,164 | 12/1971 | Pontigny et al. | 235/92 PC |
| 3,811,036 | 5/1974 | Perry | 235/92 PC |
| 3,922,532 | 11/1975 | Kitchener et al. | 235/92 PC |
| 4,011,516 | 3/1977 | Heimbigner et al. | 235/92 PL |
| 4,015,108 | 3/1977 | Morton | 235/92 PC |
| 4,042,808 | 8/1977 | Hennessy et al. | 235/92 PC |

*Primary Examiner*—Joseph M. Thesz
*Attorney, Agent, or Firm*—Posnack, Roberts, Cohen & Spiecens

[57] ABSTRACT

An automatic counter which can scan either micro or macro sized objects in a field and provide both a visual display of the scanned objects as well as a digital count or measurement of the objects. A video camera is focused onto the sample and produces a video output signal which is processed and ultimately displayed on a video display together with an appropriate flag signal on each object identified. An aperture generator generates an electronic aperture signal whereby a particular area can be selected as to both size and shape and the selected area is displayed on the monitor screen of the video display. A compensation circuit provides additional counts to compensate for those cases where the entire area of a sample is not counted. An absolute area circuit provides a silhouette around each identified object and can provide an absolute measurement of the area within the silhouettes as well as a measurement of the total area of the selected aperture. A percent area circuit provides the area ratio count of the objects detected relative to the total aperture area. A size discriminating circuit allows selectivity of objects to be counted based on their size. A density circuit allows selectivity of objects to be counted or measured based on their optical absorption parameters. A special circuit determines and automatically adjusts to the optimum operating level. A circuit is available to provide size histograms of objects in the field of view. Further a three-way illuminating system is provided and utilized when operating in the macro mode.

55 Claims, 36 Drawing Figures

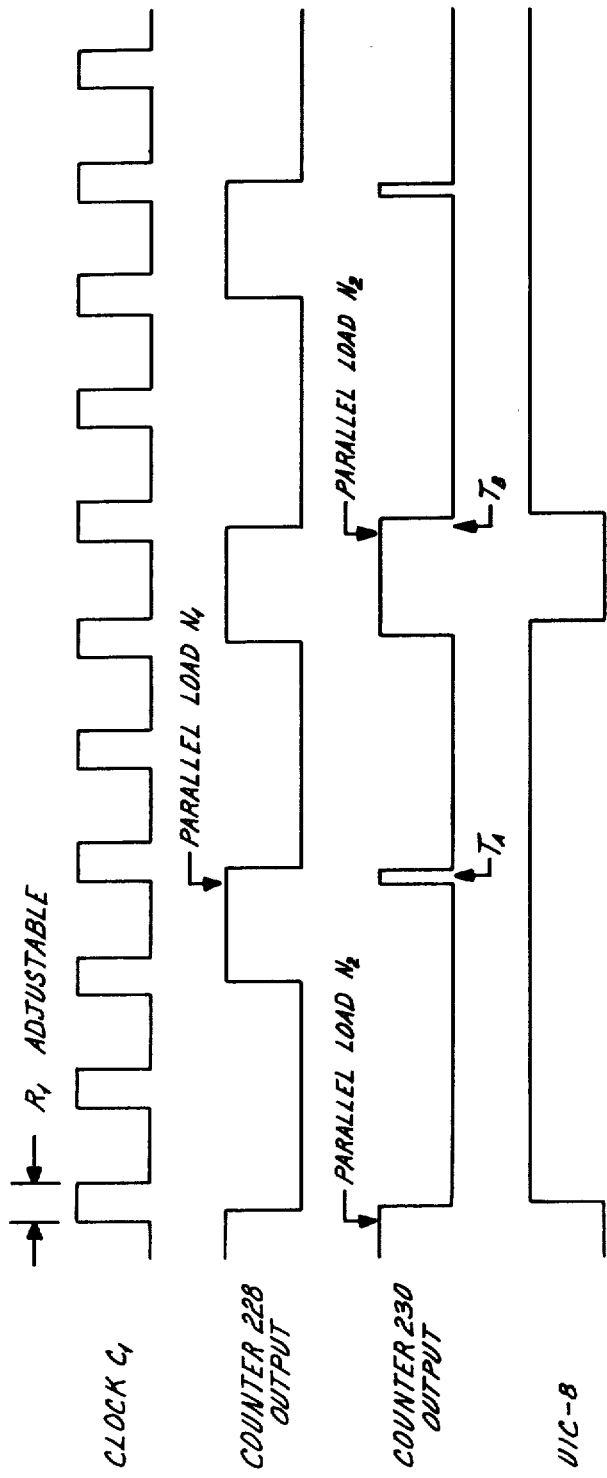
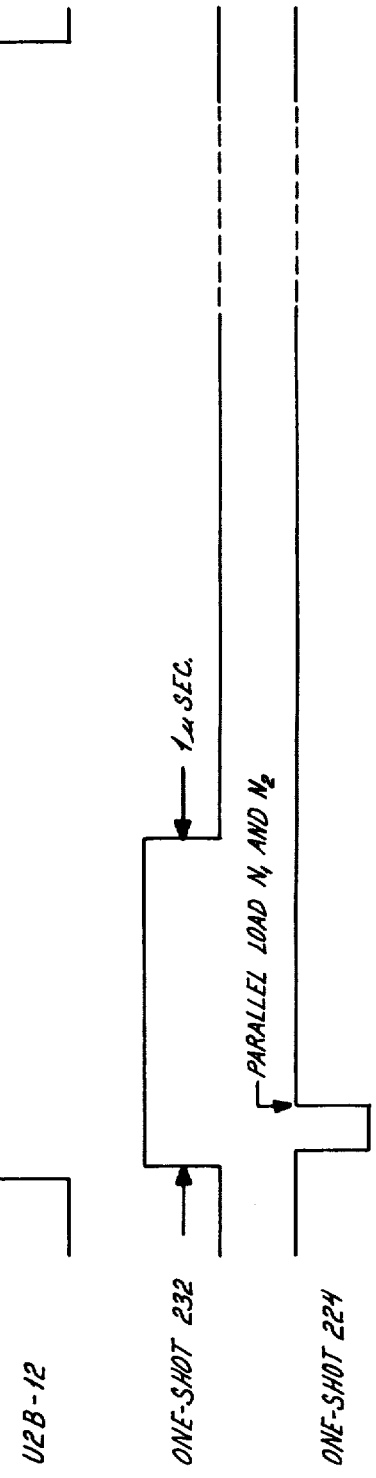
FIG. 13 (COUNTER TIMING)
FIG. 14 (RESET TIMING)

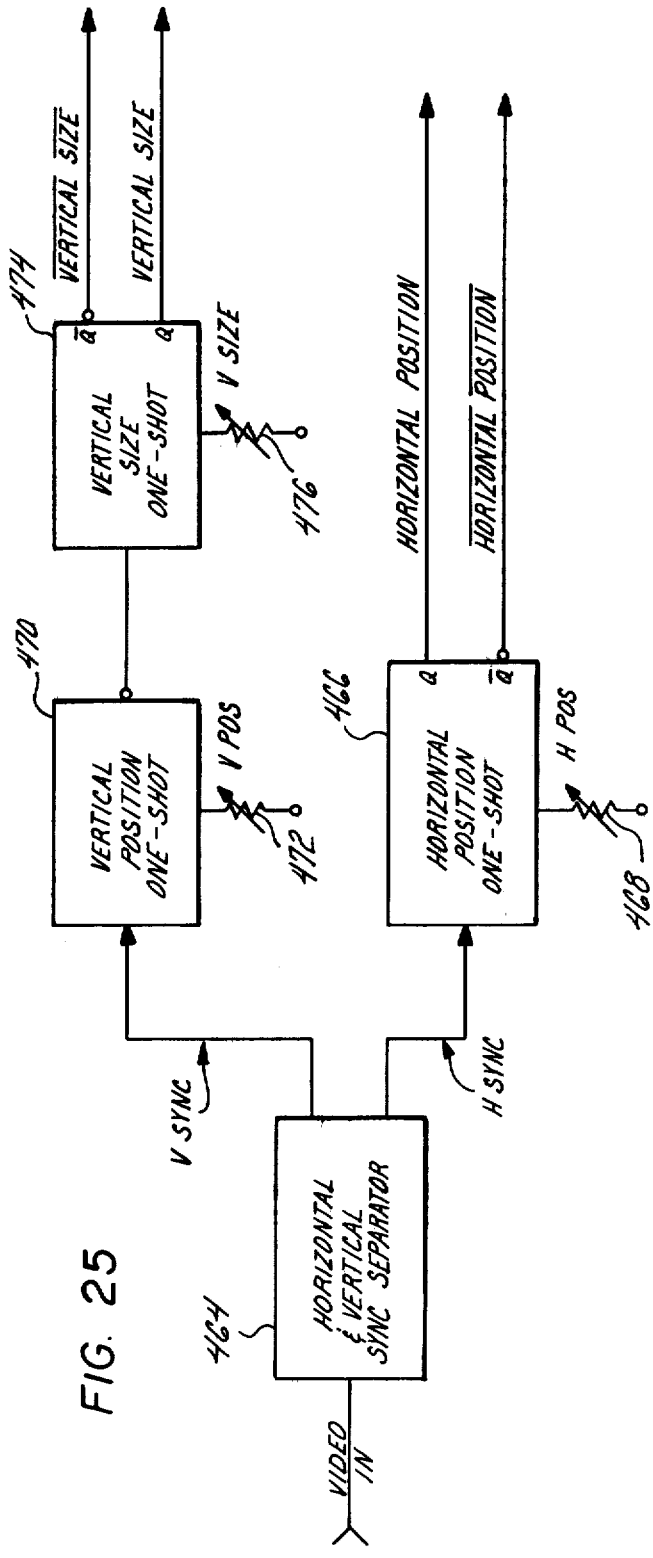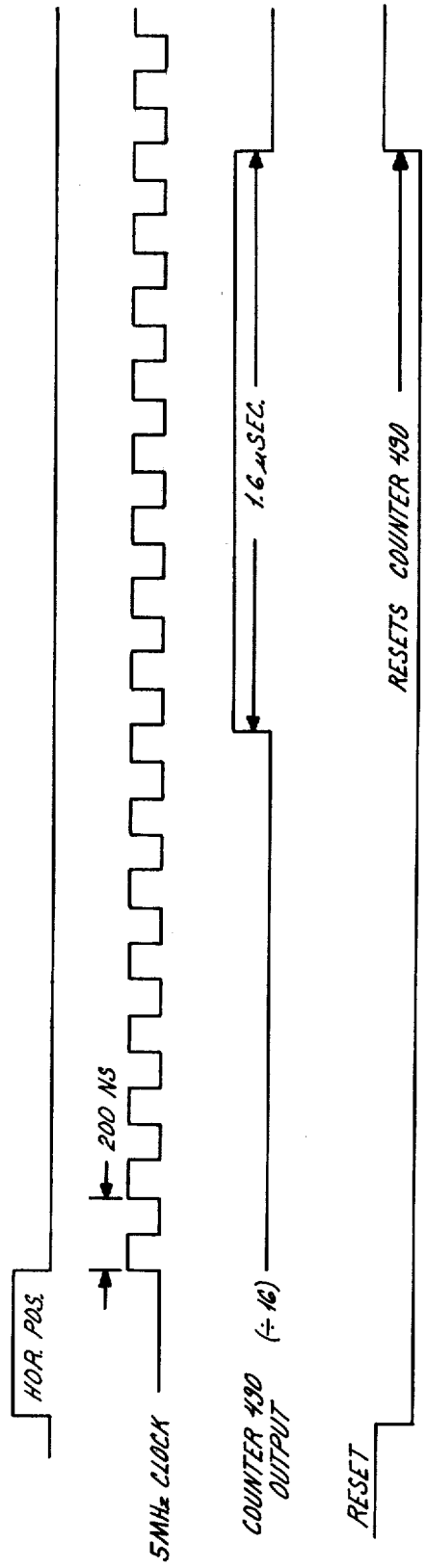

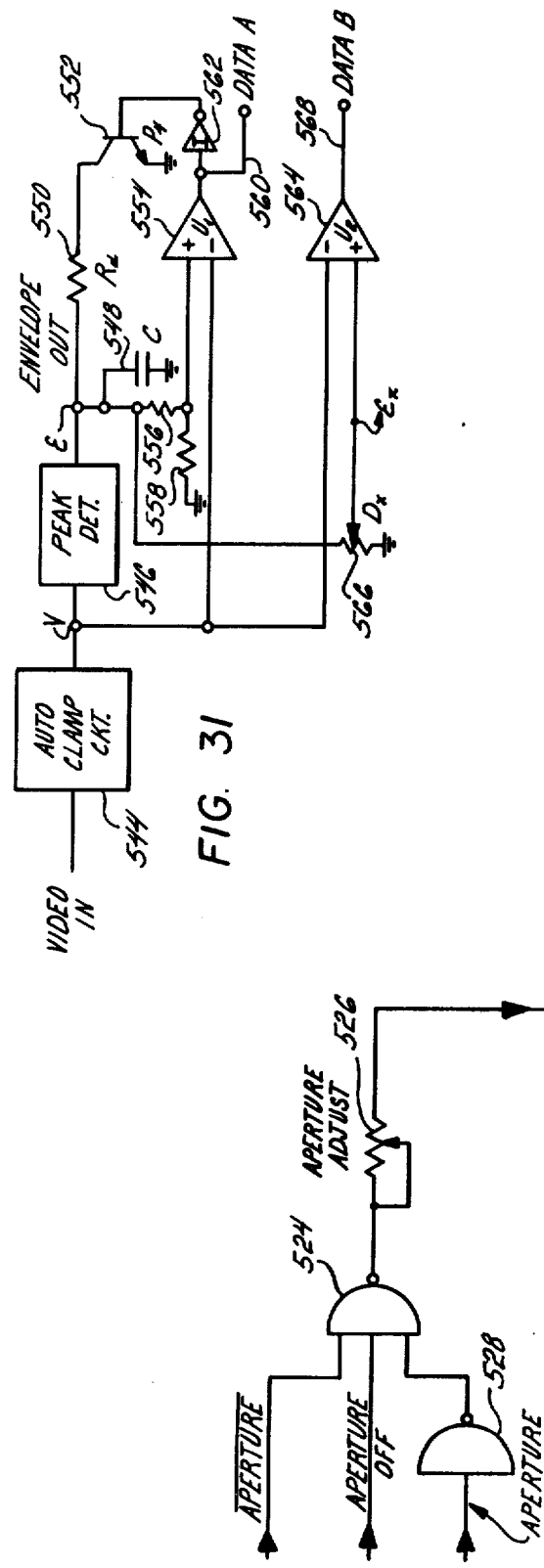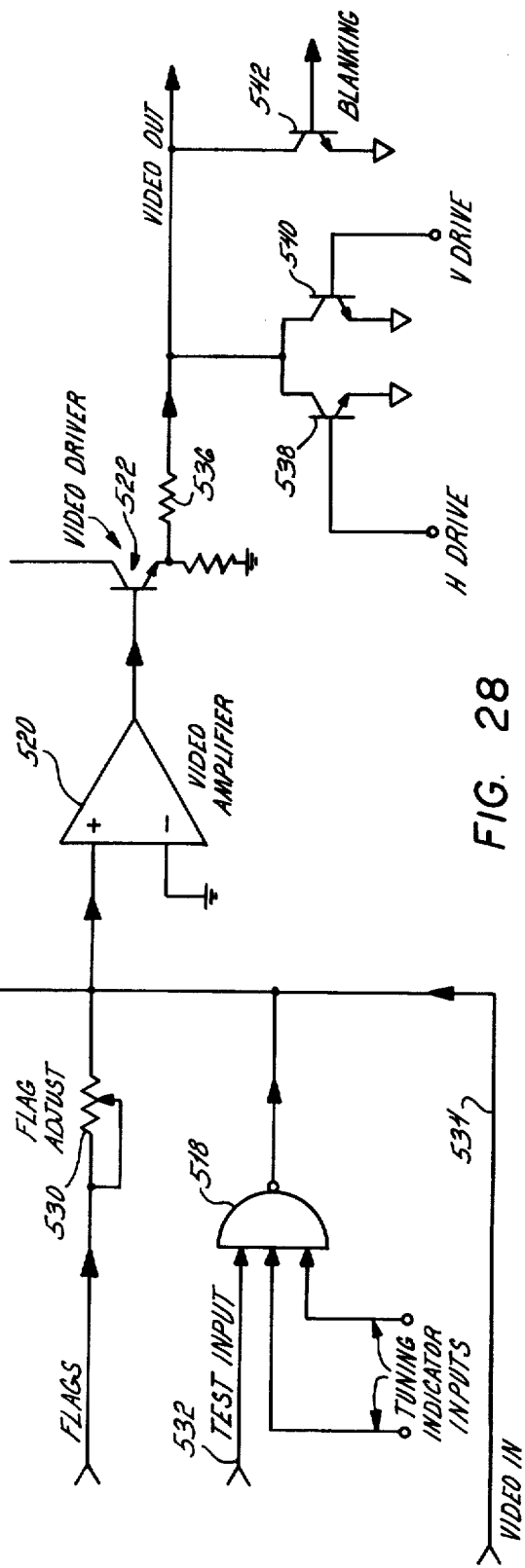

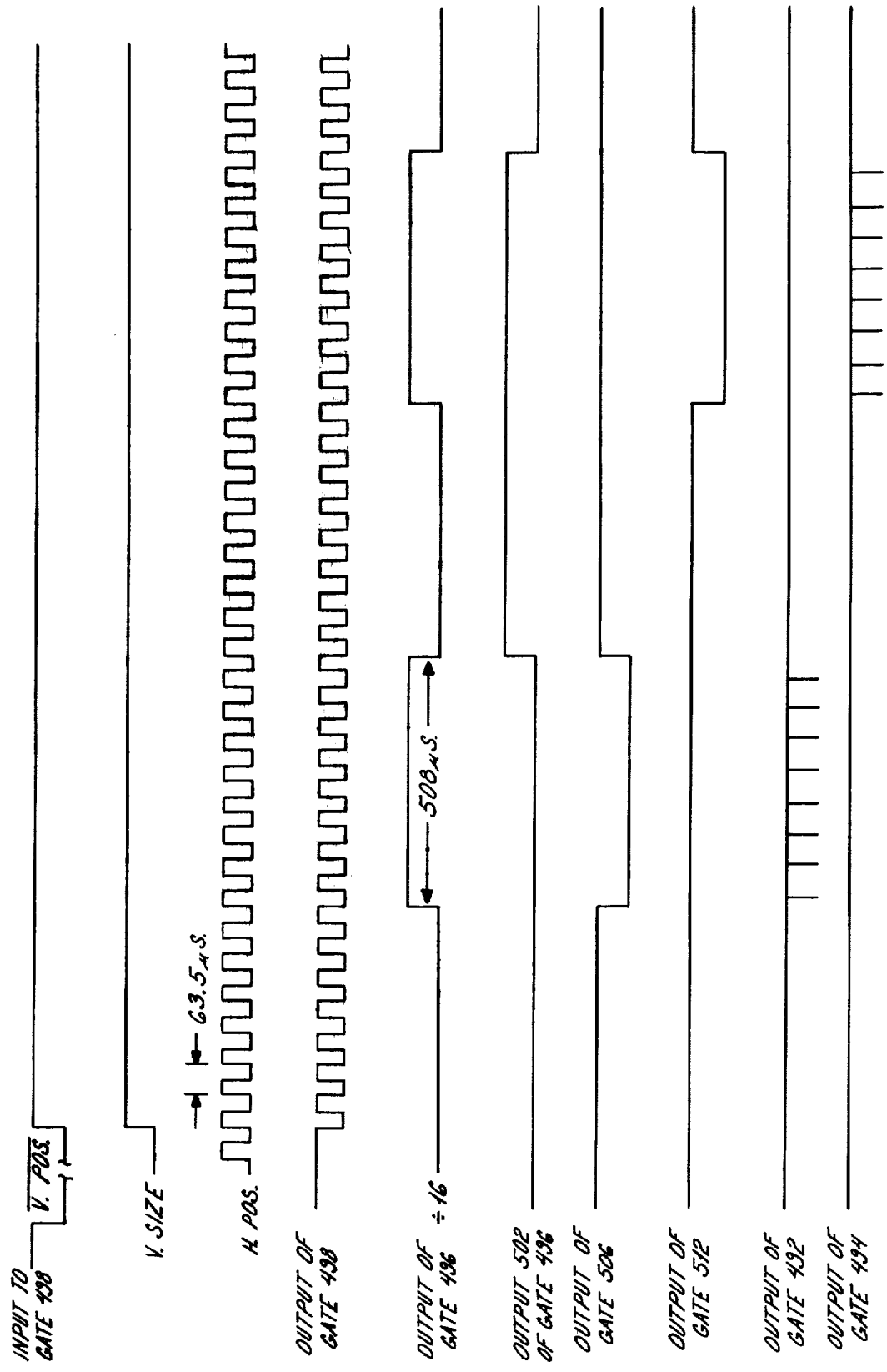
FIG. 30 VERTICAL TUNING WINDOW TIMING

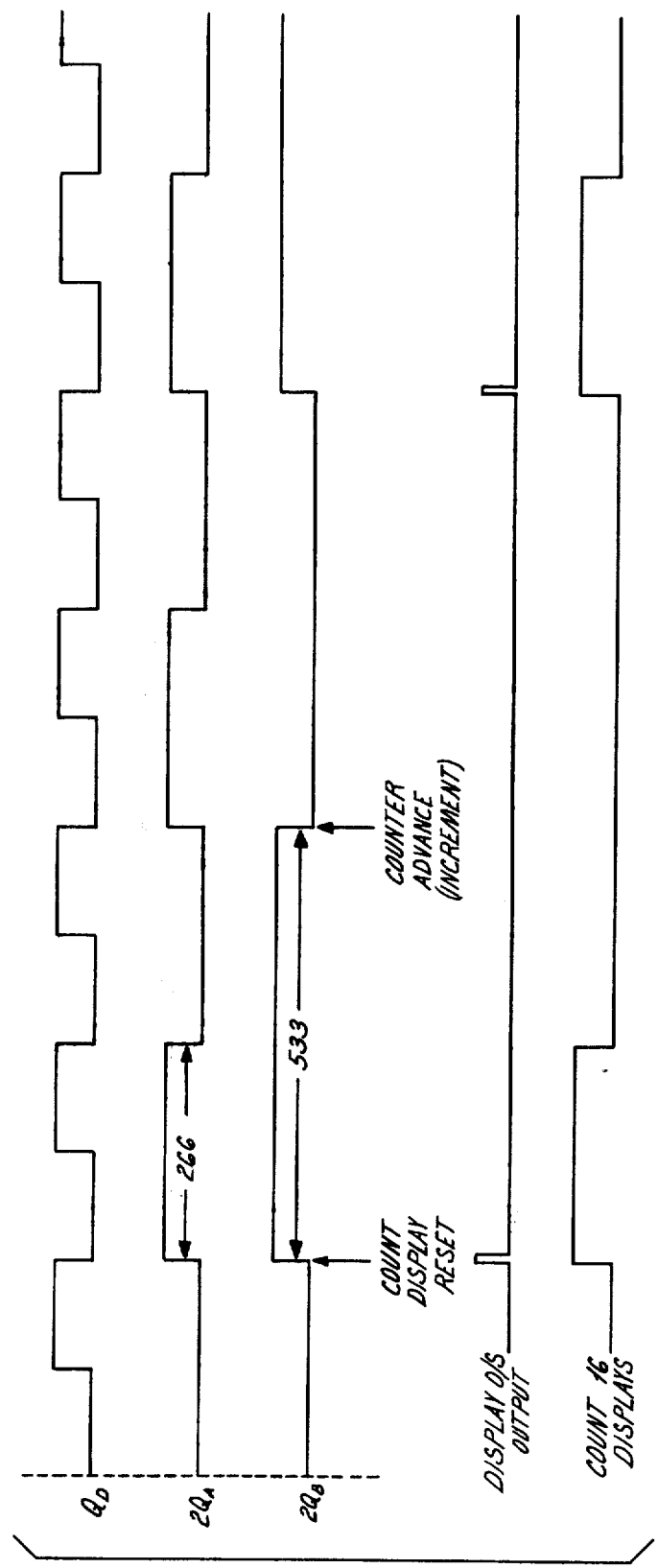

AUTOMATIC OBJECT COUNTER

BACKGROUND OF THE INVENTION

This invention relates to a counting, measuring and display device, and more particularly to a counter measurement and display device for use in the field of medicine such as microbiology where cells and colonies and the like are to be counted from a sample.

In the field of medicine and laboratory science, automation of standard procedures is becoming a necessity in order to cope with the massive amount of testing and other procedures. At one time, it was possible to individually count colonies in a sample and determine the number of colonies therein. However, automation of such a procedure has become a necessity. Additionally, while a simple count of the number of colonies can be carried out manually, it is often desired to select only a particular area of the sample and restrict the count to that area. Also, various size and density minimums must often be set whereby only the count of colonies greater than these minimum levels are to be included. It is oftentimes necessary to obtain an area measurement of a complex shaped object such as a cell or a component of a cell, such as its nucleus. Accurate measurements of this type are obtained by time consuming and costly methods. Such variations and specialized counting further necessitates the need for automation in the field of microbiological counting.

Some colony counters are already available which attempt to satisfy these needs. By way of example, U.S. Pat. No. 3,811,036 entitled "MICROBIOLOGICAL COLONY COUNTER", issued on May 14, 1974, and assigned to the assignee of the present invention, describes a basic automatic colony counter which places a flag on each colony detected and displays the output. U.S. Pat. No. 3,757,299, entitled "METHOD AND APPARATUS FOR MEASURING THE SIZE OF ZONES OF INHIBITION IN AN ASSAY MEDIUM" issued on Sept. 4, 1973, and assigned to the assignee of the present invention, describes various types of pattern recognition and measuring systems for certain types of colonies and similar microbiological items to be detected. Also, U.S. Pat. No. 3,922,532 entitled "CELL COUNTER" issued on Nov. 25, 1975, and assigned to the assignee of the present invention, describes an improved counter which can count objects in a sample and includes both size and density discrimination.

While the aforementioned apparatus, as well as other prior art devices, provide for automation in the field of microbiological counting and displaying, these units do not present the versatility needed in such apparatus in order to permit its use in a variety of applications. For example, the particular area of the sample which is scanned remains constant in such apparatus and there is no means provided for modifying the size and/or shape of the area being scanned. Similarly, with many such apparatus the holder of the sample covers a portion of the sample itself and, therefore, the entire area cannot be scanned. As a result, the count scanned is not a complete count for the entire sample, and no compensation is provided for such automatic counting. Additionally, it is frequently desired to provide additional measurements such as the percent of area covered by the colonies or the absolute area of the colonies. Prior art devices have not provided for such capabilities. As a result, despite the success of many of the apparatus, complete versatility and use for many applications has thus far not been provided.

SUMMARY OF THE INVENTION

It is accordingly an object of the present invention to provide an improved counter, measurement and display device which avoids the problems of prior art devices.

Another object of the present invention is to provide a particle counter which can provide both a digital count as well as a video display of particles on a sample being scanned.

A further object of the present invention is to provide a particle counter on which the aperture configuration can be selected for viewing.

Another object of the present invention is to provide a particle counter whereby the particular area of the sample can be selected to be a square, a circle or a rectangle.

Yet another object of the present invention is to provide a particle counter wherein the size of the aperture scanned as well as its position can be controlled.

Yet a further object of the present invention is to provide a particle counter which includes count compensation for adding counts for those portions of the scanning area which are not counted.

Another object of the present invention is to provide a particle counter whereby the absolute area of the particles scanned can be counted.

Yet another object of the present invention is to provide a particle counter whereby an aperture of the sample can be selected for scanning and the absolute area of both the selected area as well as the particles scanned within that area are selectively counted.

A further object of the present invention is to provide a particle counter wherein an aperture of the sample can be selected for scanning, and which provides a percent count of the particles detected to the area of the aperture.

Yet a further object of the present invention is to provide a particle counter wherein a lower limit of size can be set so that only particles greater than the selected size will be counted.

Another object of the present invention is to provide a particle counter having density discrimination so that only particles having a greater density than the set level will be counted.

Yet another object of the present invention is to provide a particle counter which includes a sensitivity selector wherein maximum and/or minimum sensitivity levels are displayed on the video display.

A further object of the present invention is to provide a particle counter which includes automatic sensitivity control to automatically set the level at its maximum sensitivity value.

Still another object of the present invention is to provide a counter which will only count each object a single time and avoids recounting the same object even though the object may extend onto a number of scan lines.

A further object of the present invention is to provide a counter which can selectively set the size, shape, and position of an aperture so that only the sample within that aperture will be counted.

Another object of the present invention is to provide a particle counter which includes a silhouette generator for providing a bright silhouette around all particles detected and for displaying the particles detected with the silhouette around them.

Still another object of the present invention is to provide a counter which includes means for detecting the minimum electronic aperture area for which a percent area calculator has maximum accuracy, and flashing the silhouetted object scanned onto the video display when the aperture is below that minimum value.

Yet another object of the present invention is to provide a particle counter which permits adding or subtracting counts from the displayed output counts.

Still another object of the present invention is to provide a counter which provides an output pulse to indicate that a new count is forthcoming.

Another object of the present invention is to provide a counter which provides automatic size distribution of the objects counted in a predetermined range of sizes.

A further object of the present invention is to provide a counter which includes a three way illumination system providing top light, as well as brightfield and darkfield light.

Another object of the present invention is to provide a particle counter which permits the selection of viewing light objects on dark background or dark objects on light background.

Another object of the present invention is to provide a particle counter which includes a main housing in which the sample is retained and the count is displayed, and a television monitor unit which can be connected to the main housing and on which the video output is displayed.

Briefly, the invention provides for a particle counting apparatus which can count particle objects contained in a sample. A scanning means focuses onto the sample and provides a scanning video output signal. This output signal is sent to a video processing unit which produces digitized video signals. A timing control circuit receives the video output signal and provides horizontal and vertical synchronization signals. An aperture generator receives the synchronization signals and generates an electronic aperture signal which corresponds to a selected area of the sample. A shift control circuit receives the digitized video signal as well as the synchronization signals and the electronic aperture signals and identifies each object in order to produce a respective count signal and a flag signal for each such object identified within the selected area. A counting device receives the count signals and provides a total count which corresponds to the total number of identified objects within the selected area. A video display receives the video signals as well as the flag signals, the sensitivity indicator signals and the electronic aperture signals, and displays the selected area of the sample together with the objects therein, with each object identified by a flag signal.

The aperture generator includes means for generating a region of enhanced illumination of the video display and a selector for selecting said region to be of a circular shape, a square shape or a rectangular shape. Furthermore, the display size of the enhanced region can be expanded until the entire available display area of the video display is utilized. Also, the height and width of the enhanced region as well as its position can be selected. The aperture may also be switched off with the selector switch.

In an embodiment of the invention, there is also provided a compensator circuit which receives the count signals from the shift control and corrects the count signals to compensate for an area of the sample which is not detected. The corrected count signals are then sent to the counting means.

Another embodiment of the invention includes an area circuit means which receives the digitized video signal and produces a silhouette output to the video display means so that a bright silhouette is displayed around each of the detected colonies.

An absolute area means can be included which receives the digitized video signal together with the electronic aperture signal and selectively provides to the counting means a first area count which represents the absolute area of the selected area, and a second area count representing the total area of the detected objects within the selected area.

A percent area circuit means can also be included which receives the digitized video as well as the electronic aperture signal, and provides to the counting means an area count which represents the ratio of the total area of the detected objects within the selected area to the total area of the selected area itself.

The shift control means makes a determination that only a single count is provided for each object. In so doing it determines when the end of an object occurs on a horizontal scan line. It also determines that the object's length has exceeded a preselected size. A third determination is made that the object from one scan line and the object exceeding the preselected size from the previous scan line has not simultaneously occurred. A fourth item is to determine that either an object or an object exceeding the preselected size from a previous horizontal scan line has not occurred simultaneously with the detection of the object from the present scan line.

The object counter is enclosed within a housing having support means for retaining the sample during scanning. A three way illuminating system is included which includes a bottom light for brightfield operation as well as a top light and a darklight field light. The video display means can be a television monitor which is coupled to the main housing unit. All of the circuitry can be formed of integrated circuits and placed in the main housing unit on a rack.

The counter optionally includes an automatic size distribution circuit which will permit selection of desired size ranges and will count all objects equal to or greater than each of the size ranges. This particle analysis can be used to develop a histogram.

The counter can be used for macro or micro sized objects and can count and measure plaques, plates, colonies, cells, cultures, eggs, particles and generally all other types of objects which can be seen with the naked eye, through a microscope or a hybrid optical system. It is intended that the terms "objects" or "particles" as used herein includes all such items.

The aforementioned objects, features and advantages of the invention will, in part, be pointed out with particularity, and will, in part, become obvious from the following more detailed description of the invention, taken in conjunction with the accompanying drawings which form an integral part thereof.

BRIEF DESCRIPTION OF THE DRAWINGS

In the drawing:

FIG. 13 shows counter timing for use in explaining the absolute area circuit;

FIG. 14 shows the reset timing for use in explaining the operation of the absolute area circuit;

FIG. 25 is a circuit diagram of the sync separator section of the control circuit;

FIG. 28 is a circuit diagram of the video amplifier mixer section of the control circuit;

FIG. 29 are graphs useful in explaining the operation of the control circuit and showing the horizontal window timing;

FIG. 30 are graphs useful in explaining the operation of the control circuit and showing the vertical tuning window timing;

FIG. 31 is a block diagram of the density circuit;

FIG. 36 is a graph useful in explaining the operation of the circuit of FIG. 35.

DESCRIPTION OF THE PREFERRED EMBODIMENT

General Description Of The Apparatus

Figure 1:
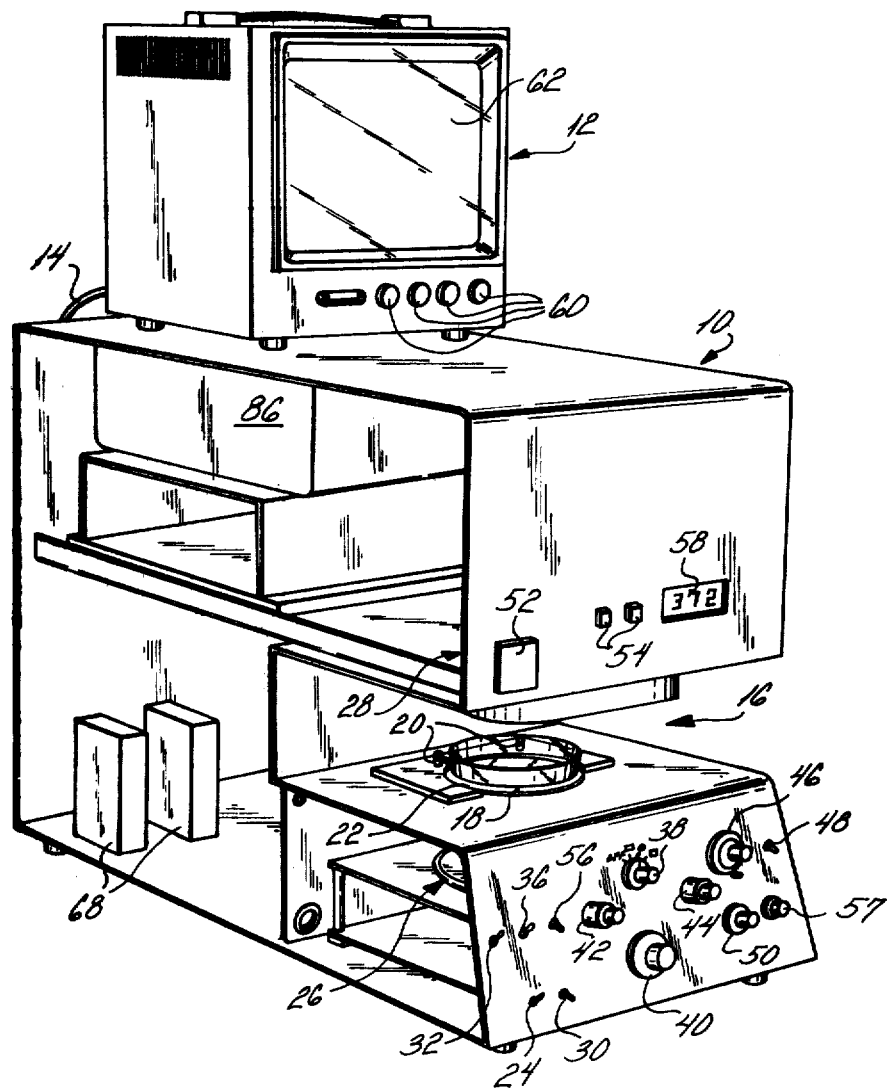
FIG. 1 is a pictorial view of the front view of the apparatus of the present invention.
Figure 2:
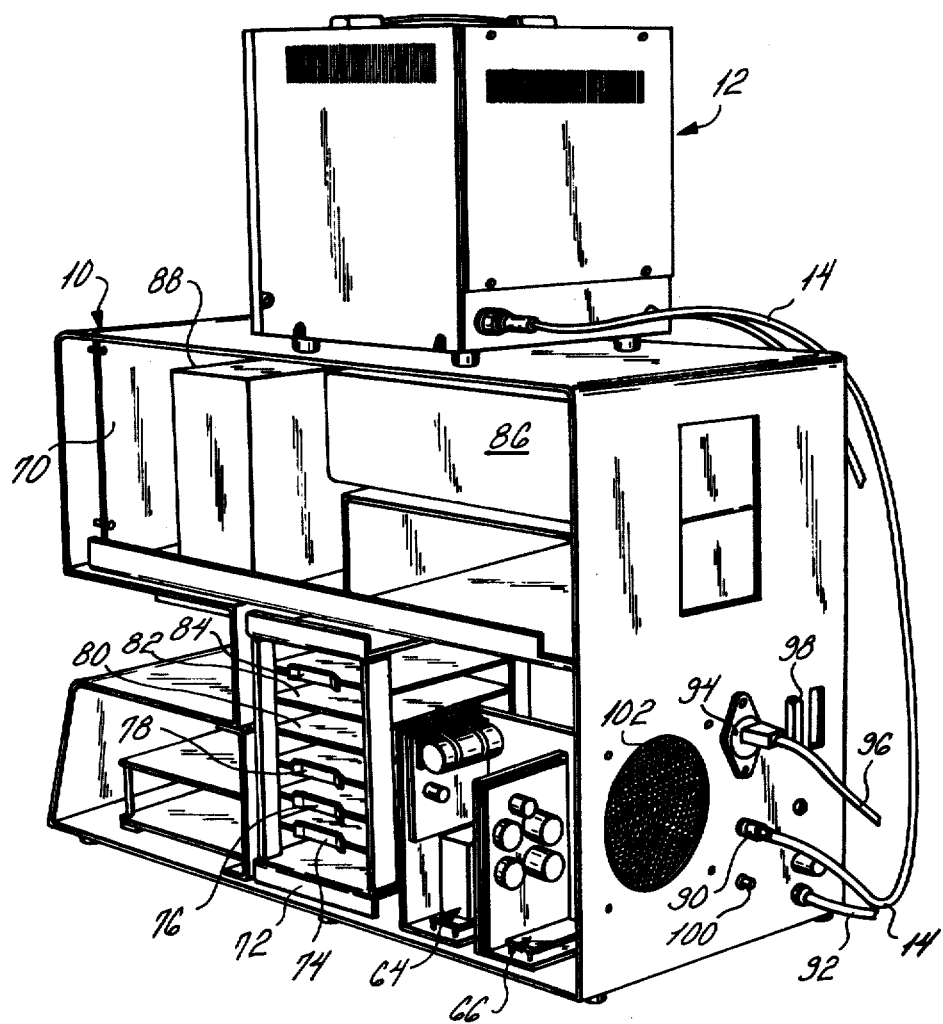
FIG. 2 is a pictorial view of the apparatus of the present invention with the side open.

Referring now to FIGS. 1 and 2, there are shown pictorial views of the apparatus of the present invention, including the object counting section shown generally at 10 interconnected to a television monitor 12 by means of the cable 14. The counter portion 10 is C-shaped in configuration with a slotted section 16 in which the petri dish or other item to be counted can be inserted. The petri dish is placed on the dish holder 18. The two universal dish-stop retaining screws 20 are utilized to align the petri dish over the stage mask until the stacking ring 22 is no longer visible. The universal dish-stops are then tightened to retain the dish in place.

On the front panel are a number of switches and dials permitting control of the device. Initially, the main on/off switch 24 is energized and the appropriate lighting can then be provided.

The counters are equipped with a three-way illuminating system including a bottom light 26 located below the support stage 18 which can be used in applications where the objects to be counted can be silhouetted by transmitted light. This lighting is called brightfield light. A top light 28 located above the stage is utilized for counting objects that can best be identified with reflected light. There is also provided a darkfield light for counting low contrast objects.

To adjust for top or bottom lighting, the switch 30 is adjusted. In addition, darkfield can be selected by simply removing the light diffuser.

An image switch 36 is also provided to alternately switch from counting opaque objects on semitransparent media to counting light opaque objects on opaque media such as is encounted on membrane filters. The combination of the three way lighting and the image switch provides complete versatility to count almost any type of colony, cell, plaques, or other objects.

Switch 32 is provided for selection of an interior camera or an exterior camera. For example, use is made of an auxiliary camera in conjunction with a microscope for counting objects smaller than 0.2 mm in size.

The present counter also provides for the control of the amount of area of the sample being counted and the particular shape of that area. Specifically, an aperture selector switch 38 is provided which includes four positions. The first position permits the complete petri dish to be scanned and displayed on the television monitor screen. Additional positions of the aperture selector switch permit selection of area configurations including a circle, a square, and a rectangle. When set to either the circle or the square position, the circle/square area selector knob 40 is available to control the aperture area. When the selector switch 38 is set to its rectangle position, the rectangle vertical and horizontal controls on switch 42 permit controlling the height and width of the rectangle. Furthermore, the position knob 44 permits the operator to position the aperture anywhere in the field of view. The combination of the aperture area, configuration, and position permits the complete control of the area being viewed as well as the location of that area.

On the front panel is also provided a sensitivity control knob 46 together with an associated manual/automatic switch 48. On the upper left section of the monitor screen will be displayed two square tuning indicators. The upper indicator will start flashing when the sensitivity control knob is advanced clockwise. The point at which the upper control stops flashing is considered maximum sensitivity. The lower sensitivity indicator will start flashing as the sensitivity control knob is rotated counterclockwise. The point at which the lower control stops flashing is considered that point below which the sensitivity control should not be operated. This control is only available when the switch 48 is in its manual position. When in its automatic position, the sensitivity is automatically adjusted to maximum sensitivity.

A control 50 adjusts the appropriate size discrimination of the counters. This provides the ability to discriminate the counting of objects of a certain size and eliminate objects smaller than that size.

The counter is equipped with automatic compensation which is controlled by means of the switch 52 located on the upper part of the counter. The compensation is generally utilized for counting pour plates or wherever there exists a homogenous dispersion of objects throughout the entire field and the area of scan is limited to something less than this entire field. For example, when objects are contained outside of the stacking rings and compensation for this area not being scanned is desired, the appropriate compensation is included. Compensation can be achieved in specific increments to correspond for the area not actually being scanned. Additionally, specific counts can be manually added or subtracted by means of the operator compensation controls 54.

A mode switch 56 is provided which is utilized in conjunction with the count button 57 and the digital display window 58. When switch 56 is placed in its "aperture area" position, the readout window 58 will automatically display the total area of the aperture which has been selected by means of the various aperture selection switches 38, 40, 42 and 44. The mode switch may then be placed in its "object area" position and then by utilizing the count button 57, and the display 58, the numeric area of the objects counted will be displayed. It should be noted that the specific objects which are counted will be silhouetted on the TV monitor screen. Finally, when the mode selector switch is in its "count" mode the numeric quantity of the objects will be displayed. In one embodiment of the invention, instead of absolute area, the percent of aperture area can be obtained whereby the digital readout 58 will show the percent of the aperture area which is occupied by the objects silhouetted.

The TV monitor 12 includes additional controls 60 to adjust the contrast, brightness and other usual TV controls. The video display will be visible on the monitor screen 62.

Internally of the counter housing 10 are included a 5 volt power supply 64 which provides the appropriate voltage for the various logic cards for all the integrated circuits utilized. There is also provided a 12 volt power supply 66 which is utilized for the various analog circuits. AC transformers 68 are also located on the chassis frame to supply the AC to operate the various illuminating systems which include mercury vapor lamps.

The electronics are contained on separate logic cards, which include the readout printed circuit board 70 located on the front inside of the chassis with its lighted display visable through the front panel. This printed circuit assembly receives the count pulses from the logic rack 72 and then totals, stores, and displays the count periodically through the display window 58. In the particular logic rack 72, at the bottom most position is the video processor card 74. This card differentiates and amplifies the incoming video before conversion to digital pulses. This card also contains the circuitry necessary to detect the background noise and derive the levels for maximum sensitivity. Directly above the video printed circuit board 74 is the compensator printed circuit board 76. This provides the additional counts in individual 1% increments, above the normal count, when directed by means of the front panel switch 52. Next is the aperture card 78. This implements the mathematical formula needed for a circle by squaring and generating curves from the horizontal and vertical drive pulses. The various circle, square and rectangle sizes and positions are generated by this card. Above this is the control card 80 which derives the horizontal and vertical synchronization pulses separately. This card also senses the operation of the front panel count switch and generates a count window sixteen television fields wide. Additionally, this card contains the video mixer amplifier where the flags, video and aperture signals are all mixed for output display on the TV monitor.

The next upper card is the area card 82 which generates a leading and trailing edge from the digitized video. This is necessary for generating the silhouette about the objects being counted. The digitized video also gates a clock which is then scaled for determining the area. Finally, the uppermost card in the rack 72 is the shift card 84. This card generates the flag and count pulses. A one line memory in the card retains the digitized video for determining whether the object has been previously counted. In this manner, each object is counted only once and a single output is provided for each individual object although it may extend over numerous horizontal scan lines. Size circuitry is also incorporated on this card to eliminate objects smaller than a certain selected size.

A stabilized CCTV camera 86 is provided to produce the necessary video information for the system. A mirror 88 is provided to direct the light through the object and onto the TV camera.

On the rear of the housing is provided a video output plug 90 through which the cable 14 interconnects. A main power cord 92 interconnects to a supply source and a localized outlet 94 is available so that the TV monitor can be directly plugged into the counting unit by means of the power cord 96. A separate data output 98 is also provided so that the data which is generated and displayed in the counting unit can also be directly supplied to a computer or other data receiver. The output is in binary coded decimal with positive logic and is TTL compatible.

There is also provided an auxiliary camera output 100 which allows the counter to be alternately used for counting macro objects or objects in a microscopic field by connecting an auxiliary camera to a microscope. The open screen grid 102 is available for permitting cooling of the electronic components within the housing.

GENERAL DESCRIPTION OF CIRCUITS

Figure 3:
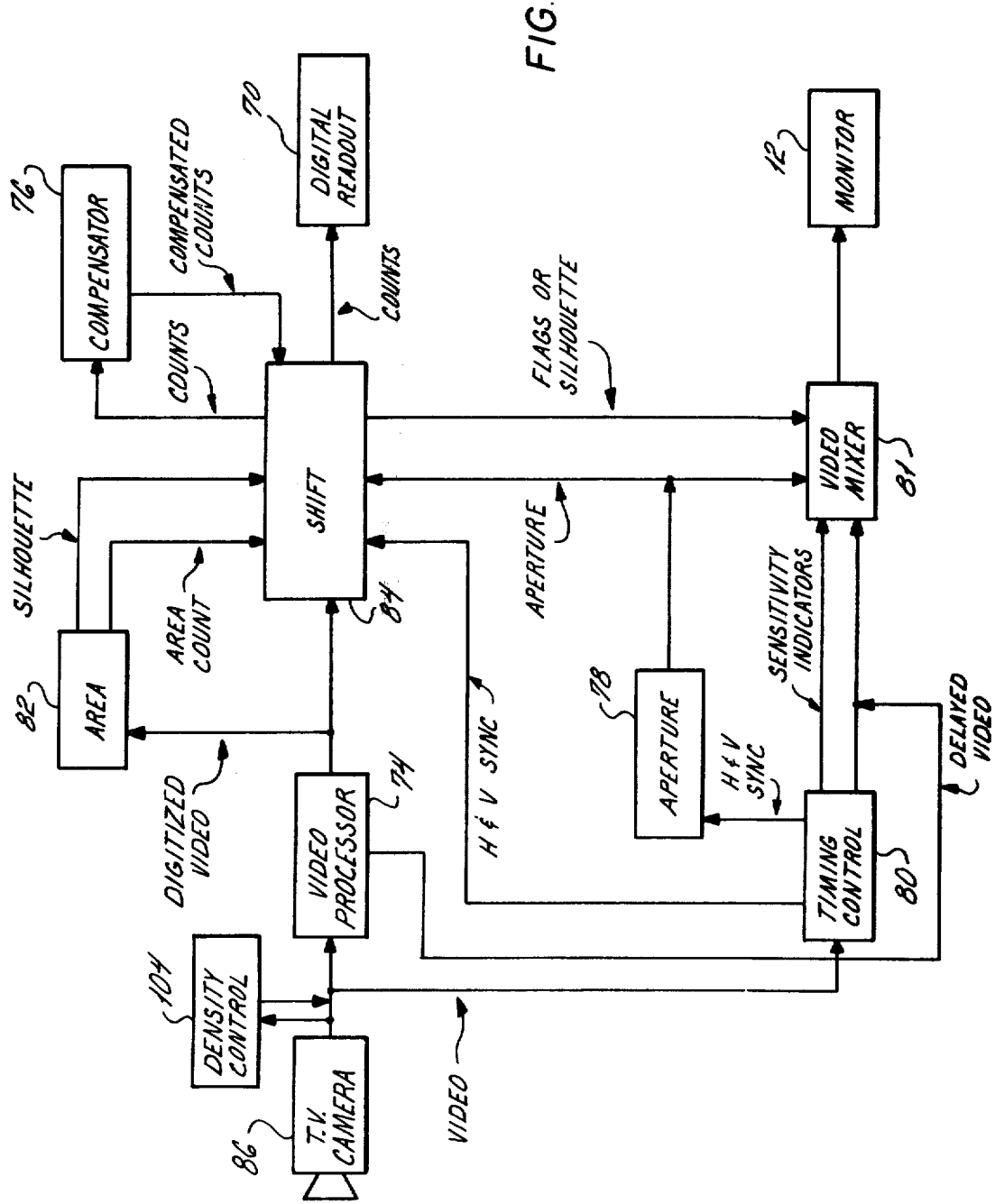
FIG. 3 is an overall block diagram of the present invention.

Referring now to FIG. 3 there is shown an overall block diagram of the circuit of the present invention. The TV camera 86 focuses onto a sample to be counted and displayed. The output video signal consists of a series of horizontal scan lines with information contained on those scan lines. The information is sent to the timing control printed circuit board 80 where the horizontal and vertical synchronization signals are separated from the composite video. It is also possible for the control circuit 80 to accept individual horizontal and vertical drives. The timing control card includes delay and size generators which control the vertical size and position along with the horizontal position of the counting window.

The video signal is also sent to the video processing card 74 which includes the active differentiation and amplification of the signal. The signal is digitized on this circuit card, whereby leading and trailing edges generate a single pulse. The video processing card also includes the necessary switching means under control of the image switch 36 on the front panel, whereby the leading and trailing edges can be reversed to thereby identify negative or positive video. The sensitivity controls are also contained on this card. A sensing means is used to determine the average noise level of the incoming video to thereby establish a maximum sensitivity threshold. Comparison means are available to sample the sensitivity setting based on the front panel sensitivity control knob 46 and the average noise level to thereby establish a point of maximum sensitivity. This circuit then produces the control of the upper indicator line on the display to appropriately identify the maximum sensitivity. Similarly, division means are included whereby the average noise level is reduced to establish a minimum sensitivity threshold and appropriate control of the lower tuning indicator line on the display is available to identify this minimum sensitivity threshold. As was indicated, this is available during the course of the manual control. However, during the course of the automatic control the feedback means takes over whereby such control is automatic without the need of achieving maximum or minimum control by means of the tuning indicator lines.

The output from the video processor card 74 is then sent to the shift card 84, which also receives the horizontal and vertical synchronization signals from the timing control card 80. The shift card 84 includes the circuitry which produces the flag and count pulses. This card makes the decision which objects should be flagged and counted. The decision is based upon the determination of whether a particular object has been previously counted on a different horizontal scan line. Additionally, the input from the size control knob 50 on the front panel is also used as a criteria to determine which objects should be counted. Specifically, only those objects exceeding the selected size will be counted. The shift card 84 produces count outputs which are sent to a digital readout card 70, as well as flags or silhouette signals which are sent to a video mixer 81 which is actually included on the timing control card 80.

The digitized video signal from the video processor 74 is also sent to the absolute area card 82. This card provides a bright silhouette around all objects detected within the particular electronic aperture window. It also measures the absolute area of the objects detected in the form of a series of pulse trains, where the number of pulses is proportional to the object area. It also measures the electronic aperture area by utilizing the same area measuring means. Fine and continuous adjustment as well as coarse-wide range adjustment is included in order to refine the particular area measurements. The output of both the silhouette as well as the area count passes through the shift card.

In place of the absolute area card 82 an optional feature permits the use of a percent area card. This card would also provide the silhouette around the objects detected. However, it would then measure the ratio of the detected object area to the electronic aperture window area and provide from zero to 100 count pulses representing ratio in percent value. The percent area printed circuit card would also include circuits to generate a high frequency clock of twice the rate of a low frequency clock pulse train. Also, it would detect a minimum electronic aperture area needed for which the percent area calculator has maximum accuracy. The object silhouettes would flash below that minimum value.

The counts produced by the shift card 84 are sent directly to the digital readout card 70 but can be compensated by means of the compensator printed circuit card 76. The compensator card provides count modification whereby additional counts may be added to the count stream. The actual count may be modified in 1% increments from zero to 79%. The use of the front panel compensation controls is available for programming the additional counts in the specified increments desired. The compensated counts are then returned back to the shift circuit 84 to be sent to the digital readout 70.

The aperture card 78 receives the horizontal and vertical synchronization signals from the timing control card 80, and is utilized to create the desired area configuration, the size of that area, as well as the position of that area. The aperture card 78 includes the necessary circuitry for creating a circular region of enhanced illumination on the standard television monitor display. Also, it includes the circuitry for creating both the square and rectangular regions of such enhanced illumination. It then can restrict the counting area to the selected region of enhanced illumination. Additional circuitry under control of the front panel knobs, are included to vary the size of the area selected from zero to the maximum allowed on the television screen. Furthermore, the circuits include a way of independently adjusting both the height and width of the enhanced region through the front panel controls. A closed loop is provided for maintaining the constancy of the selected size of the enhanced region. This includes a way of measuring the enhanced region size by conversion to an equivalent voltage level and comparing the voltage level to a reference level. The difference of these voltage levels is then taken and automatically utilized to change the size of the enhanced region to make this difference approach zero. Also included are circuits for splitting this closed loop into two loops, one of which provides slow automatic control of the enhanced region size for small voltage differences, and a second with fast automatic control of enhanced region size for large voltage differences. Also included on this card are circuits for moving the center of the enhanced region to any point in the television raster. An independent control over both vertical and horizontal positioning is provided on the front panel for this use. Finally, switching means is available to select any one of the enhanced regions or to completely remove the aperture control whereby the entire area will be scanned and flagging and counting will be enabled throughout the television raster area.

The digital outputs of both the numeric counts of the objects as well as the area counts are sent to the digital readout card 70. This card provides the necessary counting and decoding as well as displaying the digital values. It also provides the availability of positive and negative push buttons for adding and subtracting from the display counts. The output is displayed in binary coded decimal and there is also provided a "new count initiate pulse" which indicates that a new count is forthcoming.

The various video signals are sent to the video mixer circuit 81 which forms part of the same printed circuit board as the timing control 80. This circuit receives the aperture signals from the aperture card 78 as well as the flags and silhouette signals from the shift card 84. It also receives a delayed video directly from the video processor 74. The upper and lower tuning indicators are added to the video signal for a monitor indication of the high and low sensitivity levels. The aperture and flag controls for optimizing the relative monitor contrast of the electronic aperture, flags, and the entire scene are also included. The output from the video mixer is then sent to the television monitor 12 for final display.

Optionally included is also a density control card 104 which can receive the video signal and appropriately adjust it in accordance with predetermined absorption levels of the objects to be counted. The information then sent on to the rest of the system will only include those objects which have absorptions greater than the preselected absorption level. Also optional is a size distribution circuit, which will be described.

VIDEO PROCESSING CIRCUIT

Referring now to FIGS. 4–7, there will be described details of the video processing card 74 heretofore described in general.

Figure 4:
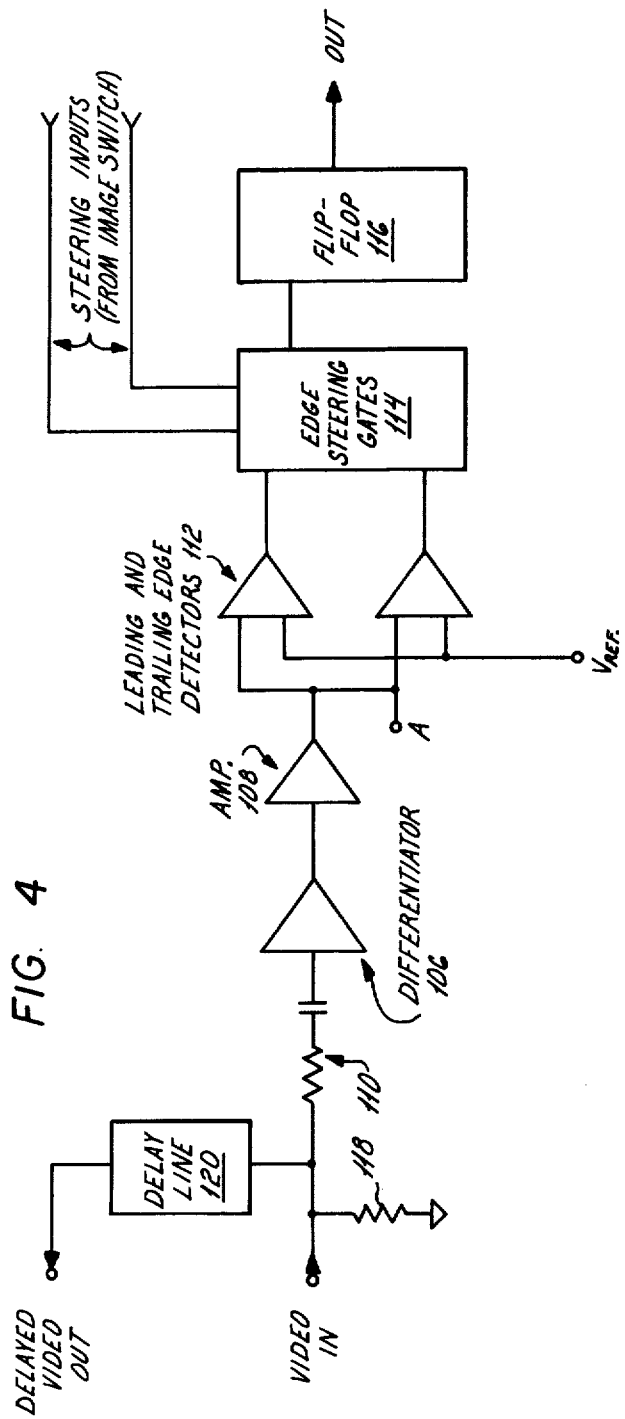
FIG. 4 is a circuit diagram of the video processing section of the video processing circuit.

Referring now to FIG. 4 the video circuit extracts object information from the video envelope by high speed active differentiation. Differentiated pulses are thusly derived for the object's leading and trailing edges by the active differentiator 106 through the RC circuit 110. The leading and trailing edges are then amplified by amplifier 108 prior to conversion to the TTL compatible pulses by detectors 112. The level at which the comparator 112 converts the amplified edge signals to TTL compatible pulses is under direct control of the front panel manual/auto switch. A reference voltage will thusly be provided by either the front panel sensitivity control 46 or the auto sensitivity circuits. The pulses thusly digitized are then directed through the edge steering gates 114. Leading edge and trailing edge pulses may be reversed by the gates 114. This steering is under the direct control of the front panel 'IMAGE' switch. The pulses are reversed when the 'IMAGE' switch is in negative. Objects lighter than the background may then be detected. Placing the 'IMAGE' switch to positive will set 114 such that the leading and trailing edges are processed straight through.

Edge pulses outputted from gates 114 set and reset the flip-flop 116. Video signals representative of the object scanned are thusly converted to a digital pulse by the flip-flop 116 before outputting from this video card.

The video signal is also terminated by the resistor 118 and the delay line 120. The delay line 120 provides a video delay such that flag and aperture signals may be added to the video for real time monitor display.

Figure 5:
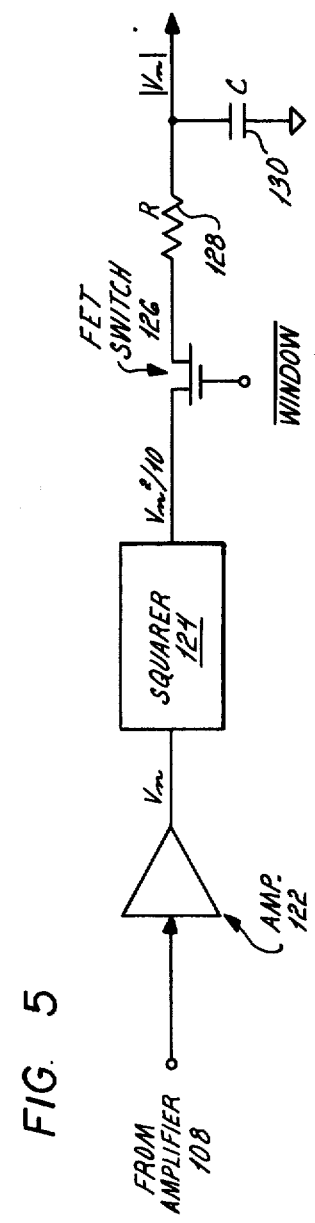
FIG. 5 is a circuit diagram of the noise detector section of the video processing circuit.

In FIG. 5 there is shown the noise detector for the sensitivity circuits. As shown, edge and noise signals at the output of amplifier 108 are further amplified by amplifier 122. This amplified composite signal designated Vn is then squared by the multiplier 124 and outputted as $V_n^2/10$. The function of the noise detector is to detect the magnitude of video noise. During each horizontal scan, the composite video includes an 11 us blanking period. The noise content during this period is blanked out by the FET switch 126 through the application of the inverse window signal to the gate of the FET switch 126. The development of the window signal will be explained hereinafter. The low pass network consisting of the resistor 128 and capacitor 130, averages $V_n^2/10$ for the remaining 53 us, horizontal scan period thusly deriving the average voltage of Vn, namely $|'n|$.

Figure 6:
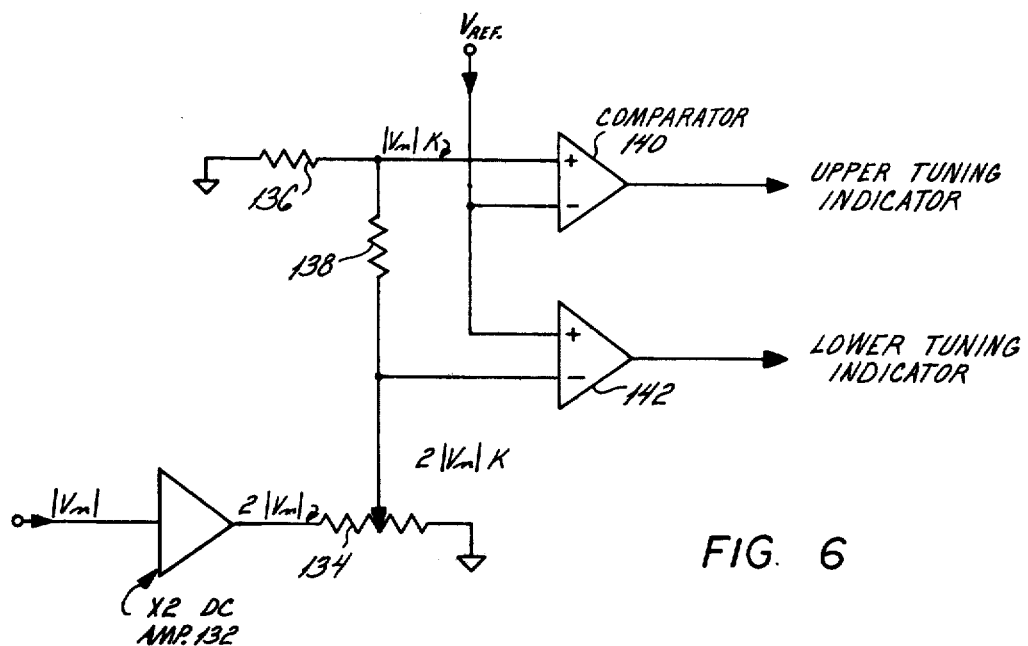
FIG. 6 is a circuit diagram of the manual sensitivity section of the video processing circuit.

FIG. 6 shows the use of the noise voltage manual sensitivity. The average noise voltage $|'n|$ is amplified to $2|Vn|$ by amplifier 132. The output of the amplifier is scaled down by resistor 134 such that the voltage at the arm of the resistor 134 is $2|Vn|K$. The reference voltage Vref is inputted from the arm of the front panel sensitivity control. This voltage also controls the level of the edge sensitivity at the non-inverting inputs of the detectors 112 (FIG. 4). Maximum manual sensitivity is adjusted with the sensitivity control thusly providing Vref at maximum sensitivity. Resistor 134 is then adjusted such that the voltage at the junction of resistor 136 and resistor 138 is the same as Vref. or $|Vn|K$, since resistors 136 and 138 provide a 2:1 voltage divider. The comparator 140 senses Vref and $|Vn|K$. The output of comparator 140 will be low when Vref is $\geq |Vn|K$, thusly providing the upper tuning indicator drive voltage. Comparator 142 supplies the lower tuning indicator drive voltage. Inputs to 142 are Vref and $2|Vn|K$. The output of 142 will therefore be low until Vref is $>2|Vn|K$. A 2:1 range in Vref is thus established for the upper and lower tuning indicators where the upper indicator indicates maximum sensitivity and the lower indicator indicates minimum sensitivity.

Figure 7:
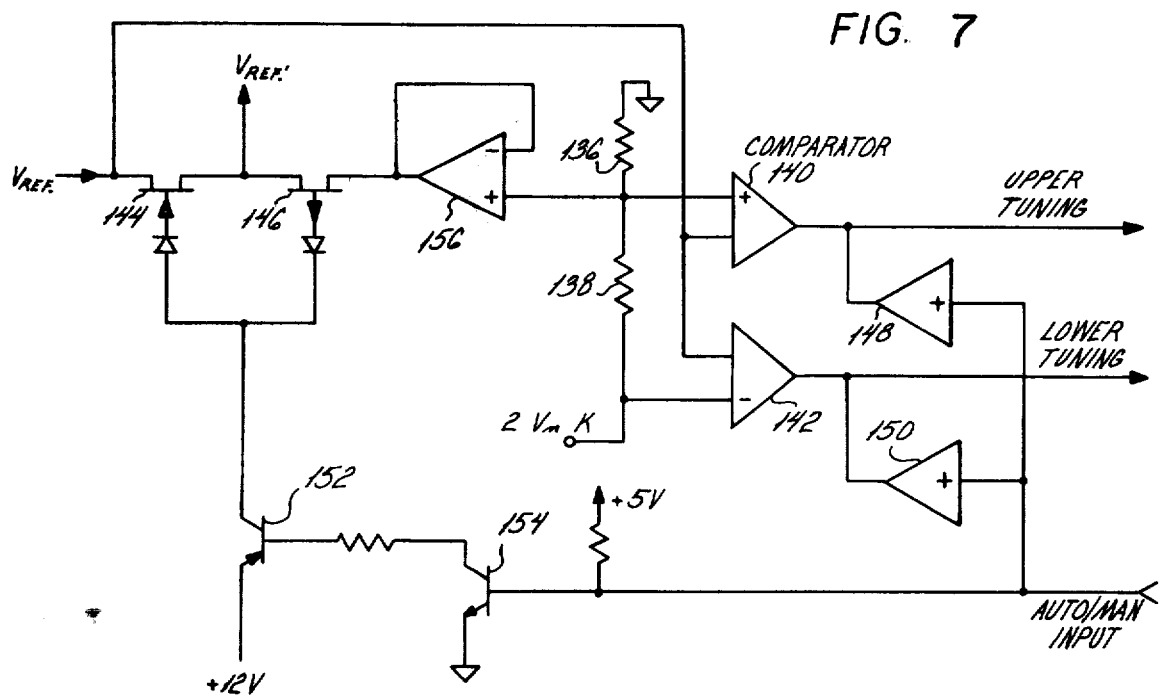
FIG. 7 is a circuit diagram of the automatic sensitivity section of the video processing circuit.

FIG. 7 shows the automatic sensitivity circuit. The front panel auto/manual switch controls the FET switches 144 and 146. A low signal at the auto/manual input indicating auto operation sets the outputs of the non-inverting amplifiers 148 and 150 at a lower value. Since 148 and 150 are connected to the upper and lower tuning indicator lines then both indicators are enabled. The same low signal at the auto/manual input turns the transistors 152 and 154 off thus enabling the FET switch 146. The noise voltage $|Vn|K$ at the non-inverting input of amplifier 156 is coupled through 146 and furnishes the auto generated voltage Vref'. This voltage maintains the edge detectors 112 (FIG. 4) at maximum sensitivity. Placing the auto/man switch to manual switches the transistor 152 and 154 ON, which then turns 146 OFF and 144 ON. The circuit now operates as described for manual sensitivity.

SHIFT CIRCUIT

The output from the video processor is sent to the shift card 84. This card essentially includes three separate functions. The first function receives the horizontal and vertical synchronization signals from the timing control card 80 (to be described hereinafter) as well as receiving the electronic aperture signals from the aperture card 78 (to be described hereinafter) and utilizes these signals in conjunction with an oscillator to provide a window generator and clock driver circuits. These circuits will be described in conjunction with FIG. 8.

The shift card also makes a decision as to which objects should be flagged and counted. The decision is based upon whether the object has been previously flagged or not. In order to make this determination, a data memory is utilized with the signals from each scan line compared with the next successive scan line. This portion is shown in FIG. 9.

Figure 10:
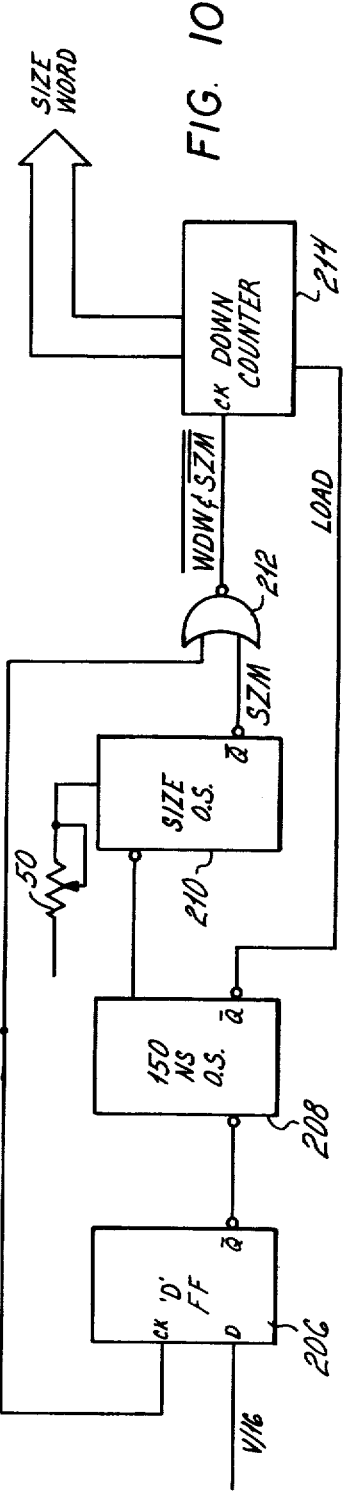
FIG. 10 is a circuit diagram of the size discriminator section of the shift control circuit.

The other criteria is based upon whether the object has exceeded a certain size. The size is preset by means of the size adjustment knob on the front panel. FIG. 10 describes the circuit to carry out this feature. The count output from the shift card 84 is sent to the digital readout simultaneously with the compensated count by the compensator 76 (to be described hereinafter).

Figure 8:
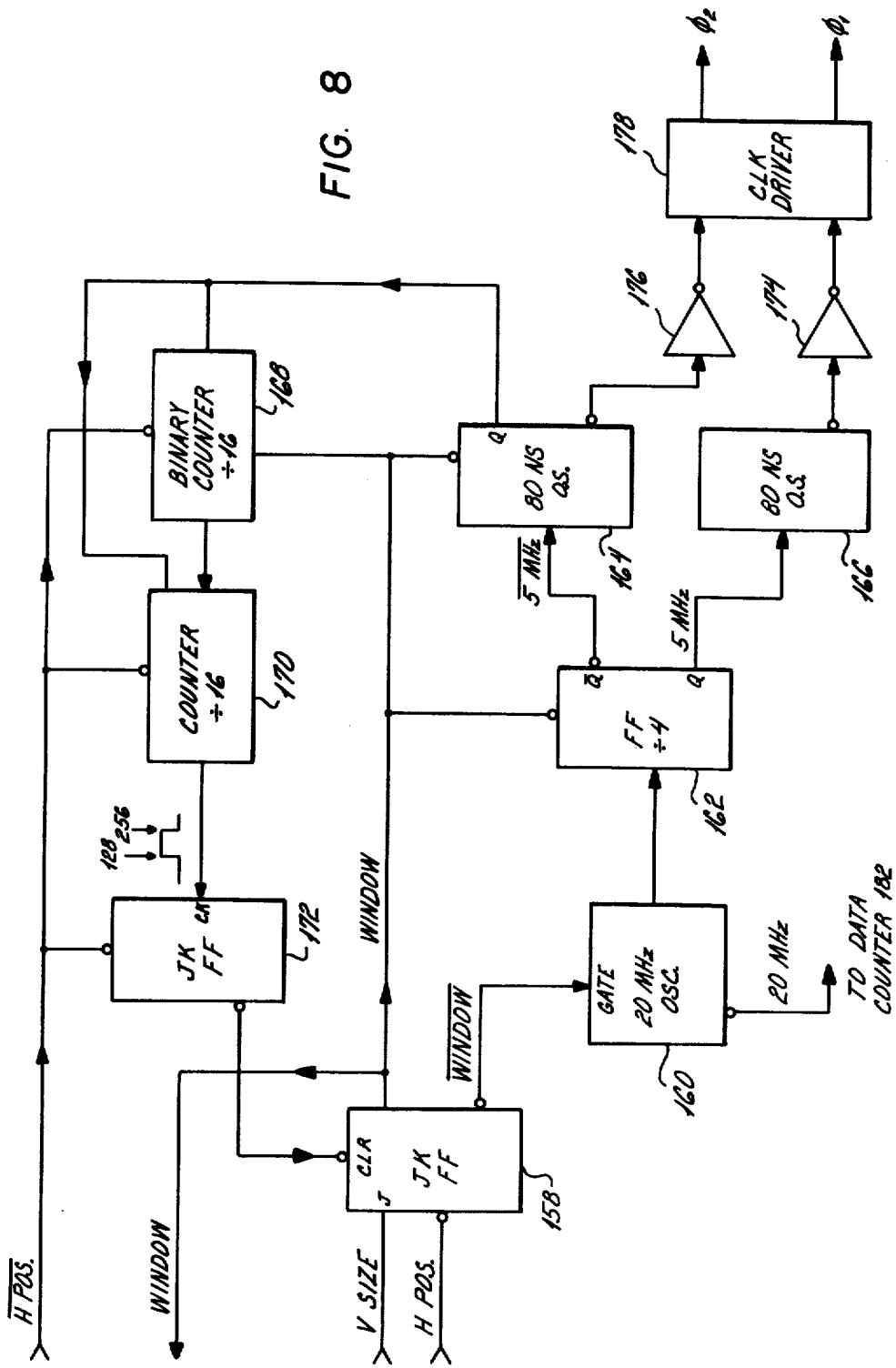
FIG. 8 is a circuit diagram of the oscillator and window generator section of the shift control circuit.

Referring now to FIG. 8, horizontal position pulses occurring during the vertical size period cause the outputs of the J-K flip/flop 158 to change state thereby establishing the window and $\overline{\text{window}}$ periods. The 20 Mhz oscillator 160 is gated on as long as the FF 158 outputs remain in the same state. The 20 Mhz pulses are divided down to 5 Mhz by FF 162. The 5 Mhz Q and $\overline{Q}$ outputs of 162 are directed to the one shot monostables 164 and 166. The monostables 164 and 166 are used to reduce the duty cycle from 100 ns to 80 ns for the shift register clock pulses. The 5 Mhz pulses from 164 are directed to the input of the binary counter 168. Counters 168 and 170 are connected in cascade thereby forming a divide by 256 counter. At the positive transition of the 256th-5 Mhz pulse on the Q output of 164, the simultaneous negative transition at the output of counter 170 will cause the JK flip/flop 172 to clock, thereby terminating the window period through the clear input of FF 158. Gates 174 and 176 respectively invert the drive pulses out of the one shots 166 and 164 and provide the inputs to clock driver 178 which provides the 2 phase signals needed to drive the shift registers 192 and 204 in FIG. 9.

Figure 9:
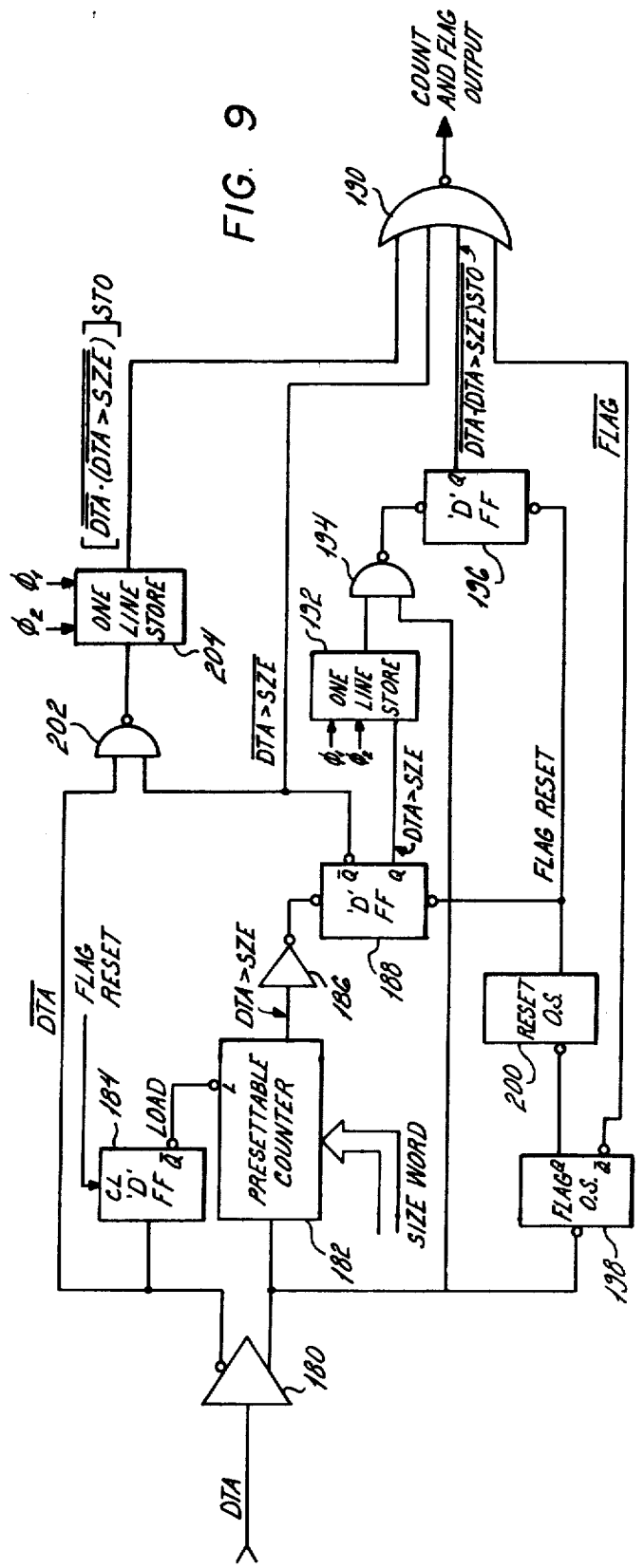
FIG. 9 is a circuit diagram of the data memory and flag determining section of the shift control circuit.

The circuit of FIG. 9 performs the following decisions in a logical way:

(1) The object (data pulse) has ended and generated flag.

(2) The object length has exceeded the size criteria.

(3) The simultaneous events of data and data exceeding size from a previous line has not occurred. (Has the same object been counted before?)

(4) The events of either (data or data exceeding size) from a previous line has not occurred simultaneously with (1). (The object is not ending earlier in time then on the previous line.)

The logical equivalent expressions for (1) through (4) are as follows:

(1) Flag (2) DTA>SZE (3) DTA·(DTA>SZE) STO (4) [DTA·(DTA>SZE)] STO wherein DTA is "Data"; SZE is "size"; and STO is "store". The actual circuitry used for combining (1) through (4) utilizes the inverted expressions and a NOR gate. The circuits operate in the following manner:

Data pulses are directed to a complementary output gate 180. The non-inverting output of gate 180 enables the presettable synchronous counter 182. While enabled, counter 182 will synchronously count on the rising edge of the 20 Mhz clock pulses from oscillator 160 (FIG. 8). The preset inputs may be set either high or low, thereby allowing fifteen programmable size steps. When the data pulse width exceeds the preset size program, a pulse will appear on the counter carry output. The pulse out will be 50 ns wide, and is designated DTA>SZE. The preset inputs of counter 182 are enabled through the load terminal. The trailing edge of the inverting output of gate 180 causes 'D' flip/flop 184 to transfer data to its Q output. Thusly, the load input of counter 182 is enabled at the trailing edge of all data pulses. The load input pulse is terminated by the flag reset pulse at the clear input of FF 184. Information at the preset inputs of counter 182 is transferred to the outputs, during the load period, on the rising edge of the clock pulse.

The DTA>SZE pulse is inverted by gate 186 the output of which causes the 'D' flip/flop 188 to change state through the preset input. The $\overline{Q}$ output 188 $\overline{\text{DTA>SZE}}$, provides the second criteria for flagging through one of the inputs of gate 190.

The DTA>SZE pulse on the Q output of FF 188 is transferred into the one line store shift register 192 for synchronous storage. The DTA>SZE pulse will be advanced through the shift register 192 at a 5 Mhz rate and will be outputted in the same time interval on the next horizontal TV line. Outputs from the shift register 192 are nanded with DTA pulse in gate 194 and provide the preset signal for "D" FF 196. The Q output of FF 196 provides the third criteria for flagging as another input of gate 190. Since FF 196 is reset by the flag reset pulse, then the Q output is normally in the low state representing a 'go' condition for gate 190. A preset signal to this 'D' flip/flop 196 would thereby disable the flag nor gate 190. Therefore, the occurrence of DTA>SZE during a current data pulse represents 'no flag' (i.e., the object has been counted before).

The trailing edges of data pulses at the non-inverting output of gate 180 initiate the flag one-shot 198, for approximately 100 ns. The $\overline{Q}$ output of one-shot 198 provides the first criteria for flagging through one of the inputs of gate 190. The trailing edge of the flag pulse at the Q output of one-shot 198 triggers the flat reset one-shot 200 for approximately 80 ns.

$\overline{\text{DTA>SZE}}$ and $\overline{\text{DTA}}$ are nanded at gate 202. The event of either Data or DTZ>SZE will thereby be entered into one line store of shift register 204 for synchronous storage. The output of shift 204 comprises the fourth criteria for flagging through an input of gate 190. When the same object ends earlier in time on succeeding TV lines, which is the general case for round objects that have reached a maximum width, the fourth criteria will negate multiple flagging.

FIG. 10 describes the size discriminator circuit. Vertical size pulses are divided by 16 and are directed to the D input of 'D' type flip/flop 206. Window pulses (from FIG. 8) at the clock input FF 206 will cause it to change state. Observe that after the D input of FF 206 goes high, the next window pulse will cause the $\overline{Q}$ output to toggle low. FF 206 will remain low until V/16 goes low which will occur 266 ms. later. The transition of FF 206 $\overline{Q}$ from high to low will trigger the one-shot 208 for approximately 150 ns. Moreover, one-shot 208 will only be triggered once each 533 ms [(V/16)·2].

The trailing edge of the 150 ns. pulse from one-shot 208 will trigger one-shot 210 for a period determined by the front panel size control 50.

The $\overline{Q}$ output of one-shot 210 and the window pulses serve as inputs to the NOR gate 212. Positive going output pulses from gate 212 will occur when both the window (WDW) and size magnitude (SZM) inputs are low. These pulses serve as clocks for the down counter 214. The 150 ns pulse at the $\overline{Q}$ output of one-shot 208 will load the counter 214. Since all the parallel load inputs of counter 214 are high, then all the outputs of counter 214 will be high after clocking. Clock pulses to counter 214 will cause it to count down.

For example, when all outputs of the down counter 214 are high, the binary equivalent will be 15. After one clock pulse, the first output goes low and the binary output will be 14. After two clock pulses the binary output is 13, etc.

The outputs of counter 214 serve as parallel inputs to the presettable counter 182 of FIG. 9. It can now be seen how the magnitude (width) of a size one-shot can be translated into digital size information for the counter 182.

The size-down counter-information is updated every other V/16 period or approximately twice each second.

The V/16 period is used to generate "count 16 displays sync" when the count button is actuated. However, the 16 displays sync can only be generated on the falling edge of the V/16 period, whereas the size information is updated on the rising edge of the V/16 period. Therefore, size information will not be changing during count.

The output from the NOR gate 190 can then be combined with the aperture window which will hereinafter be described in connection with the aperture card 78. This will then provide the flags and counts only during the aperture window. When the compensator card is plugged in, the output will first go through the compensator and the output will pass through further gating so that it will be the compensated output which is provided to the readout. However, when the compensator card is unplugged, then the pulses from the output of gate 190 will go directly to the readout card.

ABSOLUTE AREA CIRCUIT

The absolute area card 82 accepts digitized video pulses from the video processor 74 and generates a short pulse on both the rising and falling edges of the digitized video. These output pulses, when superimposed on the monitor display will create a bright silhouette around all detected objects within the electronic aperture.

The main function of the absolute area is to measure the area of silhouetted object regions within the electronic aperture. Also, the area of the aperture itself may be measured. Area output is a serial pulse train accumulated over 16 television fields and inputted to the readout card 70. Scaling of the area result is variable with both fine and coarse adjustment.

Figure 11:
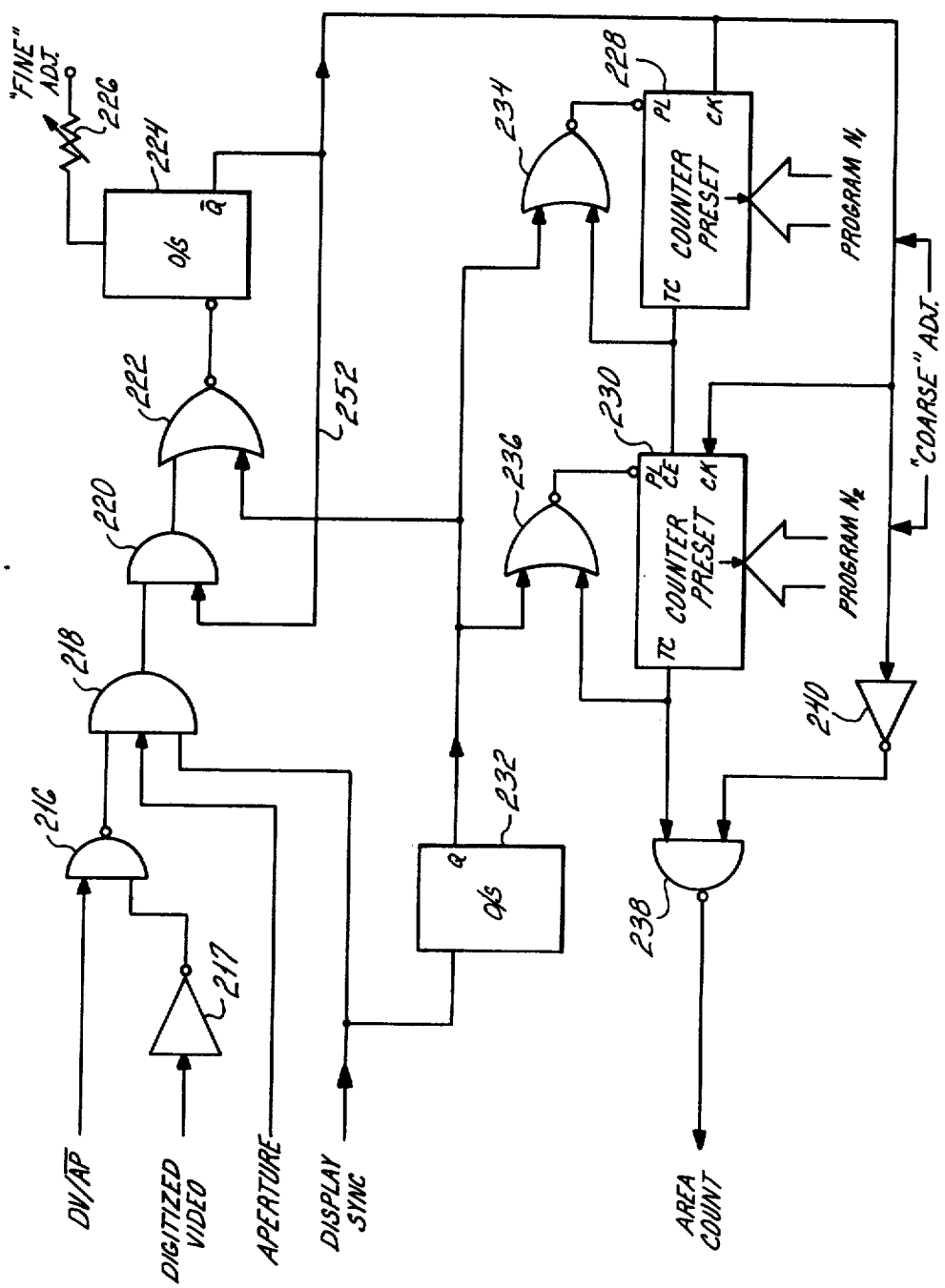
FIG. 11 is the area calculator section of the absolute area circuit.

Referring to FIGS. 11, 13 and 14, the area calculator will be described. With the DV/AP line at gate 216 at a high level, the digitized video pulses, electronic aperture pulses, and 16 display sync pulse, will be anded together by gates 217 and 218. This anded output is used to enable a gated variable oscillator comprised of gates 220 and 222 and one-shot 224. The oscillator frequency is adjustable with resistor 226 and is only activated for times corresponding to system detected objects within the electronic aperture for 16 television fields.

The oscillator output is used to clock synchronous binary 4-bit counters 228 and 230. These counters are initialized at the beginning of a 16 display sync interval by parallel loading the 4-bit program values $N_1$ and $N_2$. The program values are entered by means of switches and pull-up resistors. This reset function is illustrated in the FIG. 14 timing diagram. The rising edge of the 16 displays sync pulse inputted at one-shot 232 causes its Q output to go high for about 1 usec. A high to low transition occurs at the output of gate 222 which triggers one-shot 224. Thus one clock pulse is caused to appear at the counter clock inputs at the beginning of 16 displays sync. At the same time the output from 232 has enabled the counter parallel load inputs through gates 234 and 236 and the counters are synchronously preset as required.

At the conclusion of the one-shot 232 output, gates 222, 234 and 236 become simple inverters which permit normal function of the gated oscillator circuit and which loop the total count outputs of the counters back to the parallel load inputs. Counter operation under these conditions is shown in FIG. 13. The gated clock is assumed to be active and program inputs $N_1$ and $N_2$ are 13 and 14 respectively. After the total count output of counter 228 goes high in state 15, synchronous with the clock, counter 228 will parallel load on the next positive clock transition and the total count output will immediately return to a low level. After parallel loading the value $N_1 = 13$, two more clock inputs will bring the counter back to state 15 and the cycle repeats. The counter is seen to divide the clock input by 3. The total count output of counter 228 enables the clock input of counter 230. The total count output of counter 230 is high when it is in state 15, the clock is high and the total count output of counter 230 is high. Counter 230 can only count up when the total count output of counter 228 is high and the clock input makes a positive transition. Assuming counter 230 has previously been parallel loaded with $N_2 = 14$, it will reach state 15 at the end of the next total count output from counter 228 as shown in FIG. 13 at the time $T_4$. At the end of the next total count output of counter 228, counter 230 will parallel load and the procedure repeats. The narrower total count output pulses from counter 230 are masked by gating with the inverted clock with gate 238 and 240. The resultant output of gate 230 is seen to be the counter 228 total count output divided by two. The overall algorithm for the two counters from clock input pulses $C_1'$ to the gate 238 output, $C_o'$ is therefore:

$$C_o = C_1/(16 - N_1)(16 - N_2)$$

Thus objects which produced digitized video within the electronic aperture will gate an overall clock circuit on, which has fine continuous adjustment through resistor 226 and coarse wide-range adjustment by programming different values for $N_1$ and $N_2$. The gating repeats for 16 television fields and when the gate 238 output is fed to the readout card counters a readout display proportional to the total object area will occur.

Note that if the DV/AP line is low then the area calculator will measure aperture area since the digitized video input to gate 218 is forced high.

Figure 12:
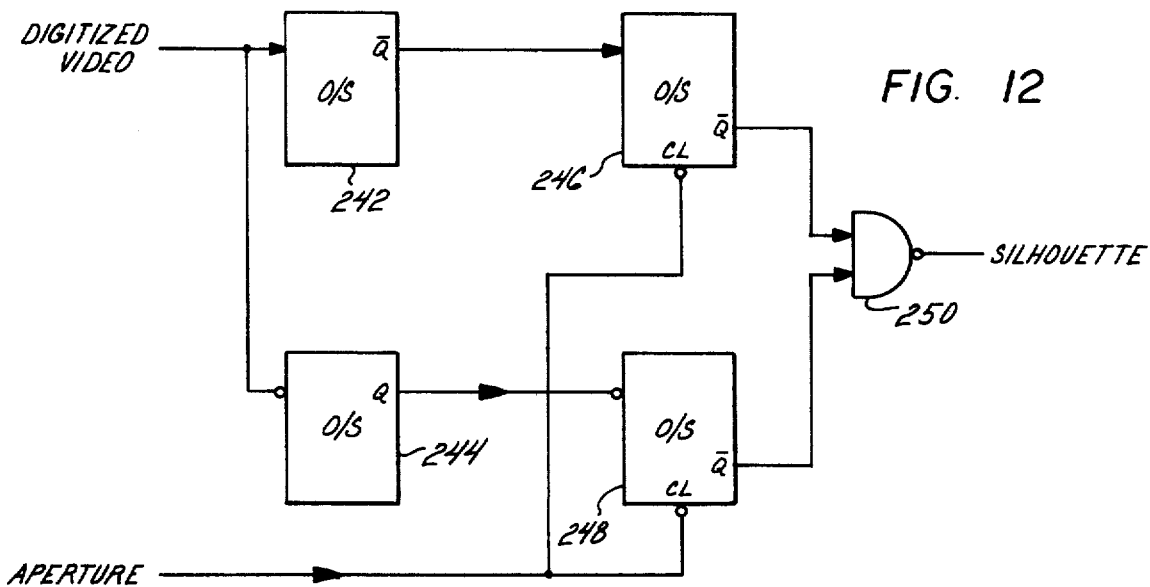
FIG. 12 is a circuit diagram of the silhouette generator section of the absolute area circuit.

As shown in FIG. 12 a silhouette generator is incorporated which delays the rising and falling edges of digitized video pulses with one-shots 242 and 244 before triggering one shots 246 and 248, respectively, to produce short silhouette pulses. The output pulses are mixed by gate 250 whose output may be superimposed on the monitor display to create a bright silhouette around all objects whose area will be measured. The delays inserted into the silhouette by one-shots 242 and 244 compensate for system delays to create a properly registered display.

Not shown in the block diagrams is a data selector which receives the outputs from gates 238 in FIG. 11 and 250 in FIG. 12. Normal system count and flag signals can be replaced by the absolute area count and silhouette pulses respectively when the data selector is triggered. Thus, the area or count modes for the system are selected by the level change at the data selector by means of a front panel grounding switch and pull-up resistor. In systems with a data selector on the shift card, silhouette and area outputs are directly available.

When a very high stability clock is required it can be inserted and the connection from the outputs of one-shot 224 to gate 220 on line 252 is broken. When gate 220 is gated on by a high level at its input, the one-shot 224 will be slaved to the oscillator output and the output from 224 will be the same frequency as the output at the oscillator. All other area card functions are unchanged.

PERCENT AREA CIRCUIT

Instead of the absolute area card 82 which was heretofore described, a percent area card can be utilized. The percent area card accepts digitized video pulses and generates a short pulse for both the rising and falling edges of the digitized video. These output pulses, when superimposed on the monitor display, will create a bright silhouette around all detected objects within the electronic aperture.

The main function of the percent area circuit is to measure the ratio of silhouetted object area to electronic aperture area. The ratio is averaged during 16 television fields and outputted as a serial pulse train to the readout card. The ratio is scaled to cause readouts of 0 to 100, or percent area.

Figure 15:
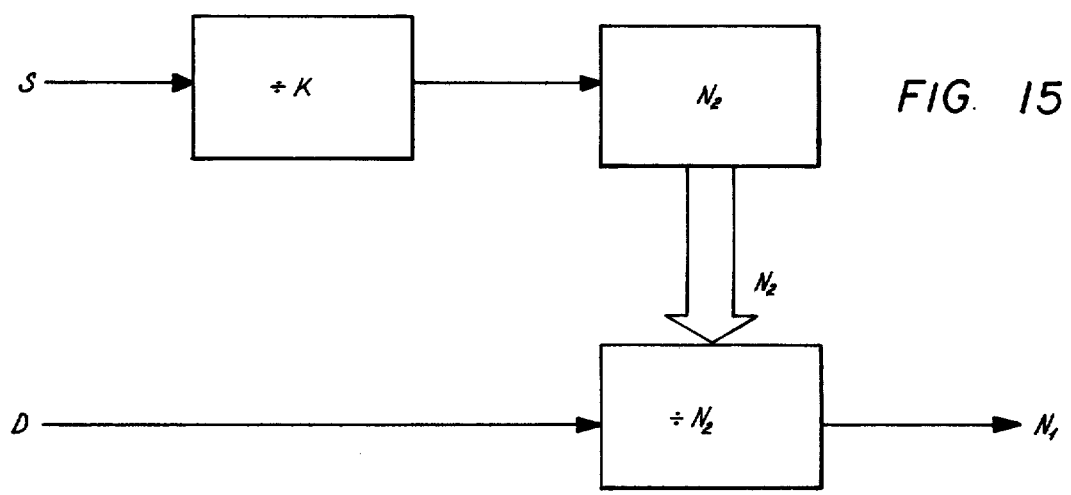
FIG. 15 is a block diagram useful in explaining the percent area circuit.

The theory upon which the percent area card is based is as follows: Consider the following simplified version of percent area calculator as shown in FIG. 15. (This sketch excludes any divide-by-8 averaging counters which are not relevant here).

In FIG. 15 and in the following equations:

$S =$ A number of count pulses proportional to the electronic aperture area;

$D =$ A number of count pulses proportional to the area of objects detected within the aperture;

$\div K =$ A fixed counter that divides by K. $K = 100$ in the present system.

$N_2 =$ A counter register to hold the output of $\div K$, which is defined as a number of pulses $N_2$;

$\div N_2 =$ A programmable divider that divides D by $N_2$, with an output equal to a number of pulses $N_1$.

Ideally: $N_2 = S/K$, $N_1 = D/N_2$ and so $N_1 = (D/S)K$.

However, fractional remainders in calculations by the dividing counters are lost. Any number of pulses, S can be represented by $$S = KN_2 + R_1$$

where $N_2 = 0, 1, 2 \ldots \infty$ and $R_1 = 0, 1, 2 \ldots (K-1)$.

The remainder, $R_1$ will be lost and the portion, $N_2$ of S, will be applied to the programmable divider.

Now consider D, given by the following:

$$D = nS/K = n/K(KN_2 + R_1)$$

$n = 0, 1, 2 \ldots K$.

That is, all values for D which are exact integral "percentages" of any given S are considered. In order for a correct result to be output we must obtain $N_1 = n$. However:

$$N_1 = \frac{D}{N_2} = \frac{n}{KN_2}(KN_2 + R_1)$$

$$= n + \frac{nR_1}{KN_2} = n + \epsilon$$

The correct output occurs only if we insure that $\epsilon < 1$. If this is true, the $\div N_2$ counter will output n for $N_1$ as required:

$$nR_1/KN_2 < 1 \text{ or } nR_1 < KN_2$$

$$(nR_1)\max = K(K-1)$$

Thus, $K(K-1) < KN_2$ is required or, $N_2 > K-1$ which means $N_{2\ min} = K$ is required. This constraint creates a minimum value of S, which if $R_1 = 0$ is given by $K^2$. For $K = 100$, and referring to the present system schematic a count of at least 10000 must be input to the second counter divider 260 in FIG. 16, on each area measurement to meet the above criteria for correct operation.

Intermediate values of D from those specified must always give answers accurate within one output count of $N_1$.

Figure 16:
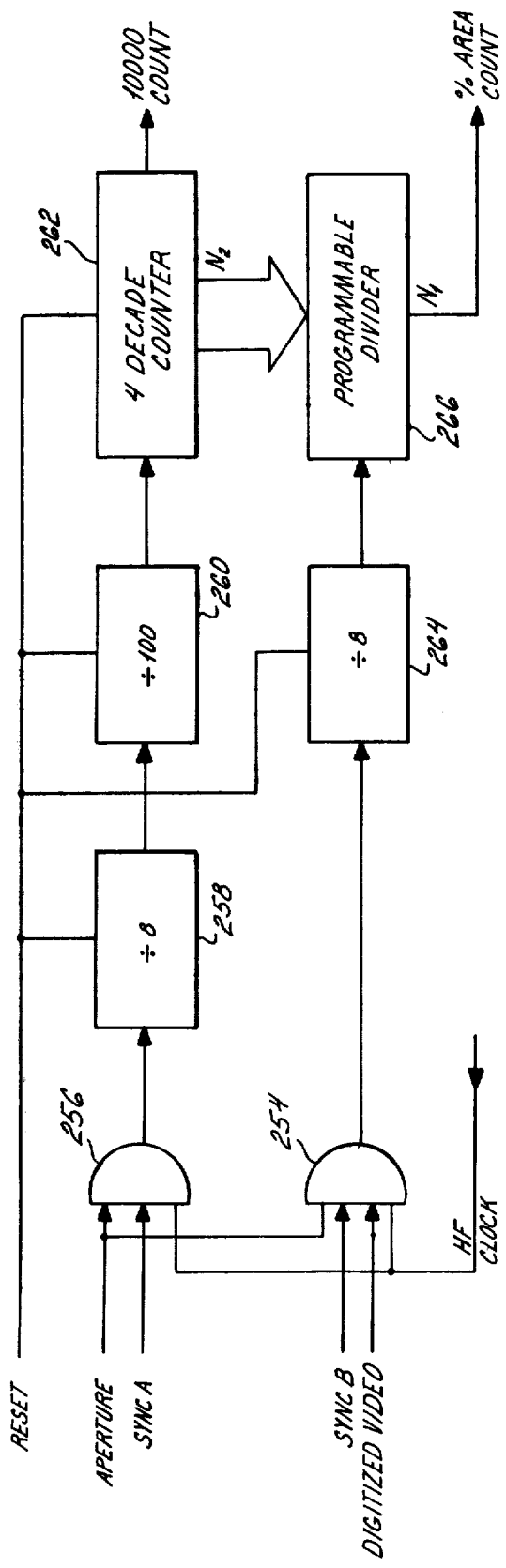
FIG. 16 is a circuit diagram showing the percent area calculator section of the percent area circuit.
Figure 18:
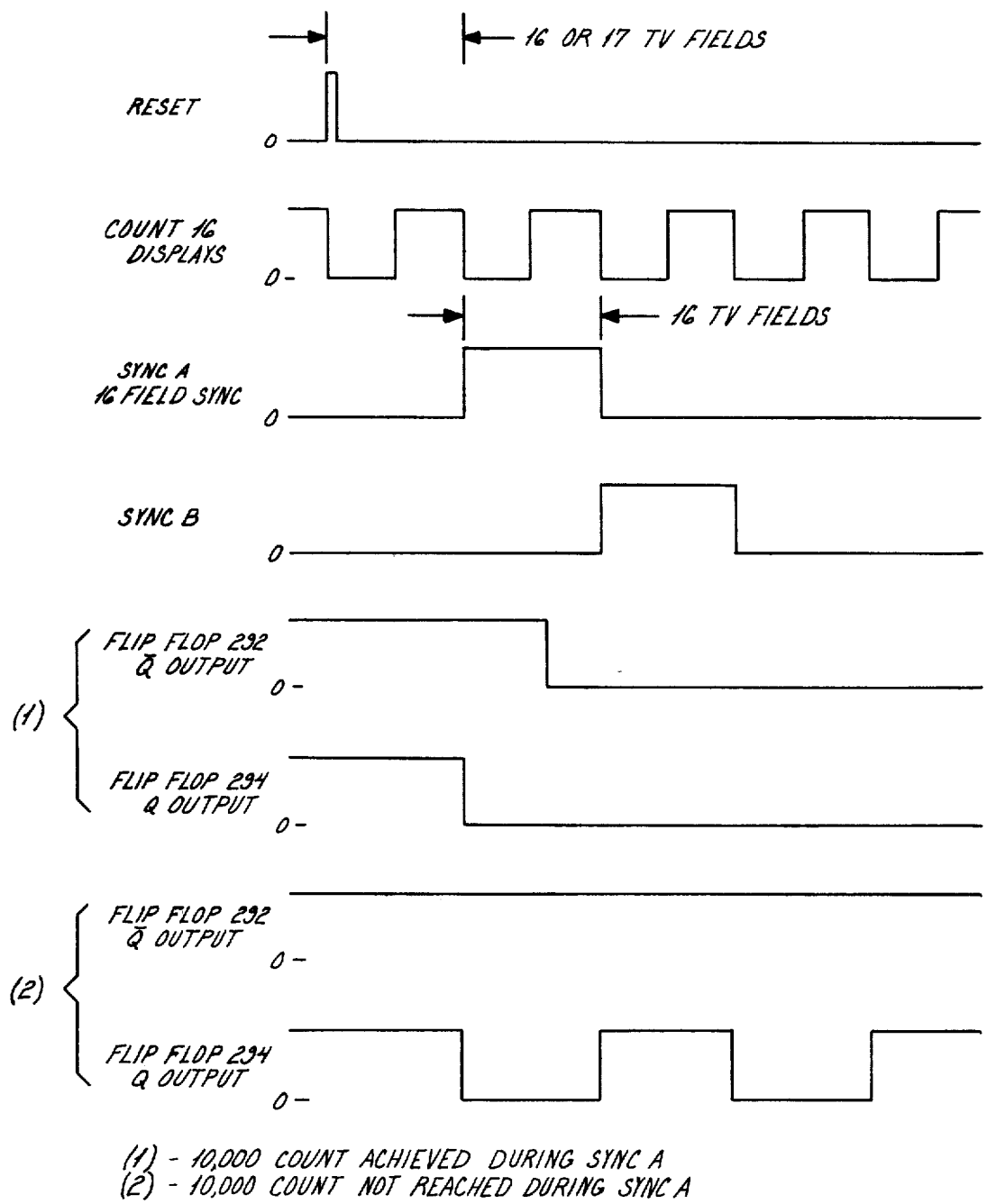
FIG. 18 shows the timing diagram for use in explaining the operation of the percent area circuit.

FIGS. 16 and 18 show the details of the percent area card. The digitized video pulses and the electronic aperture pulses are used to enable a high frequency clock to the outputs of gates 254 and 256. The total number of pulses over an integral number of television frames will be proportional to the area to be measured.

As shown in FIG. 16, a 16 field duration sync pulse called SYNC A with timing shown in FIG. 18 is ANDED with aperture and high frequency clock pulses to produce aperture clock pulses. The aperture clock pulses are scaled by counter-dividers 258 and 260 and then inputted to a 4 decade BCD counter 262. If the number of aperture clock pulses occurring during one television frame (two fields) is represented by $A_2$, then the number stored in counter 262 at the conclusion of the SYNC A pulse will be $N_2$, given by:

$$N_2 = 8 \times A_2 \div 8 \div 100 = A_2/100$$

Also shown in FIG. 16 is a field duration sync pulse called SYNC B with timing shown in FIG. 18 that is ANDED with digitized video, aperture, and high frequency clock pulses to produce digitized video clock pulses. The digitized video clock pulses are scaled by counter-divider 264 and then inputted to a programmable divider chain 266. The serial output of 264 is divided by the number $N_2$ which is presented in parallel to the programmable divider chain 266. If the number of digitized video clock pulses occurring during one television frame is represented by $A_1$, then the number of output pulses $N_1$ of the programmable divider 266 is seen to be:

$$N_1 = 8 \times A_1 \div 8 \div N_2 = (A_1 \times 100/A_2)$$

Thus, serial pulse train $N_1$ represents silhouetted object area as a percent of electronic aperture area, determined as an average over 16 television fields or 8 television frames.

Figure 17:
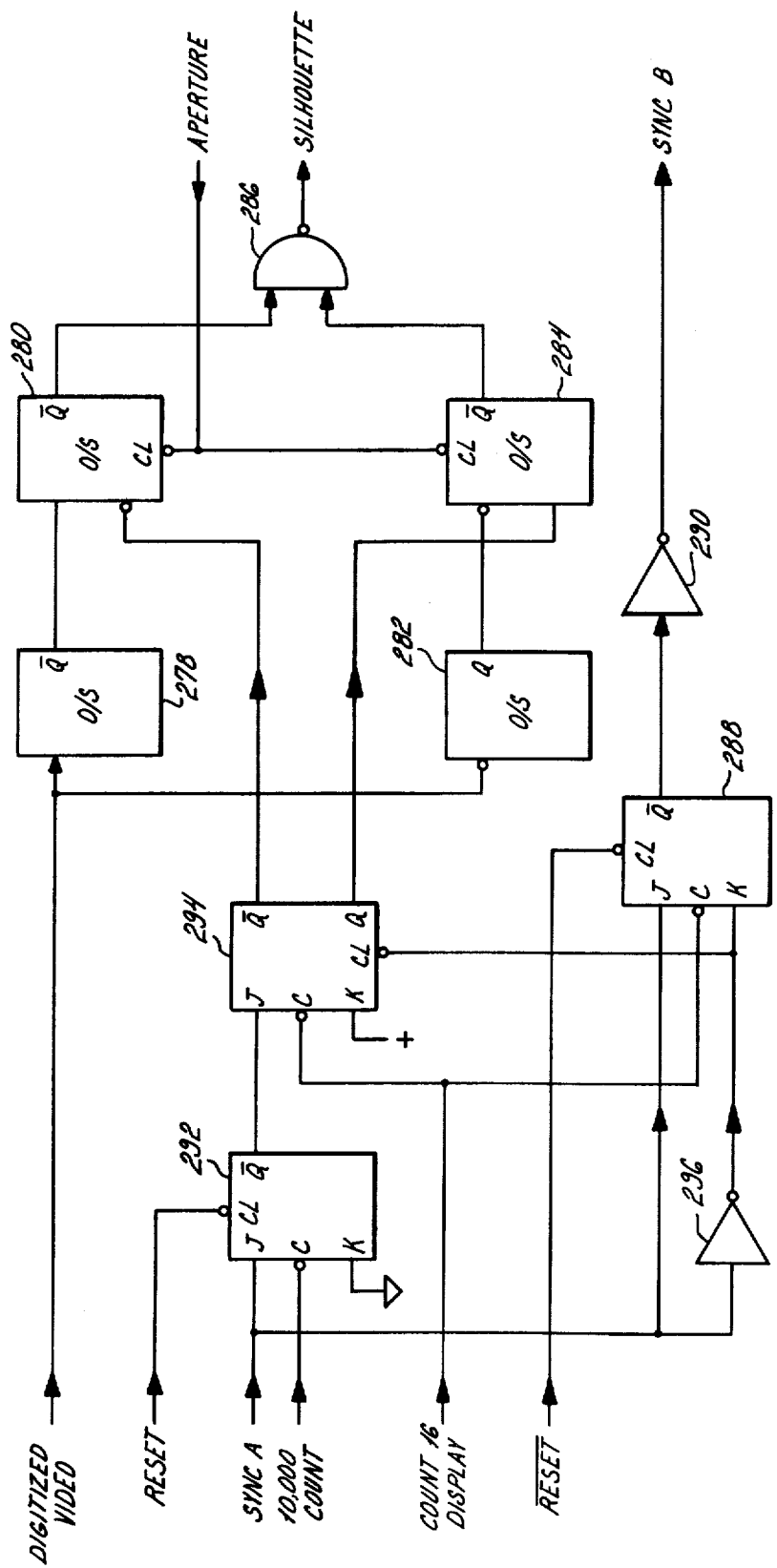
FIG. 17 is a circuit diagram of the control circuit and silhouette generator section of the percent area circuit.

For the control circuits and the silhouette generator refer to FIG. 17 and FIG. 18.

Digitized video pulses are presented to a silhouette generator comprised of one shots 278, 282, 284 and 280. One shot 278 delays the rising edge of digitized video before it is used by one shot 280 to produce a silhouette pulse. Similarly, one shot 282 and 284 produce a delayed silhouette pulse corresponding to the falling edge of digitized video pulses. The two silhouette pulses are mixed by gate 286 to form the final silhouette pulses. The silhouette pulses are confined to the electronic aperture by unclearing one shots 280 and 284 with the aperture pulses.

The SYNC A pulse which occurs from zero to 16 TV fields after the system reset pulse (which is initiated by count push button depression) is shown in FIG. 18. Also available to the percent area card is the count 16 displays clock which changes state every 8 fields. After SYNC A pulse goes high the JK flip-flop 288, Q output, will clock high on the next falling edge of the count 16 displays pulse train. Sixteen fields later the $\overline{Q}$ output from the flip-flop 288 will clock low since SYNC A will be low. A buffered version of the output of 288 is provided by gate 290 which is the SYNC B pulse described earlier.

The percent area calculator requires a minimum aperture clock input count to be accurate. At least one negative transition will occur during the SYNC A time at the ÷100 output of four decade counter 262 (FIG. 16) if at least 10000 single TV frame aperture clock pulses have occurred. This transition will clock flip-flop 292 to a low when SYNC A is high as shown in FIG. 17 and situation (1) of FIG. 18. This will prevent flip-flop 294 from toggling on the count 16 displays pulses after the $\overline{SYNC\ A}$ level to the clear input of flip-flop 294 from gate 296 returns to an inactive high state. Thus, if minimum aperture area is not obtained and the $\overline{Q}$ output of 292 remains high at the conclusion of SYNC A then 294 will toggle at approximate quarter second intervals. This is shown as situation (2) in FIG. 18. Note in FIG. 17 that the outputs of flip-flop 294 are used to enable the silhouette generator through inputs to one shots 280, 284. If the $\overline{Q}$ output of 294 is low, the silhouette is enabled. When 294 toggles, the silhouette will be alternately enabled and disabled at the toggle rate and cause an apparent flashing of the silhouette as presented on the monitor display. This situation can only be cancelled when aperture area is increased and a system reset pulse is initiated to clear the flip-flop 292.

Not shown in the block diagrams is a data selector. Normal system count and flag signals can be replaced by the percent area count and silhouette pulses respectively when the data selector is energized. Thus, the area or count modes for the system are selected by level change at the data selector by means of a front panel grounding switch and pull-up resistor.

The system and display reset pulse as shown in FIGS. 16 and 17 is used to clear all electronic aperture area scaling and storage counters prior to taking a new percent area reading. The inverted reset pulse also clears 288, the SYNC B flip-flop.

Counter 264, the digitized video clock pulse scaler, is also cleared by the reset pulse. The programmable divider chain 266 is essentially disabled until SYNC B pulse arrives.

COMPENSATOR CIRCUIT

Most circuitry on the compensator card is devoted to modifying the 16 field count from the shift card. The count is corrected upwards in magnitude in one percentile steps from zero to 100%. The percentage is selected by a dual front panel thumbwheel switch with a nines complement output code.

Miscellaneous circuitry includes a divide-by16 counter which outputs a negative edge to the control card for every 16 vertical size pulses received from the control card. This 16 display sync signal is used as described under the control card description to develop an enable pulse of exactly 16 television fields duration. This pulse gates object count pulses from the shift card to the compensator card and occurs once after each count push button depression.

Figure 19:
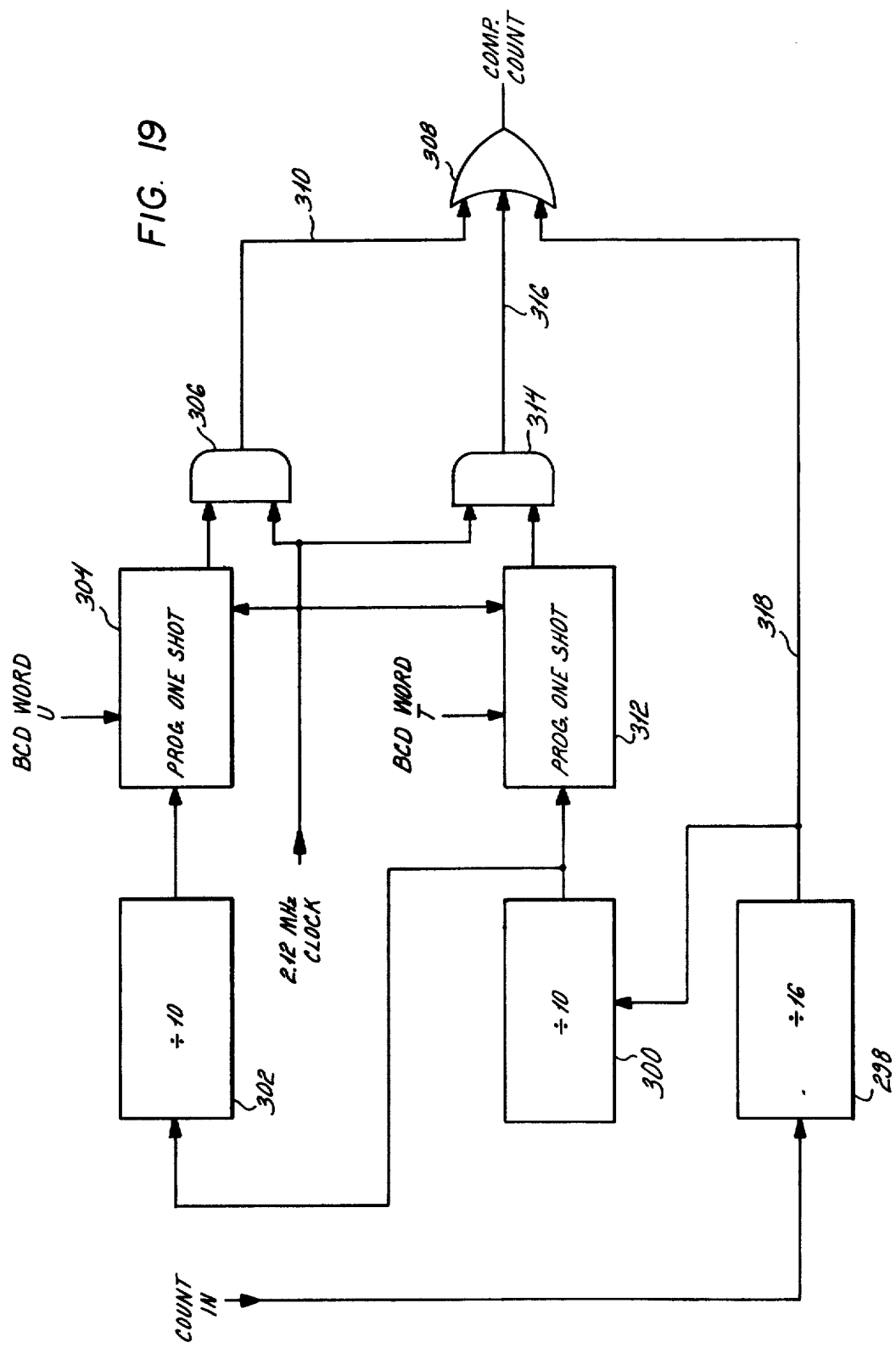
FIG. 19 is a circuit diagram of the count compensator circuit.
Figure 20:
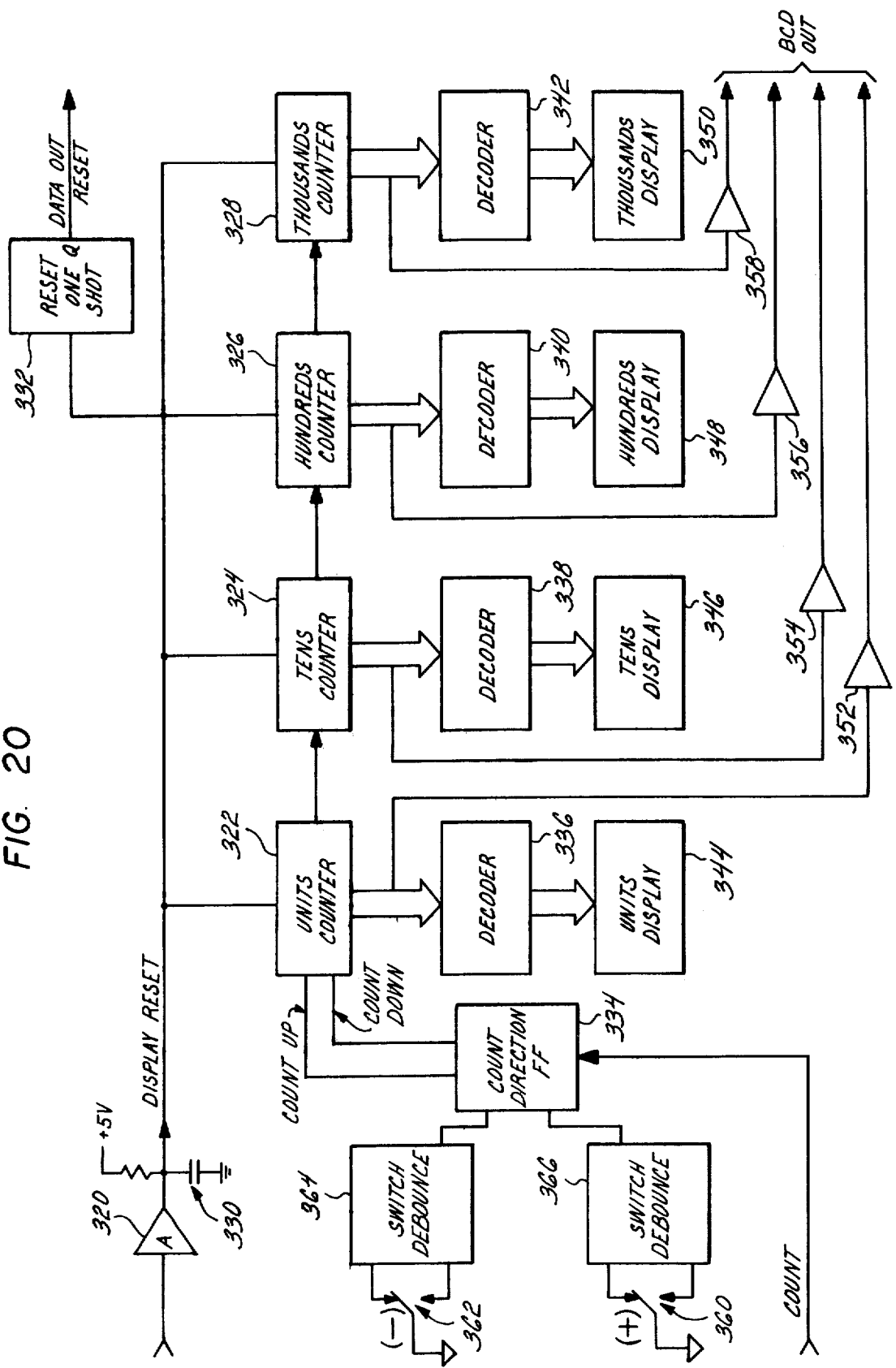
FIG. 20 is a circuit diagram of the readout circuit.

FIG. 19 depicts the count compensation circuitry in block form. Object count pulses from the shift card, gated on for 16 television fields are divided by 16 by divider 298 and then divided by 100 by dividers 300 and 302. The programmable one-shot 304 enables gate 306. The units portion of the thumbwheel compensator switch programs the one-shot 304 to enable 306 for U 2.12 Mhz clock periods. U is the thumbwheel number. Thus, every 1600 count input pulses result in U pulses from gate 306. The output of 306 is narrowed and inputted to OR gate 308 on line 310.

The output of counter 300 triggers a programmable one-shot comprised of 312. The tens portion of the thumbwheel compensator switch programs this one-shot to enable gate 314 for T 2.12 Mhz clock periods. T is the thumbwheel number. Thus, every 160 count input pulses result in T pulses at gate 314. Gate 314 outputs to gate 308 on line 316.

The output of 298 is also inputted to gate 308 on line 318. The overall circuit transfer function to the output of gate 308 is:

$$16C\left[\frac{1}{16}\times\frac{1}{100}\times U + \frac{1}{16}\times\frac{1}{10}\times T + \frac{1}{16}\right] =$$

$$C\left[\frac{U}{100} + \frac{T}{10} + 1\right] = 1.TU \times C$$

where:
C = The actual object count
16C = The count input to the compensator card.

READOUT CIRCUIT

The readout card 70 provides a visual display of object counts. There is provision for manually modifying the count one digit at a time. Moreover, the total count is outputted in BCD for use with external computing equipment.

The display reset pulse from the control card is buffered by amplifier 320 to the reset inputs of decade counters 322, 324, 326 and 328. Noise pulses which might occur on the reset lines are eliminated by the RC time constant of filter 330. The trailing edge of the 50 us reset pulse causes the one shot 332 to one shot for approximately 450 ms. The pulse at the Q output of 332 is then buffered before outputting as the data output reset. This 450 ms period serves to inform an external device that a new count is forthcoming. A set-reset flip-flop 334 sets the counter chain 322–328 to either count up or count down.

Decoders 336–342 decode the BCD outputs of counters 322–328 to drive the seven segment displays 344–350. The counter BCD outputs are buffered by the drivers contained in amplifiers 352–358.

Tallied counts may be modified with the plus and minus push buttons 360 and 362. Debounce circuits 364 and 366 serve as cross coupled latches for the (−) and (+) push buttons respectively. The set-reset flip-flop 334 is set up through either the (−) input thusly enabling down counting or the (+)input thusly enabling up counting. A depression of either the (+) or (−) buttons generates a low to high transition at 334 output which causes the monostable multivibrator to one-shot thusly providing one count to be added or subtracted from the counter chain.

APERTURE CIRCUIT

Figure 21:
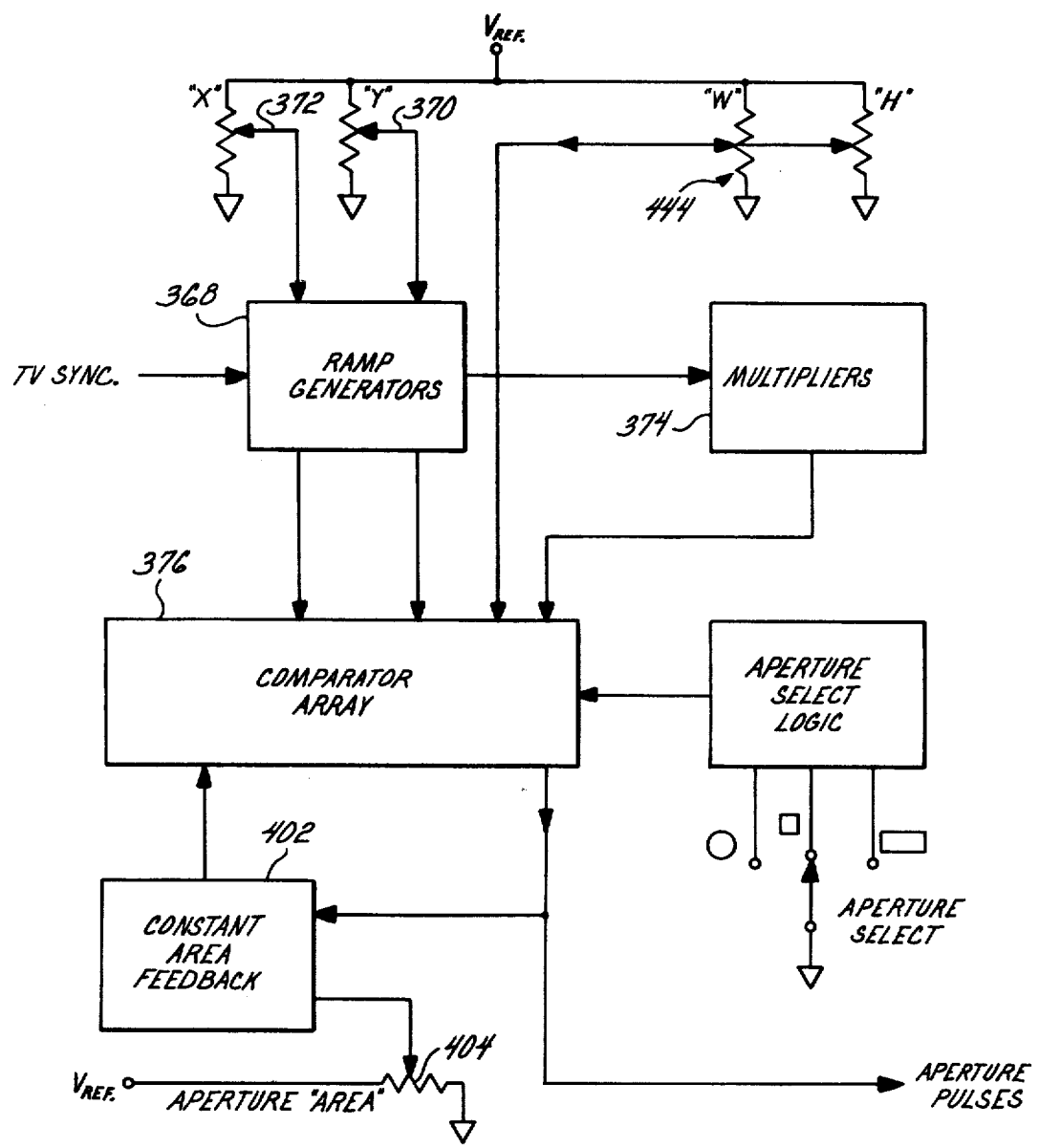
FIG. 21 is a block diagram of the aperture circuit.

Referring now to FIG. 21, there will be generally explained the operation of the Aperture Card 78 in selectively isolating a predetermined area of a desired size and at a selected position on the monitor display. The video raster is treated as an X-Y coordinate system with an unspecified origin. As the raster is swept vertically from top to bottom a corresponding voltage ramp is generated by ramp generator 368. The ramp is forced to start at some negative value chosen by the Y-position control 370. The voltage values of the ramp will then correspond to specific coordinate values along the vertical or Y-axis of the raster. These values will include zero, the origin. By changing the location of the zero value on the fixed peak to peak amplitude ramp with an adjustment of the Y-position control 370, the origin may be shifted vertically.

The same operations of producing a position coordinate ramp are used for horizontal sweeps of the video system by using the X-position control 372 and the ramp generator 368.

In this way any position on the raster can be identified with X-Y coordinate values that correspond to specific voltage values on the vertical and horizontal ramps.

The equation for a circle in an X-Y coordinate system is:

$$(X-Xo)^2 + (Y-Yo)^2 = R^2$$

where:
R = The radius of the circle;
Xo, Yo = The X and Y coordinates of the origin;
X, Y = The X and Y coordinates of points on the circle itself.

To describe the circle and all that is contained within it, this equation is slightly modified to:

$$(X-Xo)^2 + (Y-Yo)^2 \leq R^2$$

Now that voltage equivalents to the variables on the left side of this last equation have been developed, the entire equation may be developed electrically. $(X-Xo)$ is given by the horizontal ramp and $(Y-Yo)$ by the vertical ramp. Xo and Yo are adjustable by the X and Y position controls respectively.

The ramps are squared by means of 4 quadrant multipliers 374 and their squares then summed with the help of an operational amplifier.

If the waveform just created at this point is compared to a variable DC voltage (which corresponds to $R^2$) by means of a voltage comparator 376, such that an output pulse occurs for all times that the sum of squares is less than the DC voltage, the required circle will have been synthesized. If the comparator output pulses are used to modulate the monitor's video input, a fully shaded circle will appear on the raster. These digital pulses may also be used to gate the flags that produce count sums in the readout card so as to restrict counting to the circular region or aperture just described.

Figure 23:
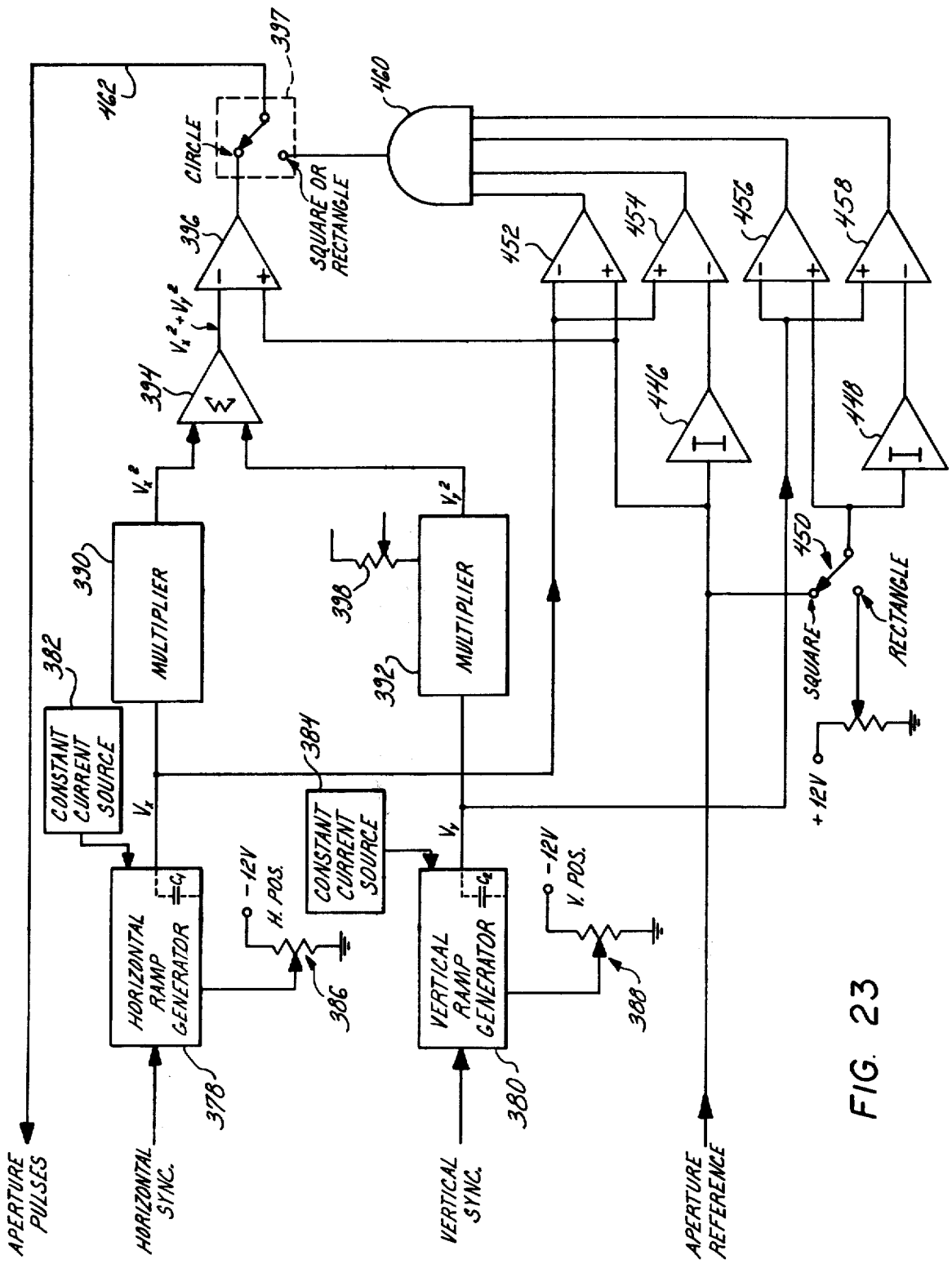
FIG. 23 is a circuit diagram of the aperture generator section of the aperture circuit.

Referring to FIG. 23, the signal at the input to the horizontal ramp generator 378 is a horizontal sync signal and that at the vertical ramp generator 380 is a vertical sync signal. In each ramp generator is included a capacitor $C_1$ and $C_2$, respectively. The sync signals reset capacitors $C_1$ and $C_2$ to zero for a short time just after the start of the television drive signals. Constant current sources shown schematically at 382 and 384 then charge $C_1$ and $C_2$ with a resultant linear voltage ramp. During this constant current charging, one end of capacitors $C_1$ and $C_2$ is held at some negative voltage selected by the vertical and horizontal position controls 388, 386. This creates the required $(X-Xo)$ and $(Y-Yo)$ voltage ramps at the outputs of the ramp generators 378 and 380.

These outputs are applied to multipliers 390 and 392. Each multiplier has its two inputs tied together so its output will correspond to the square of the input. The square values are tied together for output summation by summer 394 which produces a voltage which completes the left side of the required equation.

The output of 394 is wired to voltage comparator 396's inverting input. A DC area voltage which corresponds to $R^2$, is applied to the non-inverting input of 396. Thus, the positive pulse output of 396 will comprise the required circle pulses discussed before. These pulses are available at switch 397.

The resistor 398 on multiplier 392 can be used to adjust the amplitude of $(Y-Yo)^2$ in the equation. This allows adjustment of the shape of the circle by flattening or extending it vertically. The same effect can be had by adjusting the value of current source 384 and thereby the amplitude of $(Y-Yo)$.

Note that the DC area voltage corresponds to $R^2$, and since the area of a circle is $\pi R^2$, the aperture area is linearly proportional to this voltage.

To compensate for temperature drifts that would cause changes in aperture area, a feedback loop shown generally at 402 in FIG. 21, is incorporated. The aperture pulses are sampled for one vertical television field at a time. A voltage proportional to the time duration of these pulses is stored at the end of each field and compared against an adjustable reference voltage selected through the aperture control 404. An incremental correction is applied to a stored area voltage based on the comparison result. This area voltage is presented to comparator 396 in FIG. 23 to develop the aperture pulses.

Figure 24:
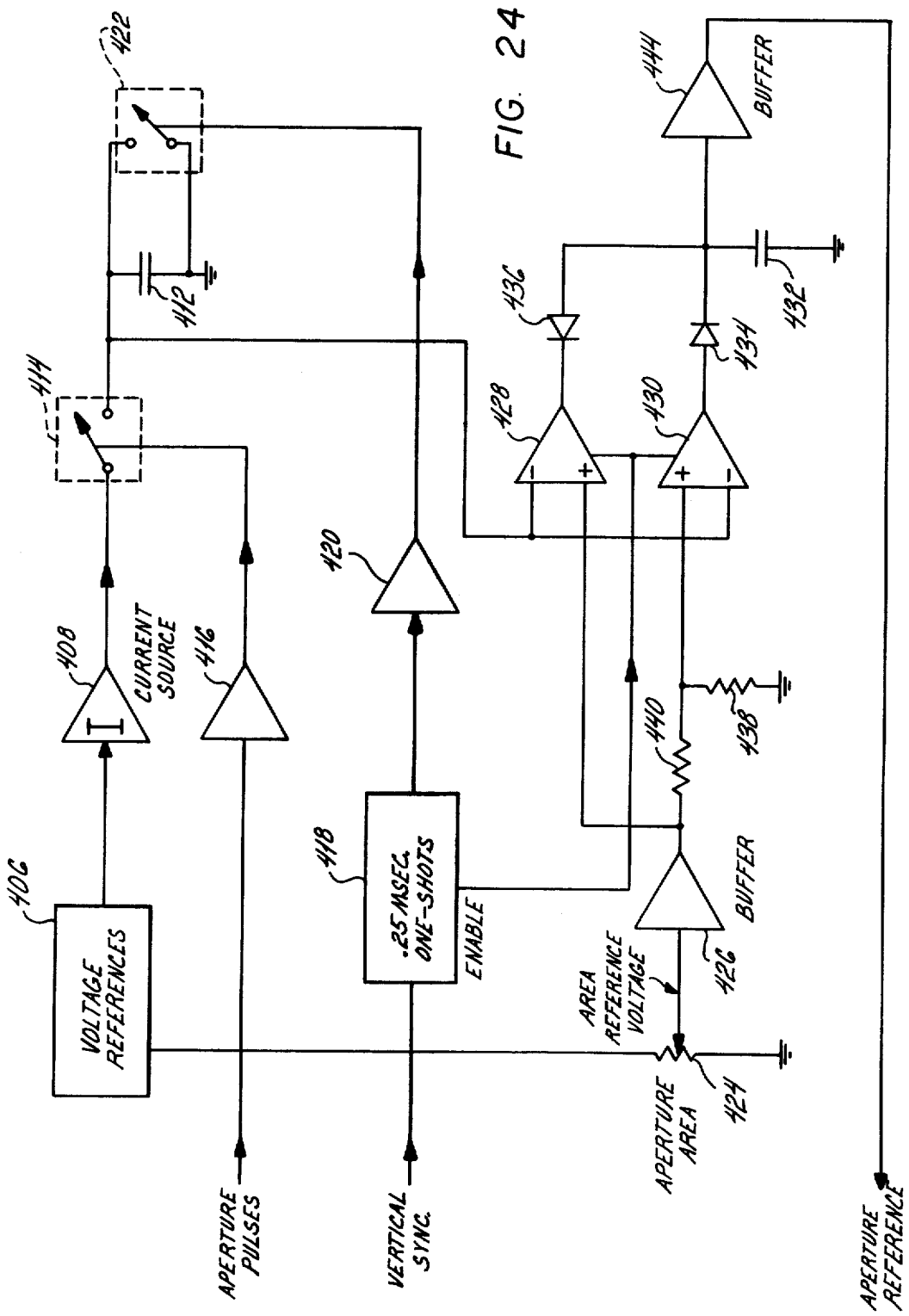
FIG. 24 is a circuit diagram of the control loop section of the aperture circuit.

FIG. 24 shows details of the control loop. A reference voltage is provided at 406 which is used to program the output magnitude of a constant current source 408. The constant current is available to charge a capacitor 412 through a controlled diode switch 414. A comparator 416 converts the aperture pulses to a negative voltage swing during low transitions. This low level diverts the constant current normally charging capacitor 412. Diode switch 414 prevents discharge of capacitor 412. The voltage across capacitor 412 will therefore be proportional to the accumulated time duration of the aperture pulses.

The vertical sync pulses cause 0.25 msec one-shots 418 to fire sequentially. The output of the last one-shot is converted to positive and negative transitions by a comparator 420.

The output of comparator 420 drives FET switch 422 which, in turn, discharges capacitor 412 within 0.25 msec at the end of each vertical field.

Thus, at the end of every vertical field, just prior to the discharge of capacitor 412, the voltage across this capacitor will be proportional to the one-field area of the electronic aperture. This voltage must be sampled during the first 0.25 msec pulse at 418.

A reference voltage is applied to the aperture area potentiometer 424 and buffered at 426. The output of this control becomes an area reference voltage to be used by comparators 428 and 430 sensing the voltage across capacitor 412. These comparators 428, 430 control voltage across capacitor 432 by biasing diodes 434 and 436 on or off to charge or discharge capacitor 432.

If the voltage across capacitor 412 is less than the area reference, the output of 430 will go to a high state, enabling the charging of capacitor 432. Diode 436 will be off. When capacitor 412 voltage rises above the area reference the output of 428 will go to low state, biasing diode 436 on and discharging capacitor 432. Diode 434 will be biased off. Thus, if the aperture area is made proportional to the positive voltage magnitude across capacitor 432, it will always be corrected in a direction tending to equalize the area reference and voltage across capacitor 412. Aperture area is forced to be proportional to the area reference.

The area reference at the input to 430 is made slightly less than that at 428 by resistors 438 and 440. This creates a "deadband" of voltage across capacitor 412 for which no correction in voltage is supplied. This, combined with incremental charge adjustment, provides finite control limits to insure loop stability.

The comparator circuit components associated with 428 and 430 can be functionally duplicated to provide a second circuit which operates with a much wider deadband and, therefore, is only active when the area reference is quickly adjusted significantly from its initial setting. This second circuit has comparators of much higher drive capability than those in the first circuit so that relatively large charge corrections will occur on capacitor 432. This effectively overrides the normal "slow" loop with a coarse, "fast" loop circuit to allow rapid changes in aperture size as commanded through the aperture area control. The "slow" loop is, therefore, dedicated to steady-state stability while the "fast" loop provides rapid response to a new area reference value. The wide deadband is developed with additional resistors.

Voltage across capacitor 432 is buffered by buffer 444 before use at comparator 396 in the aperture generator of FIG. 23 to develop aperture pulses.

Figure 22:
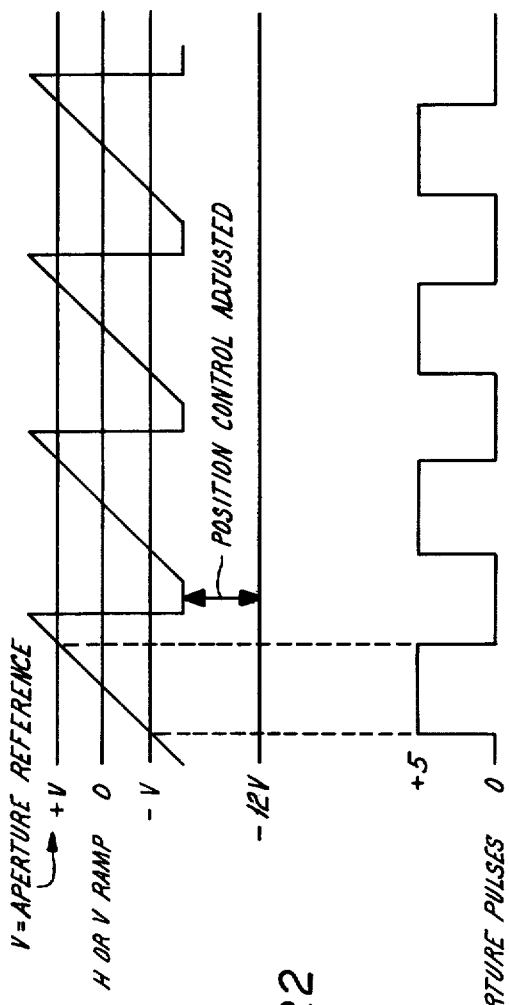
FIG. 22 are timing graphs useful in explaining the operation of FIG. 21.

In the square aperture mode the ramps previously described at the output of ramp generators 368 of FIG. 21 are used without modification. Each ramp is compared to two equal DC voltages equal in magnitude to that output by 444 and of opposite sign. When the ramp is between these two levels, square aperture output pulses are generated as shown in FIG. 22. DC level shifting of the ramps through the position controls will change the aperture position without affecting its dimensions.

Referring to FIG. 23, the area voltage output shown as the aperture reference signal is attenuated and then inverted by 448 provided switch 450 is in the position shown, and similarly inverted at 446. In FIG. 22 the aperture reference voltage is +V and −V is the inverted form from 446 and 448. The outputs from 452 and 454 of the quad comparator will be seen to both go to a high state when the aperture pulse conditions of FIG. 22 are satisfied for the horizontal ramp. Similarly, the output at 456 and 458 will satisfy requirements of FIG. 22 for the vertical ramp and aperture pulse. All outputs of 452, 454, 456 and 458 are anded by gate 460 so that aperture pulse conditions for vertical and horizontal dimensions must both be met for an aperture output pulse to occur at switch 397. When the circle/square select switch 397 is appropriately set circular or square aperture pulses will be available at line 462. These pulses superimposed on the television raster will produce a restricted image. When a square is selected, the "squareness" of the aperture is adjusted by a resistor which controls the vertical ramp peak to peak amplitude.

To produce a rectangular aperture, the square aperture circuit is used intact except that +V and −V in FIG. 22 are derived separately for the vertical component of operation. Switch 450 selects the V size control output to adjust the vertical size of the aperture. Horizontal aperture size is still determined by the area control. Thus a rectangular aperture with independently adjustable vertical and horizontal dimensions is developed.

TIMING CONTROL CIRCUIT

The timing control 80 receives the video signal and provides synchronization signals. Referring now to FIG. 25, the composite video signal is AC coupled to the sync separator 464. This circuit includes an amplifier. Negative excursions of the sync cause the amplifier to saturate. The amplifier therefore swings between the saturation voltage and common, to thereby amplify the sync pulses. The amplified signal is then coupled through a low pass network to an inverter.

Sync pulse signals at the output of the separator 464 consist of both horizontal and vertical pulses. Positive excursions cause one shot 466 to one shot for a period determined by its RC time constant controlled by the horizontal position control 468 thereby establishing a range of horizontal position pulses.

Sync pulses at the separator 464 are also coupled through a low pass filter to produce vertical sync pulses which cause the monostable 470 to one shot for the period determined by its RC network controlled by 472 which is the vertical position control, to vary the vertical position period. Positive transitions at the output of 470, signifying the end of the vertical position period, cause the monostable 474 to one shot for a period determined by control 476. This one shot period, called vertical size, determines the vertical height of the TV counting field. The Q and $\overline{Q}$ outputs of vertical size one shot 474 are both available. Horizontal position Q and $\overline{Q}$ outputs from 466 are also both available.

Figure 26:
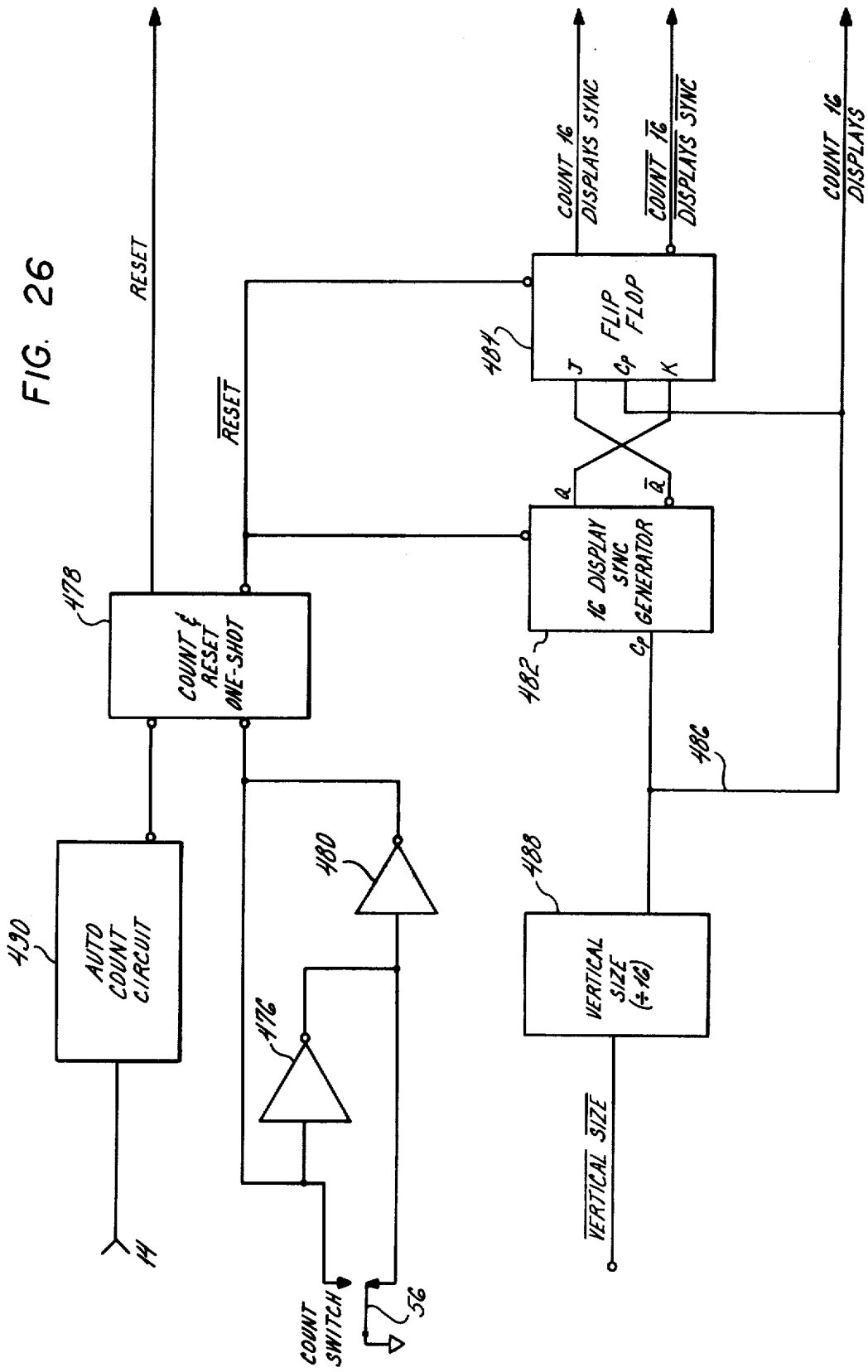
FIG. 26 is a circuit diagram of the count generator section of the control circuit.

The control card also generates the counts upon actuation of the front panel count switch 56. With reference to FIG. 26, closing switch 56 connects the common to amplifier 476 and also triggers one shot 478. The monostable 478 one shots at this negative transition for a period of approximately 50 us due to the RC time constant of a capacitor and the interal timing resistor. Simultaneously, with the high to low transition at the input of 476, the input to 480 goes high thereby reinforcing the low at the input to 478. Should the count switch contacts bounce, the low at the input to 478 will be maintained by the latching action of 476 and 480. Releasing the count switch will induce a similar latching action thereby maintaining a high at the output of 480. Therefore, double triggering of the count one shot 478 will be negated.

The cross coupled arrangement of the Q and $\overline{Q}$ outputs of 482 to the K and J inputs of the flip flop 484 allows operation of this flip flop in the following manner: Upon actuation of the count switch 56, 482 and 484 are cleared by the 50 us reset pulse to their clear inputs.

The clock inputs to 482 and 484 are connected to the count 16 display line 486 after the vertical size pulse is divided by 16 by the counter 488. The first positive transition of the 16 display pulse after reset will enable the information at the J and K inputs to be transferred to the slaves. At the next negative edge transition of the clock, the Q and $\overline{Q}$ outputs of both 482 and 484 change state. At the next positive transition of the clock, 482 does not enter any new information into the slave, however the J and K inputs of 484 are now low and high respectively which enables this information to be transferred into the slave of 484. At the next negative transition of the clock, the Q and $\overline{Q}$ outputs again change state. Since the J and K inputs of 484 will not be altered by any further transition of the clock then the outputs of 484 will no longer change state. 482 and 484 will therefore generate one gate output called the count 16 displays sync for every depression of the count switch. The width of the gate will be 16 fields (16⅔ ms×16=266⅔ ms.) Since the actuation of the count button is completely arbitrary with respect to the system synchronization then the total period for one count will be 533.33 ms. The reset pulse is also outputted from 478 and will serve to reset the front panel display.

During count or object area mode set-ups, the auto count circuit 490 provides a count signal to one shot 478.

The vertical size signal is divided down to pulses of 266 ms periods (called count 16 displays) by the binary counter 488.

Figure 27:
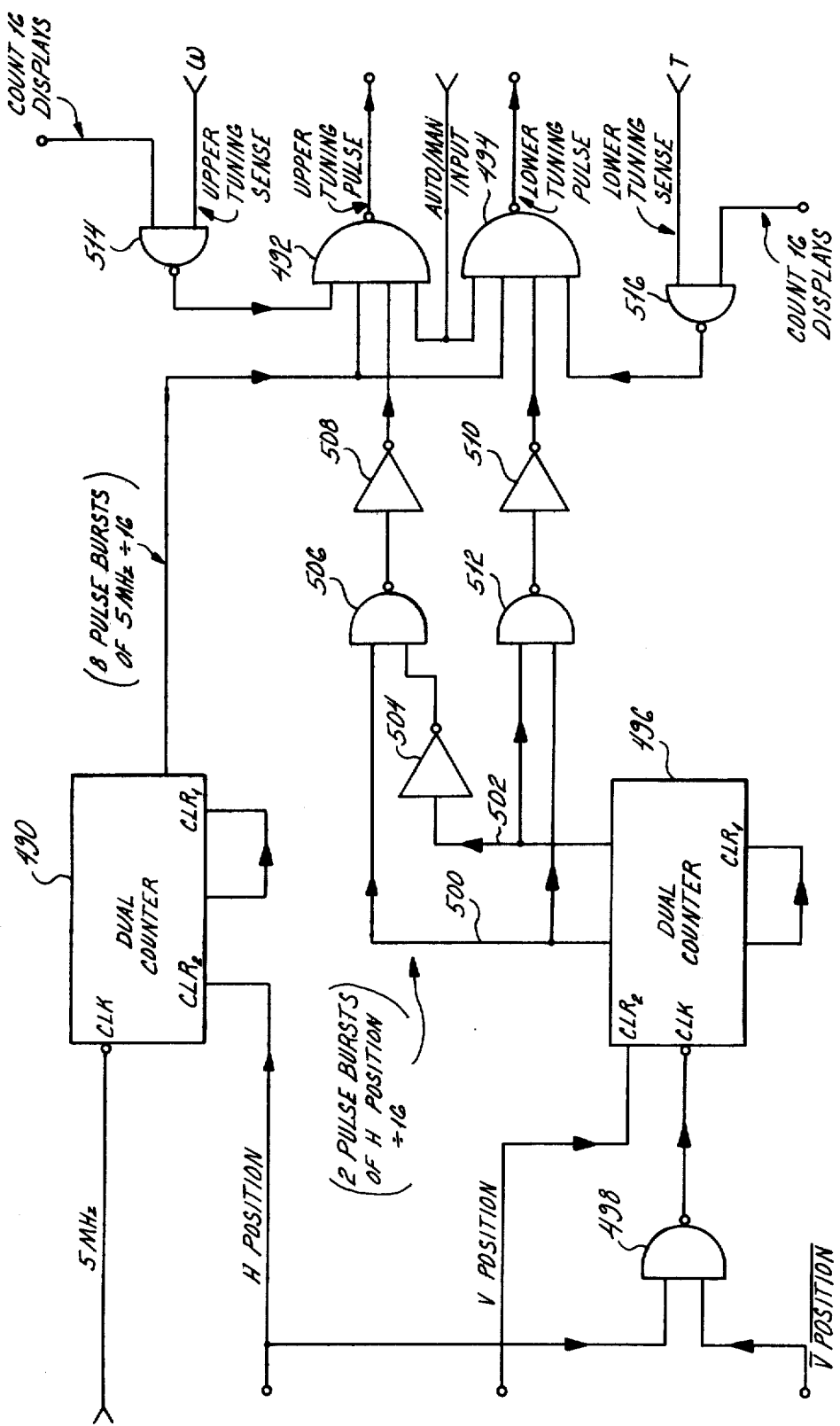
FIG. 27 is a circuit diagram of the tuning indicator section of the control circuit.

The sensitivity section is displayed through the timing indicator circuit shown in FIG. 27. Horizontal position pulses are generated at the rate of 262 pulses per vertical TV field. The width of the horizontal window can be represented by 246 5 MHz clock pulses. Therefore, position pulses and clock pulses may be combined to generate approximately square windows.

At the start of each horizontal scan line, dual counter 490 is constantly cleared. At the termination of the horizontal position pulse, 5 MHz clock pulses are gated into the control card. Negative transitions of the clock cause 490 to begin straight binary ripple counting as shown in FIG. 29. The output of 490 representing the width of the tuning indicators goes high at the eighth negative transition of the clock and low at the sixteenth transition of the clock. The sixteenth negative transition of the clock causes the reset to go high which clears 490. The counter remains in this state until the next horizontal position pulse. The output of 490 is connected to the inputs of nand gates 492 and 494.

At the beginning of each vertical field, dual counter 496 is cleared by the vertical position pulse. Horizontal position pulses are used to gate the counter 496 but not during the vertical position period as seen by the nand gate action of gate 498. Counter 496 ripples down as does counter 490. The eighth negative transition of the inverted horizontal position pulse at the output of the gate 498 causes the output of counter 496 to go high and remain high for eight more negative transitions of the clock. This pulse width represents the height of the tuning indicators. The twenty-fourth and thirty-second transition of the clock generates a second output of the counter 496. The thirty-second clock also causes the output 496 to go high thereby clearing 496. The counter will then remain in this state until the next vertical position pulse.

The two 508 uS wide pulses at output 500 generate upper and lower tuning indicators. Decoding gates function to separate the two pulses. Pulse 2 is eliminated at the output of gate 508 by nanding the outputs of 500 with 502 at the input to gate 506 after passing 502 through gate 504. In a similar manner, pulse 1 is eliminated at gate 510 by nanding the outputs of 500 with 502 at the input to gate 512.

Sense inputs W and T monitor the upper and lower sensitivity levels. Logic zeros at either W or T indicate "within sensitivity", whereas logic ones at either W or T indicate "out of sensitivity". W serves as one input to gate 514 while the count 16 displays is the other input. Note that when the input at W is a zero then the output of 514 is high. On the other hand, when the input at W is high then the output of 514 follows the inverse of the 16 displays. Therefore the output of 514 will cycle high and low at a rate of 2 times per second. The output of gate 516 operates in a similar manner except the input is controlled by T. The outputs of 516 and 514 serve as inputs to gates 492 and 494 thereby determining when the upper and lower tuning indicators are steady or flashing.

Signals at the inputs of 492 and 494 are inverted through gates 508 and 510 prior to being summed and then inverted by gate 518 as shown in FIG. 28. Gate 492 provides the output for the upper indication when all inputs are high. The high signals occur as follows: The vertical input is high for 508 uS and delayed from the vertical size by approximately 500 uS. The horizontal input is high for approximately 1.5 uS every 63.5 uS. The input from 514 is high when below maximum sensitivity. Finally, the input from the auto/manual input is high when the front panel auto-manual switch is set to auto. The output of 492 will therefore be eight negative going pulses 1.6 uS wide spaced 63.5 uS apart. This burst of eight pulses will occur every 16⅔ ms. The pulses and timing diagram is shown in FIG. 30.

The video mixer 81 is also included on the same card as the timing control. The details are shown in FIG. 28. The video signal, flags, tuning indicators, and apertures are mixed at the input of amplifier 520. This amplifier amplifies all signals which are then AC coupled and then buffered by the emitter follower 522 before outputting the composite video.

Specifically, the aperture and $\overline{\text{aperture}}$ are brought in at connector pins to gate 524, the aperture signal having passed through gate 528. This same aperture which is outputted from 524 is directed through an adjusting resistor 526 before mixing with the video. The resistor 526 will vary the modulation of the aperture with respect to the flags and video. When the aperture select switch is placed to off, a ground is inputted to gate 524. The ground is inverted to a high. The high at the output of 524 enables the entire counting field.

Flag pulses are inputted and coupled through an adjusting resistor 530. This resistor has a limited range for varying the flag intensity on the raster display. Auxiliary inputs may be inputted on line 532. The auxiliary input is nanded with two tuning indicators at gate 518 to produce a composite signal to the mixing junction of 520.

The video signal arrives on line 534 and is AC coupled through to the summing junction of 520. The composite video is coupled to the base of transistor 522. This transistor provides a very low impedance output for driving 75 ohm loads. Resistor 536 serves to limit the output current when the output is short circuited. Resistor 536 also serves to match the 75 ohm load by providing a 75 ohm driving impedance. Horizontal and vertical sync may be added by transistor 538 and 540 for those cases where the sync is not added to the video signal from the camera. Transistor 542 provides for a blanking input for the Monitor Drive.

DENSITY CIRCUIT

In an attempt to determine the proper absorption level, numerous problems are encounted. Utilizing a television scan camera, the sensitivity of the camera does not provide a flat uniform level throughout the field of view. Also, when the illumination source changes as after continued use of a source which deteriorates with age, the background field of illumination changes. Since absorption levels to be distinguished are extremely close to each other, it is necessary to have an accurate level detector which can compensate for non-uniformities in the field of illumination and for the irregularities in the television scanning camera.

The initial sensing of an object as a television camera scan line crosses its image, usually causes a decrease in video voltage level resulting from an increase in the optical density of the light path encountered compared to normal transmission. It would therefore seem apparent that in a level detector there should be a uniform absorption level preset which can be utilized as a threshold level in determining the absorption of the object. However, as indicated, the irregularities in the field of view cause the video signal to slope downward toward the edges of the field of view which would interfere with a flat absorption level threshold. It is therefore necessary to compensate for those sloping edges and furthermore to compensate for changes which may occur in the background field of illumination. The level detector of the present invention provides an improved circuit which solves these problems.

As shown in FIG. 31, the video input from the television camera is first sent to an automatic clamp circuit 544 which sets the zero video input signal at ground level regardless of the DC level of the video signal itself and regardless of the magnitude of the video signal. The clamped output signal indicated as V is then routed to a peak detector 546. The output of the peak detector has a capacitor 548 coupled across it with a resistor 550 in series with a transistor 552, in parallel across the capacitor 548. When the transistor 552 is turned on, the resistor 550 provides a discharging circuit for the capacitor 548. When the transistor 552 is turned off, the voltage of the capacitor 548 is held at its value without charging or discharging any further. The output of the peak detector is indicated as the voltage E.

A comparator 554, including a differential amplifier $U_1$ receives at its negative input the voltage V which is the clamped video input. The positive input of the amplifier $U_1$ is the voltage E passed through a voltage divider including resistors 556 and 558, such that a fixed fraction of the peak detector output signal E is utilized. The comparator 554 in conjunction with transistor 552 forms a feedback loop to the peak detector 546. As the video signal slowly increases, as for example near its edges, the output voltage E of the peak detector 546 causes the voltage across the capacitor 548 to increase so that the output voltage E of the peak detector follows exactly the input video signal V. The capacitor 548 can discharge through the resistor 550 as long as the transistor 552 is in an on state. When a relatively dense object is scanned and a sudden voltage drop occurs in the video signal V, the comparator 554 will detect this drop producing an output pulse on line 560 which represents the data A signal. This output pulse is inverted by the inverter 562 which serves to turn off the transistor 552 thereby removing the resistor 550 as a discharge resistor for the capacitor 548. The voltage E will therefore be held at its value and the peak detector 546 in conjunction with comparator 544 will serve as a true peak detector to provide an output pulse for the large negative voltage representing a dense object. Thus, the combination of the peak detector with the feedback loop essentially provides a "sample and hold" circuit which permits sampling of the video signal during its normal scanning, and holding of a fixed output threshold level during the detection of dense objects. The output signal E therefore effectively provides an "envelope" of the video input signal.

A second comparator 564 including an amplifier $U_2$ is also included and has the voltage V serving as the input to its negative terminal. The positive terminal of the amplifier $U_2$ to the comparator is a preselected fraction of the envelope voltage E. The fraction is provided by the variable voltage divider Dx 566. The positive input Ex therefore represents a variable envelope of the video input signal whose magnitude is determined by the variable voltage divider 566 providing the D level for presetting the desired density level. The output of the comparator 564 appears on line 568 as data B and represents a digitized pulse recognition of all objects having an absorption greater than the preset absorption level. By adjusting the divider 566 the D level can discriminate objects of various absorption levels independent of the local sensitivity of the camera. Furthermore, by utilizing the percent optical transmission of an object the system becomes insensitive to absolute optical light level or overall camera gain, thereby permitting the camera to operate in an optimal region.

Figure 32:
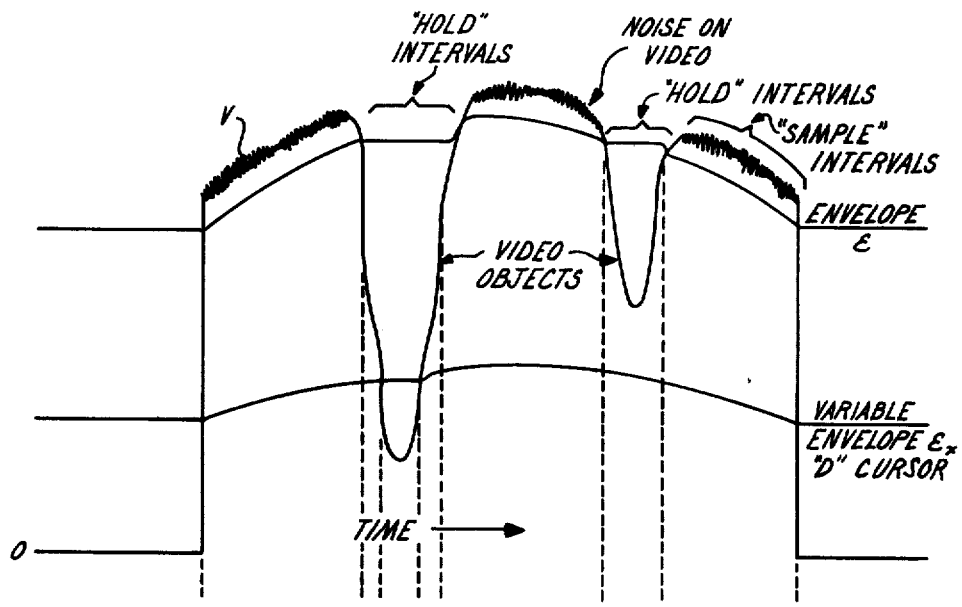
FIGS. 32 and 33 are graphs useful in explaining the operation of the density circuit.
Figure 33:
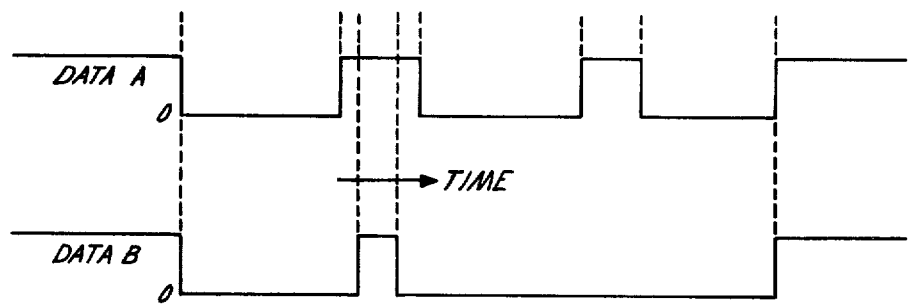

Referring now to FIGS. 32 and 33, there are shown a series of graphs which will aid in the understanding of the operation of the level detector of FIG. 31. In FIG. 32 there is shown a part of the video voltage which has been clamped so that its zero level is at ground. It is noted that the video signal is not at a uniform level but slopes downward towards its edges. Furthermore, it is noted that there is noise signal on the video. The envelope signal E effectively tracks the video signal and samples it during its normal scanning. When a dense object is detected, the output of the envelope E will be held and, as seen in FIG. 33, the data A output will detect all of the image information for the complete video object. The variable envelope Ex developed by the D level is at a threshold level whereby only much denser objects will be detected. The output due to the envelope Ex is shown as the narrower pulse data B. After the video object is detected, the envelope E continues to sample the video signal and again tracks its path. It is further noted that the envelope E is slightly spaced from the video signal so that the noise signal on the video will not interfere with detection.

Figure 34:
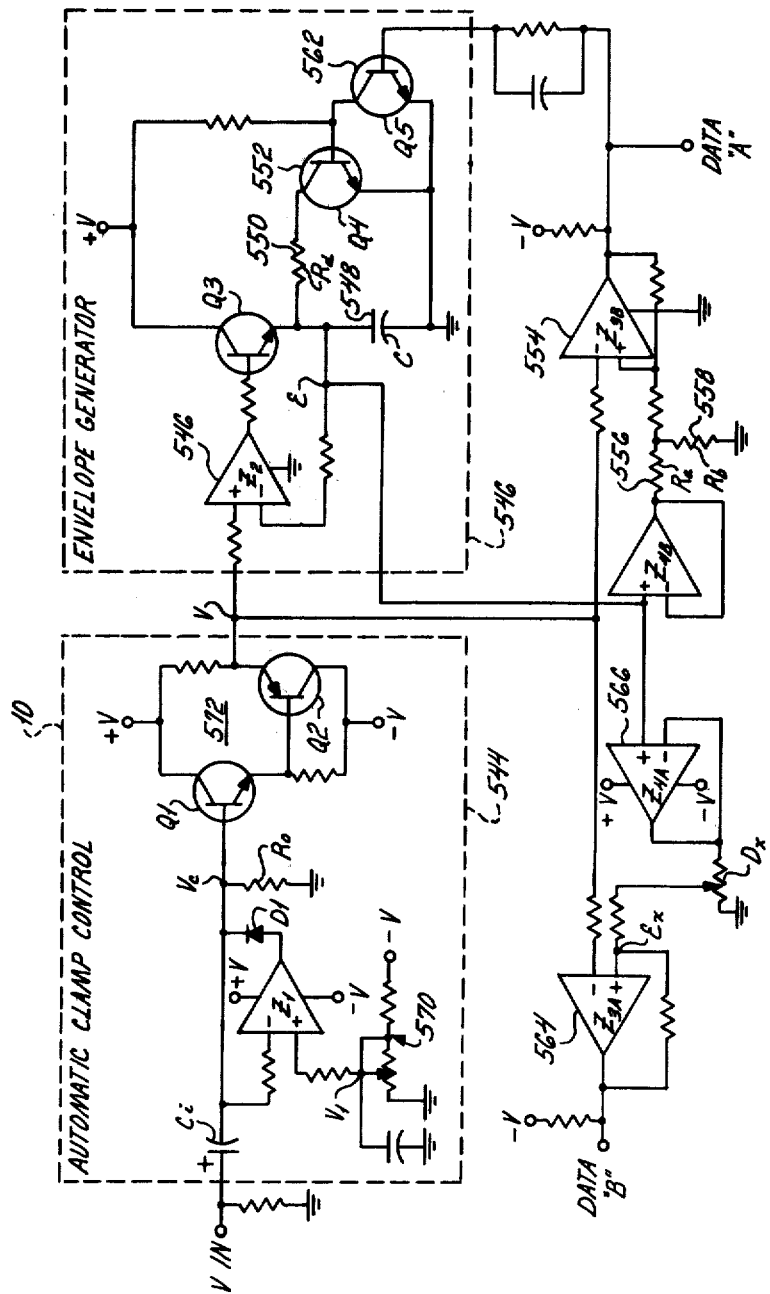
FIG. 34 is a circuit diagram of the density circuit.

Referring now to FIG. 34, there is shown a detailed circuit diagram of the level detector shown generally in FIG. 31. Part of the automatic clamp control circuit 544, C1, AC couples the video input Vin, to a point Vc taken across the resistor Ro. The DC component of the Vin is removed by means of the capacitor C1. As a result, Vc will swing above and below zero voltage. The amplifier $Z_1$ examines the voltage Vc at its negative input and compares it to a negative reference voltage $V_1$ taken across the voltage divider shown generally at 570. Should the voltage Vc attempt to go more negative than the voltage $V_1$, the operational amplifier $Z_1$ will drive the Vc positive through the diode D1. This will force voltage Vc to become the AC component of Vin with its negative most point at $V_1$ volts. As a result, any video input voltage is level-shifted so that the zero video signal corresponds to zero ground voltage. Furthermore, if the time constant of C1 and Ro is made large, the operational amplifier $Z_1$ need only supply a small correction charge to the C1 capacitor periodically at large time intervals. This makes the speed requirements for $Z_1$ minimal and contributes to the overall stability of the circuit.

The voltage Vc then passes through a buffer amplifier shown generally at 572 to provide a low impedance drive at the point V which represents the clamped video input signal and serves as the input for the level detecting circuit. The buffer amplifier 572 comprises transistors Q1 and Q2 which serve as a simple, temperature compensated, gain of one, high-frequency buffer amplifier.

The voltage V serves as the input to the peak detector shown generally at 546 and including the amplifier $Z_2$. The output of the amplifier $Z_2$ feeds the capacitor C through a transistor Q3. The resistor Rd and the transistor Q4 are placed in parallel across the capacitor C. These latter three components represent respectively corresponding components of FIG. 32 identified as 548, 550, and 552. The comparator 554 includes the amplifier $Z_{3B}$ having its negative input coupled to the video signal V and its positive signal coupled to the envelope signal E. The envelope is slightly divided down by means of the amplifier $Z_{4B}$ and the voltage dividing resistors Ra, Rb. The background noise present on V is thereby eliminated from detection by $Z_{3B}$. Generally, the transistor Q4 will be on, placing the resistor Rd in parallel with the capacitor C and permitting the capacitor C to be discharged through the resistor Rd. The output voltage E from the peak detector $Z_2$ and Q3 will therefore effectively track the voltage video signal Vc and will be slightly spaced therefrom, to thereby "sample" the signal. This sampling is achieved by charging the capacitor C through Q3 whenever the voltage across C is less than V, and discharging the capacitor C through Rd as the voltage V decreases slightly. Whenever the voltage V at the input of $Z_{3B}$ dips below the positive input of that amplifier, due to the presence of a dense object in the field of view, the output of the amplifier $Z_{3B}$ goes high thereby turning on the transistor Q5 and turning off the transistor Q4. Rd is then disconnected from the capacitor C and the capacitor C can no longer discharge but is held at its voltage. The comparator 554 will therefore provide pulses at the output data A which represent all of the objects scanned.

The envelope E is a true envelope of the video signal V with V being sampled by the amplifier $Z_2$ and the transistor Q3 during background light portions, and with E being "held" during an object portion as detected by $Z_{3B}$.

In addition to the digital signal data A, an absorption level D is provided which produces an output signal data B. This is accomplished by utilizing an additional comparator 564 comprising the amplifier $Z_{3A}$ whose negative input is the video signal V and whose positive input is taken through the D cursor circuit 566. This last circuit includes the amplifier $Z_{4A}$ and the variable voltage divider Dx. By setting the variable divider Dx at a predetermined value, the absorption threshold can be selected so that the output signal data B consists of a selective detection of objects denser than the preselected absorption threshold level.

Utilizing the level detector shown in FIG. 32 or FIG. 34, objects will be detected having absorptions greater than the absorption level set and all objects having absorptions greater than a background field illumination will be detected on data A. It should be noted that this card represents an optional card and need not be included. Also, when included, a single sensitivity control on the front panel will be utilized for adjusting either the sensitivity level for the video edge detector or the percent absorption for the density.

AUTOMATIC SIZE DISTRIBUTION CIRCUIT

Another option which would be useful for particle analysis leading to a histogram would be an automatic size distribution circuit.

This circuitry performs automatic size distribution. The size advance mechanism starts at zero and steps through each size, one increment at a time, until a predetermined maximum size is achieved. A capability of 0 to 256 size ranges may be selected. Typically, 20 size ranges would be used yielding a size range of 0 to approximately 2% of the width of the camera horizontal scanning width.

The size magnitude is outputted in BCD format from the data out connector 98 located on the rear of the counter. The auto circuit will advance through the size ranges at 1 second intervals, therefore, 20 sizes will be counted in approximately 20 seconds. At each count, all objects equal to that size or greater will be counted. For example: starting at 0, all objects will be counted; at 0+1, all objects greater than 0.1% of the field will be counted; at 0+2, all objects greater than 0.2% of the field will be counted, and so on.

Suitable printing calculators connected to the data out connector will decipher the size counts at each step and rearrange the data to be printed as the number of objects in each size.

Figure 35:
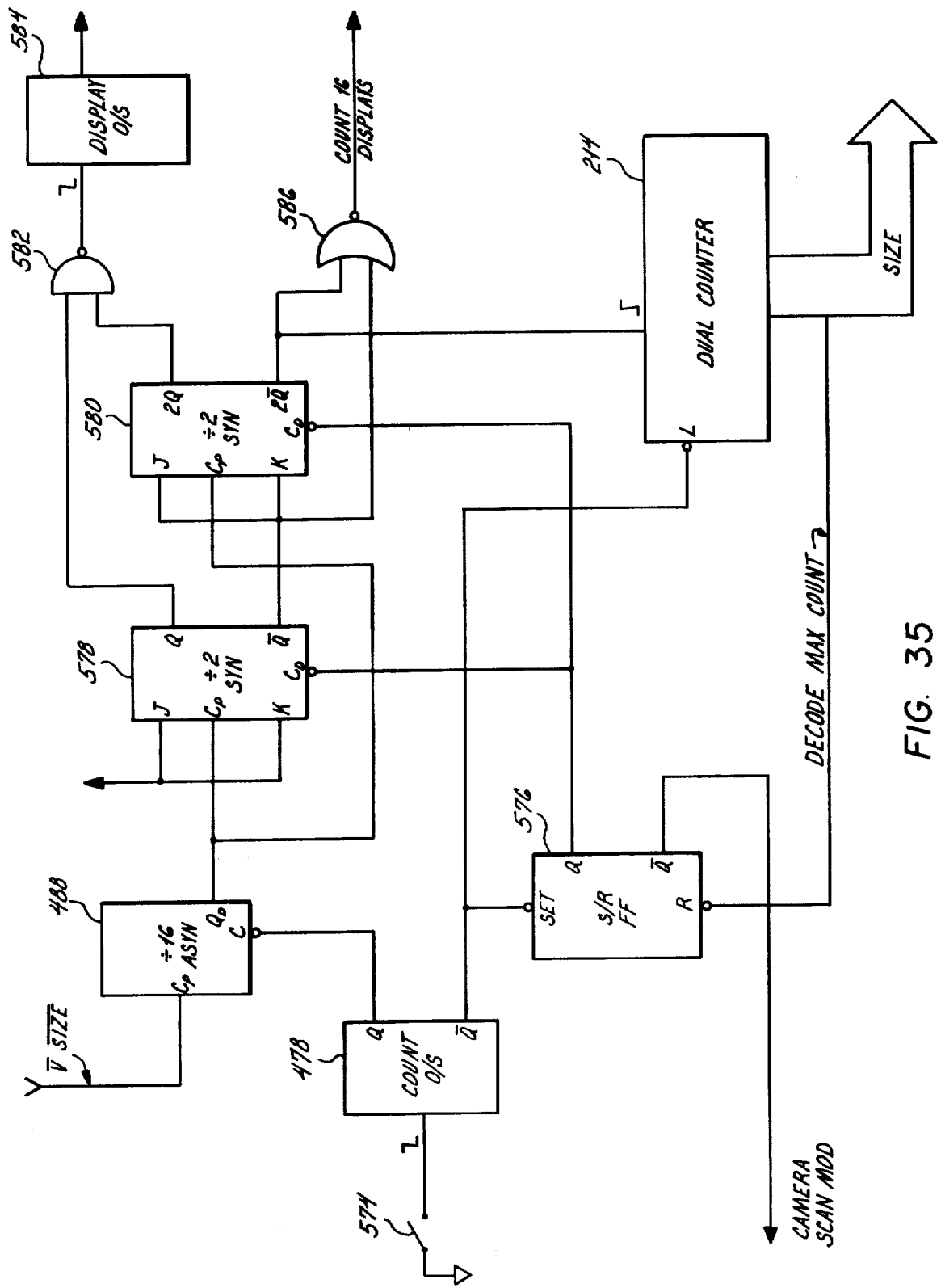
FIG. 35 is a block diagram of the size distribution circuit.

Circuit operation is explained with reference to FIGS. 35 and 36. Initiation of the front panel count switch 574 causes the monostable 478 from the control card to one-shot for 50 us, the Q output of 478 resets the ÷16 asynchronous counter 488 through the clear input. Simultaneously, the flip-flop 576 is preset, thusly removing the direct clear inputs of the ÷4 flip-flop 578, 580. In addition, the dual counter 214 from the size discrimination circuit is loaded with all highs.

Presetting the flip-flop 576 causes the TV camera to change scan rate through the $\overline{Q}$ blanking pulse of 576. The TV camera normally scans at 262½ lines per field with 2:1 interlace. The blanking pulse through 576 allows the camera to revert to 525 lines per field but at ½ the normal vertical rate, namely 30 Hz. Random or 2:1 interlace is unacceptable when determining accurate size measurements, since all decisions must be made on one TV field.

After reset, the ÷16 counter 488 proceeds to divide the $\overline{V \text{ Size}}$ input pulses. At 133 ms after reset, the output of 488 at $Q_D$ goes high followed by a high to low transition of $Q_D$ at 266 ms after reset. The high to low transition of $Q_D$ (488) causes the Q outputs of the ÷4 synchronous counter 578, 580 to go high. The occurance of two highs at the input of nand gate 582, generates a high to low transition at its output. This transition one-shots the display monostable 584 for 50 us thusly resetting the count display to zero. Simultaneous with the Q outputs of 578, 580 going high, the $\overline{Q}$ outputs of 578, 580 go low.

This outputs the 266 ms wide count 16 displays pulse through the output of 586. The next count 16 displays pulse will be outputted 800 ms later when both Q outputs of 578, 580 are again low.

Observe the dual counter 214 was loaded with all highs at the initiation of auto count. All highs at the preset inputs of 214 signifies 0 size. Refer to the previous size discrimination circuit discussion on the shift card in connection with FIG. 10. The dual counter 214 is incremented 800 ms after reset by the high to low transition of 578, 580 at 2Q̄. This counter will again be incremented 1,066 ms later when 578, 580 at 2Q̄ again goes low. Each time 214 is incremented the size is advanced by approximately 0.1% of the width of the TV field.

The size continues to be incremented until the maximum selectable count is decoded at which time the flip-flop 576 is reset. Resetting the flip-flop 576 returns the camera to normal scan and inhibits further counting through the direct clear inputs of counter 578, 580.

The automatic size distribution circuit could be on a separate card or it could be built directly on the timing control card or the shift card, as might be appropriate.

There has been disclosed heretofore the best embodiment of the invention presently contemplated. However, it is to be understood that various omissions, substitutions and changes in the form and details of the device illustrated and in its operation may be made by those skilled in the art without departing from the spirit of the invention. It is the invention, therefore, to be limited only as indicated by the scope of the claims appended hereto.

What is claimed is:

1. A counting apparatus for counting objects contained in a sample and comprising:
   (a) scanning means focused onto the sample for providing a scanned video output signal;
   (b) video processing means receiving said video output signal and for providing therefrom a digitized video signal:
   (c) timing control means receiving said video output signal and for providing horizontal and vertical synchronization signals;
   (d) aperture generator means receiving said synchronization signals and generating an electronic aperture signal corresponding to a selected area of the sample and representing a closed loop electronic aperture;
   (e) shift control means receiving said digitized video signal, said synchronization signals, and said electronic aperture signal, for identifying each object and producing a respective count signal and flag signal for each object identified within the selected area;
   (f) area control means receiving said digitized video signal and said electronic aperture signal and generating a count signal proportional to either the total object area or the percent object area respectively within the electronic aperture, said area control means further providing leading and trailing edge silhouette pulses representative of the perimeters of the objects;
   (g) counting means selectively receiving said count signals and selectively providing a total count corresponding to the number of identified objects, a total count corresponding to the total area of identified objects, and a total count corresponding to the percent area of the identified objects within the area represented by the electronic aperture signals; and
   (h) video display means receiving said video output signal, said flag signal or said silhouette pulses and said electronic aperture signal, and displaying the selected area of the sample with the objects therein and with a flag signal associated with each identified object or with a silhouette surrounding each identified object, said counting apparatus further comprising
   noise detection means coupled to said video processing means for automatically detecting and setting a maximum sensitivity threshold level; silhouette means receiving said digitized video signal and generating leading and trailing edge silhouette pulses for each detected object; area control means receiving said digitized video signal and providing area count signals for each detected object; and percent area control means receiving said digitized video signal and providing percent area signals proportional to the ratio of the detected objects and the area represented by the electric aperture signal.

2. A counting apparatus as in claim 1 and wherein said video processing means comprises differentiation means for receiving said video output signal and providing therefrom leading and trailing pulse edge signals, amplification means receiving said leading and trailing signals, and digitizing means coupled to said amplification means for generating a single digitized pulse for a combined leading and corresponding trailing edge signal.

3. A counting apparatus as in claim 2 and further comprising switching means interconnected between said amplification means and said digitizing means for selectively reversing said leading and trailing edge signals to thereby identify negative or positive video.

4. A counting apparatus as in claim 1 and wherein said aperture generator means comprises means for generating a region of enhanced illumination on said video display means, and selective means for selecting said region to be of circular shape, square shape, or rectangular shape.

5. A counting apparatus as in claim 4 wherein said aperture generator means further comprises means for varying the display size of said enhanced region up till the entire available display area of said video display means.

6. A counting apparatus as in claim 4 and wherein said aperture generator means further comprises means for varying the height and width of the enhanced region when the rectangular shape is selected.

7. A counting apparatus as in claim 4 wherein said aperture generator means further comprises position control means for moving the enhanced region to any part of the sample.

8. A counting apparatus as in claim 4 and wherein said aperture generator means further comprises ramp generators for receiving said synchronization signals and generating ramp signals for each of the horizontal and vertical sweeps, position control means coupled to said ramp generator for establishing a horizontal and vertical origin along the ramp signals, multiplier means for squaring said ramp signals, adding means for adding together the two squared ramp signals, and circle comparator means for comprising the added signals with a selected DC voltage and producing a circle signal indicating all values of the added signals equal to or less than said DC voltage, said circle output signal being applied to modulate the input to said video display means.

9. A counting apparatus as in claim 8 and wherein said ramp generators comprise capacitor means, and constant current source means for charging said capacitor means, said capacitor means being reset by said synchronization signals, and wherein said position control means hold said capacitor means at a preset negative voltage.

10. A counting apparatus as in claim 9 and wherein said constant current source comprises adjusting means for controlling the value of the constant current to thereby change the shape of the enhanced region.

11. A counting apparatus as in claim 8 and wherein said multiplier means comprising adjusting means for controlling the shape of the enhanced region.

12. A counting apparatus as in claim 8 and wherein said aperture generator means further comprises square comparator means for comparing each ramp signal with two equal and opposite DC voltages and providing a square output signal when the ramp is between said two DC voltages and level shifting means for shifting the DC voltages to thereby shift the position of the enhanced region without changing its shape.

13. A counting apparatus as in claim 12 and wherein the DC voltages used for comparison with the vertical ramp are independently controllable from the DC voltages used for comparison with the horizontal ramp, whereby a rectangular aperture is obtained.

14. A counting apparatus as in claim 1 and wherein said area control means comprises delay means for delaying the rising and falling edges of the pulses of the digitized video signal, and trigger means receiving the delayed rising and falling edges and respectively providing short silhouette pulses for each delayed edge, said silhouette pulses being applied to said video display means.

15. A counting apparatus as in claim 1 wherein said counting means comprises counters for each digital readout position, decode circuits respectively coupled to each counter, and digital display means respectively coupled to each decode circuit.

16. A counting apparatus as in claim 15 and wherein said counting means further comprises count direction means coupled to said counters, and switch means coupled to said count direction means for adding or subtracting counts from the displayed count.

17. A counting apparatus as in claim 15 and wherein said counting means further comprises output indicator means for providing a pulse which indicates that a new count is forthcoming.

18. A counting apparatus as in claim 15 and wherein said counting means further comprises means for updating the total count displayed at predetermined intervals.

19. A counting apparatus as in claim 1 and further comprising level detector means receiving the video output signals from said scanning means and providing a density signal containing information of the objects having absorptions greater than preselected absorption levels, and absorption selection means coupled to said level detector means for setting said preselected absorption level, the output from said level detector means being applied to said video processing means.

20. A counting apparatus as in claim 19 and wherein said level detector means comprises an automatic clamping circuit receiving said video output signal and setting zero video at ground level, a peak detector circuit including in its output circuit a capacitor in parallel with a resistor switching element, and a comparator for comparing a preselected portion of the peak detector circuit output with the clamped video output and producing said density signal.

21. A counting apparatus as in claim 20 and further comprising a buffer circuit coupled between said peak detector output and said comparator, for controlling the amount of the difference between said clamped video output and said peak detector output which is required to produce said density signal.

22. A counting apparatus as in claim 1 wherein said video processing means comprises delay means for delaying said video output signal, and sending said delayed video to said video display means whereby said flag signals and said electronic aperture signals will appear displayed in real time.

23. A counting apparatus as in claim 1 and wherein said shift control means comprises window generator means for establishing a window signal which constitutes the horizontal scan period thereby eliminating the blanking period.

24. A counting apparatus for counting objects contained in a sample and comprising:
(a) scanning means focused onto the sample for providing a scanned video output signal;
(b) video processing means receiving said scanned video output signal and for providing therefrom a digitized video signal;
(c) timing control means receiving said video output signal and for providing horizontal and vertical synchronization signals;
(d) aperture generator means receiving said synchronization signals and generating an electronic aperture signal corresponding to a selected area of the sample;
(e) shift control means receiving said digitized video signal, said synchronization signals, and said electronic aperture signal, for identifying each object and producing a respective count signal and flag signal for each object identified within the selected area;
(f) counting means receiving said count signals and providing a total count corresponding to the number of identified objects within the selected area; and
(g) video display means receiving said scanned video output signal, said flag signal, and said electronic aperture signal, and displaying the selected area of the sample with the objects therein and with a flag signal associated with each identified object, said video processing means comprising differentiation means for receiving said video output signal and providing therefrom leading and trailing pulse edge signals, amplification means receiving said leading and trailing signals, and digitizing means coupled to said amplification means for generating a single digitized pulse for a combined leading and corresponding trailing edge signal, said counting apparatus further comprising noise detection means coupled to said amplification means for determining the average noise level of the video output signal, comparison means for comparing a function of the average noise level with a preset sensitivity setting to establish a point of maximum sensitivity, division means for reducing the function of the average noise level and comparing it with the preset sensitivity setting to establish a point of minimum sensitivity, and output means for providing a display of said maximum and minimum sensitivity points.

25. A counting apparatus as in claim 24 and wherein said sensitivity display comprises two tuning indicators on said video display means respectively corresponding to said maximum and minimum sensitivity points, and further comprising means for causing said tuning indicators to flash until said maximum and minimum sensitivity points are reached.

26. A counting apparatus as in claim 24 and further comprising feedback means coupled to said noise detector for automatically establishing the sensitivity at a maximum level, and switching means for selectively operating said feedback means on the one hand and said comparison and division means on the other hand.

27. A counting apparatus as in claim 26 and wherein said noise detector comprises squaring means for squaring the output from said amplification means, and a low pass network for averaging the output from said squaring means to obtain said average noise level, and multiplication means for multiplying said average noise level to produce said function of the average noise level.

28. A counting apparatus for counting objects contained in a sample and comprising:
 (a) scanning means focused onto the sample for providing a scanned video output signal;
 (b) video processing means receiving said scanned video output signal and for providing therefrom a digitized video signal;
 (c) timing control means receiving said video output signal and for providing horizontal and vertical synchronization signals;
 (d) aperture generator means receiving said synchronization signals and generating an electronic aperture signal corresponding to a selected area of the sample;
 (e) shift control means receiving said digitized video signal, said synchronization signals, and said electronic aperture signal, for identifying each object and producing a respective count signal and flag signal for each object identified within the selected area;
 (f) counting means receiving said count signals and providing a total count corresponding to the number of identified objects within the selected area; and
 (g) video display means receiving said scanned video output signal, said flag signal, and said electronic aperture signal, and displaying the selected area of the sample with the objects therein and with a flag signal associated with each identified object, said shift control means comprising first means for determining the end of an object on one horizontal scan line; second means for determining that the object length has exceeded a preselected size; third means for determining that an object from one scan line and an object exceeding said preselected size from a previous scan line has not simultaneously occurred; fourth means for determining that either an object or an object exceeding said preselected size from a previous horizontal scan line has not occurred simultaneously with the detection of an object on the one scan line; and gate means for combining the outputs from said four determining means and producing said count signal and said flag signal in response thereto.

29. A counting apparatus as in claim 28 and further comprising size discrimination means comprising trigger means for producing a pulse whose width is dependent upon a desired size value, a preset down counter receiving said pulse from said trigger means and producing a size word representative of said desired size value, and wherein said second determining means comprises a presettable counter receiving said size word and said object length and in response thereto providing an output indicating that the object length has exceeded said size word.

30. A counting apparatus as in claim 29 wherein said preset down counter is preset with a series of size ranges, and further comprising stepping means for advancing said preset down counter, whereby said counting means provides a count for each of said ranges, and further comprising means for providing the video display in a single field.

31. A counting apparatus for counting objects contained in a sample and comprising:
 (a) scanning means focused onto the sample for providing a scanned video output signal;
 (b) video processing means receiving said scanned video output signal and for providing therefrom a digitized video signal;
 (c) timing control means receiving said video output signal and for providing horizontal and vertical synchronization signals;
 (d) aperture generator means receiving said synchronization signals and generating an electronic aperture signal corresponding to a selected area of the sample;
 (e) shift control means receiving said digitized video signal, said synchronization signals, and said electronic aperture signal, for identifying each object and producing a respective count signal and flag signal for each object identified within the selected area;
 (f) counting means receiving said count signals and providing a total count corresponding to the number of identified objects within the selected area; and
 (g) video display means receiving said scanned video output signal, said flag signal, and said electronic aperture signal, and displaying the selected area of the sample with the objects therein and with a flag signal associated with each identified object, said aperture generator means comprising means for generating a region of enhanced illumination on said video display means, and selective means for selecting said region to be of circular shape, square shape, or rectangular shape, said aperture generator means further comprising means for varying the display size of said enhanced region up till the entire available display area of said video display means, said aperture generator further comprising closed loop means for maintaining the constancy of the size of the selected shape, said closed loop means comprising conversion means for converting the selected size of the enhanced region to an equivalent voltage level, comparison means for comparing said equivalent voltage level to a reference voltage level, and means for reducing any voltage difference from said comparison means.

32. A counting apparatus as in claim 31 wherein said means for reducing further comprises a slow control means for reducing small voltage differences and a fast control means for reducing large voltage differences.

33. A counting apparatus as in claim 31 and wherein said closed loop means comprises capacitor means for storing a voltage proportional to the accummulated time duration of the region of enhanced illumination during each field; an adjustable reference signal generator for generating a signal proportional to the desired aperture size; and comparison means including a further capacitor which is caused to charge or discharge in accordance with the comparative difference between said proportional voltage and said proportional signal.

34. A counting apparatus for counting objects contained in a sample and comprising:
   (a) scanning means focused onto the sample for providing a scanned video output signal;
   (b) video processing means receiving said video output signal and for providing therefrom a digitized scanned video signal;
   (c) timing control means receiving said video output signal and for providing horizontal and vertical synchronization signals;
   (d) aperture generator means receiving said synchronization signals and generating an electronic aperture signal corresponding to a selected area of the sample;
   (e) shift control means receiving said digitized video signal, said synchronization signals, and said electronic aperture signal, for identifying each object and producing a respective count signal and flag signal for each object identified within the selected area;
   (f) counting means receiving said count signals and providing a total count corresponding to the number of identified objects within the selected area; and
   (g) video display means receiving said scanned video output signal, said flag signal, and said selectronic aperture signal, and displaying the selected area of the sample with the objects therein and with a flag signal associated with each identified object, said counting apparatus further comprising absolute area means receiving said digitized video signal and said electronic aperture signal, and selectively providing to said counting means a first area count representing the absolute area of said selected area and a second area count representing the total area of the detected objects within said selected area.

35. A counting apparatus as in claim 34 and wherein said area counts are in the form of a serial pulse train, wherein the number of pulses is proportional to the respective area.

36. A counting apparatus as in claim 35 and wherein said absolute area means further comprises fine continuous adjustment means and coarse wide-range adjustment means for respectively adjusting the number of pulses in said serial pulse train.

37. A counting apparatus as in claim 36 and wherein said absolute area means comprises oscillator means for generating a stream of pulses, gating means coupled to said oscillator means for selectively operating the oscillator means during either the entire presence of said electronic aperture signal or only during the presence of the digitized video signal, presettable counting means which can be preset with a first value and for counting therefrom to a second value, said presettable counting means receiving the pulses from said oscillator means and effectively dividing them by said difference.

38. A counting apparatus as in claim 37 and wherein said presettable counting means comprises first and second counters cascaded together, said first counter being preset to $N_1$, said second counter being preset to $N_2$, said oscillator producing $C_1$ pulses, said oscillator being gated for F fields, and said presettable counting means producing $C_o$ output pulses wherein:

$$C_o = C_1/(F-N_1)(F-N_2).$$

39. A counting apparatus as in claim 37 and wherein said coarse wide range adjustment means modifies said first value, and wherein said fine continuous adjustment means modifies said stream of pulses.

40. A counting apparatus for counting objects contained in a sample and comprising:
   (a) scanning means focused onto the sample for providing a scanned video output signal;
   (b) video processing means receiving said scanned video output signal and for providing therefrom a digitized video signal;
   (c) timing control means receiving said video output signal and for providing horizontal and vertical synchronization signals;
   (d) aperture generator means receiving said synchronization signals and generating an electronic aperture signal corresponding to a selected area of the sample;
   (e) shift control means receiving said digitized video signal, said synchronization signals, and said electronic aperture signal, for identifying each object and producing a respective count signal and flag signal for each object identified within the selected area;
   (f) counting means receiving said count signals and providing a total count corresponding to the number of identified objects within the selected area; and
   (g) video display means receiving said scanned video output signal, said flag signal and said electronic aperture signal, and displaying the selected area of the sample with the objects therein and with a flag signal associated with each identified object, said counting apparatus further comprising a percent area circuit means for receiving said digitized video and said electronic aperture signal and providing to said counting means an area count representing the ratio of the total area of the detected objects within the selected area to the total area of the selected area.

41. A counting apparatus as in claim 40 and wherein said percent area circuit means further comprises means for detecting the minimum electronic aperture area for which the percent area circuit has maximum accuracy, and means for causing the detected objects displayed on the video display means to flash intermittently below that minimum area.

42. A counting apparatus as in claim 40 and wherein said percent area circuit means comprises a first divider circuit receiving a number of count pulses S proportional to the electronic aperture area and dividing them by a constant value K, a counter receiving the output from said first divider circuit as a number of pulses $N_1$, and a programmable divider which receives a number of count pulses D proportional to the area of objects detected within the aperture area and dividing them by $N_2$ for producing an output number of pulses $N_1$, whereby:

$$N_1 = (D/S)K.$$

43. A counting apparatus as in claim 42 and wherein K=100 to give direct readings in percent, and S is at least $K^2$ number of pulses on each area measurement.

44. A counting apparatus as in claim 43 wherein said percent area circuit means further comprises a silhouette generator for providing a bright silhouette around all detected objects, a trigger circuit for operating said silhouette generator, a gating circuit receiving said number of count pulses S and producing a control output when S reaches $K^2$ pulses, said control output controlling said trigger circuit to operate said silhouette generator, and wherein said trigger circuit toggles intermittently in the absence of said control output whereby the silhouetted objects will flash intermittently on the video display means.

45. A counting apparatus for counting objects contained in a sample and comprising:
    (a) scanning means focused onto the sample for providing a scanned video output signal;
    (b) video processing means receiving said scanned video output signal and for providing therefrom a digitized video signal;
    (c) timing control means receiving said video output signal and for providing horizontal and vertical synchronization signals;
    (d) aperture generator means receiving said synchronization signals and generating an electronic aperture signal corresponding to a selected area of the sample;
    (e) shift control means receiving said digitized video signal, said synchronization signals, and said electronic aperture signal, for identifying each object and producing a respective count signal and flag signal for each object identified within the selected area;
    (f) counting means receiving said count signals and providing a total count corresponding to the number of identified objects within the selected area; and
    (g) video display means receiving said scanned video output signal, said flag signal, and said electronic aperture signal, and displaying the selected area of the sample with the objects therein and with a flag signal associated with each identified object, said counting apparatus further comprising compensator means receiving said count signals from said shift control means and for correcting the count signals to compensate for an area of the sample not detected, the corrected count signals being sent to said counting means, said compensator means further comprising first and second cascaded dividers, first and second programmable trigger circuits, respectively connected to the outputs of said first and second dividers, a control switch having first and second setting means for respectively setting said first and second programmable trigger circuits, and gating means for combining the outputs of said first and second programmable trigger circuits with the count signals.

46. A counting apparatus as in claim 45 and wherein said dividers are each divide-by-ten circuits whereby the output from the first divider and first trigger is said first setting in a tens position T, the output from the second divider and second trigger is said second setting in a units position U, and whereby said gating output is 1.TU×C, where C is the number of the uncompensated count signals.

47. A counting apparatus for counting objects contained in a sample and comprising:
    (a) scanning means focused onto the sample for providing a scanned video output signal;
    (b) video processing means receiving said scanned video output signal and for providing therefrom a digitized video signal;
    (c) timing control means receiving said video output signal and for providing horizontal and vertical synchronization signals;
    (d) aperture generator means receiving said synchronization signals and generating an electronic aperture signal corresponding to a selected area of the sample;
    (e) shift control means receiving said digitized video signal, said synchronization signals, and said electronic aperture signal, for identifying each object and producing a respective count signal and flag signal for each object identified within the selected area;
    (f) counting means receiving said count signals and providing a total count corresponding to the number of identified objects within the selected area; and
    (g) video display means receiving said scanned video output signal, said flag signal, and said electronic aperture signal, and displaying the selected area of the sample with the objects therein and with a flag signal associated with each identified object, said timing control means comprising sync separator means for separating the horizontal and vertical pulses from the video output signal, horizontal trigger means coupled to said sync separator means for providing a pulse for each horizontal position, horizontal position control means coupled to said horizontal trigger means for adjusting said horizontal position pulse, vertical position trigger means coupled to said sync separator means for providing a pulse for each vertical position, vertical position control means coupled to said vertical position trigger means for adjusting said vertical pulses, vertical size trigger means for providing a pulse determining the vertical height of the display field, and vertical size control means coupled to said vertical size trigger means for controlling said vertical height pulse, said timing control means further comprising horizontal and vertical counters respectively coupled to said horizontal trigger means and said vertical position trigger means, tuning window detector means for receiving the outputs from said counters and generating upper and lower video tuning indicators, respectively, representing upper and lower levels of sensitivity, and means for causing said tuning indicators to blink onto said video display means in accordance with a selected sensitivity level.

48. A counting apparatus as in claim 47 and wherein said timing control means further comprises count generation means including a count switch for activating said counting means, and a count generator for providing a pulse whose width equals the total number of fields in a single display.

49. A counting apparatus for counting objects contained in a sample and comprising:
    (a) scanning means focused onto the sample for providing a scanned video output signal;

(b) video processing means receiving said scanned video signal and for providing therefrom a digitized video signal;

(c) timing control means receiving said video output signal and for providing horizontal and vertical synchronization signals;

(d) aperture generator means receiving said synchronization signals and generating an electronic aperture signal corresponding to a selected area of the sample;

(e) shift control means receiving said digitized video signal, said synchronization signals, and said electronic aperture signal, for identifying each object and producing a respective count signal and flag signal for each object identified within the selected area;

(f) counting means receiving said count signal and providing a total count corresponding to the number of identified objects within the selected area; and (g) video display means receiving said scanned video output signal, said flag signal, and said electronic aperture signal, and displaying the selected area of the sample with the objects therein and with a flag signal associated with each identified object, said counting apparatus further comprising size selection means coupled to said shift control means for preselecting a series of size ranges, stepping means for advancing said size selection means through said series of size ranges, said counting means providing a count of the objects within a range for each of the size ranges, said counting means including a counting circuit, a NOR-gate feeding said counting circuit, a source of pulses indicating incremental size ranges, said source being coupled to said NOR-gate and a one-shot multi-vibrator coupled to said NOR-gate to control the passage of said pulses to said counting circuit.

50. A counting apparatus for counting objects contained in a sample, and comprising:

(a) scanning means focused onto the sample for providing a scanned video output signal;

(b) video processing means receiving said scanned video output signal and for providing therefrom a digitized video signal;

(c) timing control means receiving said video output signal and for providing horizontal and vertical sychronization signals;

(d) shift control means receiving said digitized video signal and said synchronization signals, for identifying each object and producing a respective count signal and flag signal for each object identified;

(e) counting means receiving said count signals and providing a total count corresponding to the number of identified objects within the selected area;

(f) absolute area means receiving said digitized video signal and selectively providing to said counting means, an area count representing the total area of the detected objects; and (g) video display means receiving said scanned video output signal and said flag signal, and displaying the sample with a flag signal on each identified object, said absolute area means comprising oscillator means for generating a stream of pulses, gating means coupled to said oscillator means for operating the oscillator means during the presence of the digitized video signal, presettable counting means which can be preset with a first value and can count therefrom the difference to a second value, said presettable counting means receiving the pulses from said oscillator means and effectively dividing them by said difference, said presettable counting means comprising first and second counters together, said first counter being preset to $N_1$, said second counter being preset to $N_2$, said oscillator producing $C_1$ pulses, said oscillator being gated for F fields, and said presettable counting means producing $C_o$ output pulses wherein:

$$C_o = C_1/(F-N_1)(F-N_2).$$

51. A counting apparatus for counting objects contained in a sample, and comprising:

(a) scanning means focused onto the sample for providing a scanned video output signal;

(b) video processing means receiving said scanned video output signal and for providing therefrom a digitized video signal;

(c) timing control means receiving said video output signal and for providing horizontal and vertical synchronization signals;

(d) shift control means receiving said digitized video signal and said synchronization signals, for identifying each object and producing a respective count signal and flag signal for each object identified;

(e) counting means receiving said count signals and providing a total count corresponding to the number of identified objects within the selected area;

(f) absolute area means receiving said digitized video signal and selectively providing to said counting means, an area count representing the total area of the detected objects; and (g) video display means, receiving said scanned video output signal and said flag signal and displaying the sample with a flag signal on each identified object, said absolute area means comprising oscillator means for generating a stream of pulses, gating means coupled to said oscillator means for operating the oscillator means during the presence of the digitized video signal, presettable counting means which can be preset with a first value and can count therefrom the difference to a second value, said presettable counting means receiving the pulses from said oscillator means and effectively dividing them by said difference, said counting apparatus further comprising coarse wide-range adjustment means which modify said first value, and fine continuous adjustment means which modify said stream of pulses.

52. A counting apparatus for counting objects contained in a sample, and comprising:

(a) scanning means focused onto the sample for providing a scanned video output signal;

(b) video processing means receiving said scanned video output signal and for providing therefrom a digitized video signal;

(c) timing control means receiving said video output signal and for providing horizontal and vertical synchronization signals;

(d) shift control means receiving said digitized video signal and said synchronization signals, for identifying each object and producing a respective count signal and flag signal for each object identified;

(e) counting means receiving said count signals and providing a total count corresponding to the number of identified objects within the selected area;

(f) absolute area means receiving said digitized video signal and selectively providing to said counting means, an area count representing the total area of the detected objects; and (g) video display means receiving said scanned video output signal and said flag signal, and displaying the sample with a flag signal on each identified object, said absolute area means comprising silhouette generator means for receiving said digitized video signal and providing a silhouette output to said scanned video output means whereby a bright silhouette is displayed around all selected objects.

53. A counting apparatus as in claim 52 and wherein said silhouette generator means comprises delay means for delaying the rising and falling edges of the pulses of the digitized video signal, and trigger means receiving the delayed rising and falling edges and respectively providing short silhouette pulses for each delayed edge, said silhouette pulses being applied to said video display means.

54. A counting apparatus for counting objects contained in a sample, and comprising:

(a) scanning means focused onto the sample for providing a scanned video output signal;

(b) video processing means receiving said video output signal and for providing therefrom a digitized video signal;

(c) timing control means receiving said video output signal and for providing horizontal and vertical synchronization signals;

(d) shift control means receiving said digitized video signal and said synchronization signals, for identifying each object greater than a predetermined size, and for producing a respective count signal and flag signal for each object identified while avoiding detecting objects previously detected on another scan line;

(e) counting means receiving said count signals and providing a total count corresponding to the number of identified objects; and (f) video display means receiving said video signal and said flag signal and displaying the objects with a flag signal on each identified object, said shift control means comprising first means for determining the end of an object on one horizontal scan line; second means for determining that the object length has exceeded a preselected size, third means for determining that an object from one scan line and an object exceeding said preselected size from a previous scan line has not simultaneously occurred; fourth means for determining that either an object or an object exceeding said preselected size from a previous horizontal line has not occurred simultaneously with the detection of an object on the one scan line; and gate means for combining the outputs from said four determining means and producing said count signal and said flag signal in response thereto.

55. A counting apparatus as in claim 54 and further comprising a size discrimination means comprising trigger means for producing a pulse whose width is dependent upon a desired size value, a preset down counter receiving said pulse from said trigger means and producing a size word representative of said desired size value, and wherein said second determining means comprises a presettable counter receiving said size word and said colony length and in response thereto providing an output indicating that the object length has exceeded said size word.

* * * * *